United States Patent
Ogawa et al.

(10) Patent No.: US 6,495,221 B1
(45) Date of Patent: Dec. 17, 2002

(54) CHEMISORPTIVE SUBSTANCE, ALIGNED LIQUID-CRYSTAL FILM AND LIQUID-CRYSTAL DISPLAY ELEMENT BOTH MADE BY USING THE SAME, AND PROCESSES FOR PRODUCING THESE

(75) Inventors: Kazufumi Ogawa, Nara (JP); Tadashi Ohtake, Neyagawa (JP); Takaiki Nomura, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/269,636

(22) PCT Filed: Jul. 31, 1998

(86) PCT No.: PCT/JP98/03437
§ 371 (c)(1),
(2), (4) Date: May 18, 1999

(87) PCT Pub. No.: WO99/06415
PCT Pub. Date: Feb. 11, 1999

(30) Foreign Application Priority Data

| Jul. 31, 1997 | (JP) | 9-205937 |
| Jul. 31, 1997 | (JP) | 9-205938 |
| Oct. 23, 1997 | (JP) | 9-291307 |
| Oct. 23, 1997 | (JP) | 9-291308 |

(51) Int. Cl.[7] ............ C09K 19/56; G02F 1/1337; C07F 7/08; C07F 7/12
(52) U.S. Cl. ............ 428/1.23; 252/299.4; 349/124; 556/471; 556/473; 556/484
(58) Field of Search .......... 252/299.01, 299.4; 428/1.23, 447; 349/124; 556/471, 473, 484; 427/387; 106/287.14, 287.15, 287.16

(56) References Cited

U.S. PATENT DOCUMENTS

| 4,892,392 A | * 1/1990 | Broer ............ 349/124 |
| 5,133,895 A | 7/1992 | Ogawa et al. |
| 5,186,986 A | 2/1993 | Ogawa |
| 5,256,456 A | 10/1993 | Ogawa |
| 5,270,417 A | 12/1993 | Soga et al. |
| 5,515,190 A | 5/1996 | Ogawa et al. |

FOREIGN PATENT DOCUMENTS

| DE | 2153860 | * 5/1972 |
| EP | 0 261 712 | 3/1988 |

(List continued on next page.)

OTHER PUBLICATIONS

CA 77: 146246, 1972.*
JP 06–230394 English translation by computer, 2000 Japan Patent Office http://www6.ipdl.jpo.go.jp/Tokujitu/PAJdetail.ipdl?N0000=60&N0120=01&N2001=2&N3001=H06–230394.*
Patent Abstracts of Japan, vol. 1995, No. 04, May 31, 1995, JP 07 005442.
Patent Abstracts of Japan, vol. 018, No. 018, Jan. 12, 1994, JP 05 257149.

*Primary Examiner*—Shean C. Wu
(74) *Attorney, Agent, or Firm*—Parkhurst & Wendel, L.L.P.

(57) ABSTRACT

The present invention provides a new chemical adsorbent which can form an extremely thin and transparent film in nanometer order which is fixed uniformly and firmly on a substrate, and give an alignment characteristic of high thermal stability to the thin film; as well as a liquid crystal alignment layer and a liquid crystal display device having a desirable alignment characteristic, a superior alignment control force over a liquid crystal molecule, and a superior thermal stability by using the above-mentioned chemical adsorbent. This purpose can be actualized by developing a new compound which is transparent and stable in a range of a visible ray (a wavelength from 400 nm to 700 nm), and has a photosensitivity in a range of an ultraviolet ray and a far-ultraviolet ray (a wavelength from 200 nm to 400 nm), and can form a thin film in a monolayer through a chemisorption on a substrate.

88 Claims, 27 Drawing Sheets

FOREIGN PATENT DOCUMENTS

| | | |
|---|---|---|
| EP | 0 368 657 | 5/1990 |
| EP | 0 443 359 | 8/1991 |
| EP | 0 471 277 | 2/1992 |
| EP | 0 476 543 | 3/1992 |
| EP | 0 552 637 A1 | 7/1993 |
| EP | 0 695 770 | 2/1996 |
| EP | 0 844 248 | 5/1998 |
| EP | 0 857 728 | 8/1998 |
| EP | 0 942 314 | 9/1999 |
| GB | 1323869 | 7/1973 |
| JP | 53-134085 | 11/1978 |
| JP | 56-24320 | 3/1981 |
| JP | 62-057466 | 3/1987 |
| JP | 2-157727 | 6/1990 |
| JP | 2-214731 | 8/1990 |
| JP | 3-007913 | 1/1991 |
| JP | 4-328569 | 11/1992 |
| JP | 4-356020 | 12/1992 |
| JP | 5-053118 | 3/1993 |
| JP | 5-173135 | 7/1993 |
| JP | 5-178865 | 7/1993 |
| JP | 5-186531 | 7/1993 |
| JP | 6-230394 | 8/1994 |
| JP | 7-072483 | 3/1995 |
| JP | 7-300586 | 11/1995 |
| JP | 7-318942 | 12/1995 |
| JP | 9-211468 | 8/1997 |

* cited by examiner

CHEMISORPTIVE SUBSTANCE, ALIGNED LIQUID-CRYSTAL FILM AND LIQUID-CRYSTAL DISPLAY ELEMENT BOTH MADE BY USING THE SAME, AND PROCESSES FOR PRODUCING THESE

TECHNICAL FIELD

The present invention relates to a chemical adsorbent which can form a monomolecular thin film wherein component molecules are aligned in a predetermined direction, a liquid crystal alignment layer utilizing the same and a liquid crystal display device utilizing the same, and additionally, a method of manufacturing the above-mentioned chemical adsorbent and the like.

BACKGROUND ART

In recent years, although a liquid crystal display device has been spread rapidly as a means of actualizing the downsizing and lightening of information apparatus, coating materials for manufacturing a liquid crystal alignment layer, which is an important constituent of the device, are limited. Consequently, a new material for the alignment layer having an unprecedented characteristic is desired according to the improvement of a liquid crystal display device in performance.

A color liquid crystal display device has a structure wherein a pair of substrates with a transparent electrode arrayed generally in a matrix and a liquid crystal alignment layer formed on the transparent electrode are opposed through the liquid crystal alignment layers with a certain gap and a liquid crystal is sealed between the gap. More specifically, a macromolecular film is formed on each surface of a first glass substrate with a pixel electrode and a thin-film transistor (TFT) array and a second glass substrate with a plurality of red, blue and green color filters and a common transparent electrode on the color filters, and an alignment of the liquid crystal is provided by rubbing the coated planes. Secondly, the first glass substrate and the second glass substrate are opposed through the coated planes (the liquid crystal alignment layers) with a spacer interposed, and an empty cell (a panel structure) is made by adhesion of a periphery of the substrates. A liquid crystal display device is constituted by sealing with an injection of such a liquid crystal as twisted nematic (TN) into the empty cell, and additionally, a liquid crystal display device as a optical display device is constituted by disposing polarizers on the front and back sides of the device as well as a backlight outside the first glass substrate.

A liquid crystal display device having such a structure applies a voltage between the electrodes to obtain an ON/OFF state with the TFT and controls a light transmission by changing an alignment state of the liquid crystal and displays an arbitrary image. Therefore, the liquid crystal alignment layers for controlling the alignment state of the liquid crystal on a path of the light transmission play an extremely important role of affecting a display performance.

A polyimide film has conventionally been used widely as coating materials for such a liquid crystal alignment layer in terms of superiority in affinity with the liquid crystal, heat-resistance and adhesion to the substrate. The following methods are used for manufacturing the polyimide film: a method wherein the polyimide film is made by changing the polyamic acid into imide while burning the substrate after rotational-coating on a substrate a solution wherein polyamic acid, which is a precursor polymer of polyimide, is dissolved in such an organic solvent as xylene; and a method wherein the polyimide film is made by evaporating the solvent after rotational-coating on a substrate a solution wherein polyimide is dissolved in such organic solvents as DMF (N,N-dimethylformamide), DMAc (dimethylacetamide), butylcellosolveacetate and N-methyl-2-pyrrolidone.

However, a polyimide film has the following problems and thereby is not enough satisfactory for a liquid crystal alignment layer. That is:

(1) In the method by using polyamic acid which is a precursor substance, it is necessary to burn at a high temperature of 250° C. and above in order to change into imide sufficiently. In the method by using polyimide, it is necessary to remove the solvent at a considerably higher temperature because of no low boiler suitable for dissolving the polyimide. Such organic solvents as the above-mentioned DMF, DMAc, butylcellosolveacetate and N-methyl-2-pyrrolidone can be used as a solvent for dissolving the polyimide. however, since every solvent has a high boiling point (153° C., 165° C., 192° C., 202° C. respectively) and is flammable, it is necessary to consider explosion-protection while manufacturing the polyimide film by evaporating and drying the solvent at a high temperature. Consequently, a particular device is necessary for heating in manufacturing a polyimide film, whereby its manufacturing costs are raised. Moreover, there is the possibility that such a circuit as TFT will be damaged by heating.

(2) Furthermore, since polyimide is not sufficiently made into a film, it is difficult to manufacture a thin film with a uniform coating thickness. Consequently, since display unevenness resulting from non-uniformity of coating thickness occurs and a thick film functions as an insulation film, another problem is that it is difficult to actualize a liquid crystal display device having a low driving voltage.

(3) In addition to the above, the following problems are caused in rubbing operation for providing an alignment.

1 If a film has irregularities on its surface, recessed portions fail to be rubbed, particularly, in the case of a panel with a large area, the panel fail to be rubbed uniformly. Accordingly, such problems are caused as the occurrence of alignment defect and display unevenness, and display sticking.

2 Furthermore, static electricity is generated on an alignment layer and the static electricity results in deteriorating the function of a TFT.

3 In addition, dust comes out of rubbing materials (cotton cloth or the like) and the dust results in display unevenness and a change of a substrate gap.

Consequently, various noncontact type aligning methods are proposed for the purpose of solving the above-mentioned problems in a rubbing method.

In Japanese Unexamined Patent Publication No. 5-53118, a technique is proposed wherein a layer of a photosensitive composition is formed on a substrate, grooves of a predetermined pattern are formed on the composition layer by exposing and heat-treating, and an alignment is provided by the grooves. However, the technique requires high photo energy for forming the grooves. Moreover, since it is difficult to form uniform grooves, such problems are caused as the occurrence of display unevenness and the like, and alignment control force is not sufficient.

In Japanese Unexamined Patent Publication No. 7-72483, a technique is proposed wherein an alignment is provided by polymerizing the polyimide or the like while irradiating linearly polarized light to a compound layer for forming an alignment layer comprising polyimide or polyimide precursor. However, since the technique uses polyimide which is an organic polymer, the technique can not solve a problem of a rise in a liquid crystal driving voltage caused by a thick coating. Another problem is that the fixing force of an alignment layer on a substrate is not sufficient.

In Japanese Unexamined Patent Publication No. 7-318942, a technique is proposed wherein a molecular structure having an alignment is made by causing another reaction of combination or decomposition in a molecular chain of the alignment layer while irradiating from a diagonal direction to an alignment layer having a macromolecular structure. However, since the technique also is intended for an alignment layer which is made of such organic polymers as polyimide, polyvinyl alcohol and polystyrene, the technique can not solve the above-mentioned problems of a thick coating and a low fixing force on a substrate. Moreover, the irradiation from a diagonal direction to an alignment layer is essential for providing a pretilt angle and the technique requires a irradiation device with high precision for irradiating accurately from a diagonal direction, whereby manufacturing costs are raised.

In addition to the above-mentioned problems, the problem of a liquid crystal display device in a twisted nematic mode or the like is that a viewing angle is narrower than in the past. As a method for solving the problem, in Japanese Unexamined Patent Publication No. 5-173135, a method is proposed wherein a plurality of areas having different alignment directions of a liquid crystal are formed by repeating rubbing in a reverse direction after rubbing an alignment layer in a certain direction and covering the portions concerned with a resist.

Yet, in the rubbing (contact type) method, a troublesome operation of rubbing while masking each divided section must be repeated for forming a plurality of sections having different alignment directions of a liquid crystal. Consequently, according to this technique, even more serious problem is that the manufacturing efficiency of an alignment layer deteriorates largely as well as dust comes out.

On the other hand, a plurality of areas having different alignment directions of a liquid crystal can be formed also by applying each of such above-mentioned techniques as Japanese Unexamined Patent Publication No. 5-53118 and the like. However, as described above, since each of the above-mentioned techniques has such problems as a thick coating and an insufficient fixing force on a substrate, nevertheless a liquid crystal alignment layer, which is enough satisfactory, can not be provided by utilizing these techniques.

The inventors of the present invention, in Japanese Unexamined Patent Publication No. 3-7913, proposed a technique wherein an alignment layer with a coating thickness in nanometer order can be manufactured with a high productivity. The technique uses as an alignment layer a monomolecular film which is made by chemisorbing a silane-based chemical adsorbent (or called surface active agent) on a substrate plane. According to the technique, an extremely thin and transparent film in a state combined and fixed on a substrate can be formed easily and efficiently, and additionally, an alignment layer having a certain alignment control force over liquid crystal molecules can be provided without rubbing. However, the technique still leaves room for improving on the thermal stability of alignment, the strength of alignment control force and the like.

The present invention has been intended in response to the above-mentioned problems. A series of the present invention described below seeks to solve the above-mentioned problems at one effort. The purposes of a series of the present invention are: first, to provide a new chemical adsorbent which can form an extremely thin and transparent film in nanometer order which is fixed uniformly and firmly on a substrate, and give an alignment characteristic of high thermal stability to the thin film; secondly, to provide a liquid crystal alignment layer having a desirable alignment characteristic, a superior alignment control force over liquid crystal molecules, and a superior thermal stability by using the above-mentioned chemical adsorbent; thirdly, to provide a liquid crystal display device which is superior in a display performance by using the above-mentioned liquid crystal alignment layer; lastly, to provide a method of manufacturing each of the above-mentioned chemical adsorbent, liquid crystal alignment layer and liquid crystal display device with a high productivity.

Although a series of the present invention has been intended through a series of research and development which is closely relevant, each of a series of the present invention is described in different embodiments. Therefore, after a series of the present invention is divided into the first to sixth invention group, each group will be detailed below.

DISCLOSURE OF THE FIRST INVENTION GROUP

A chemical adsorbent in the first invention group is characterized by the following constitution.

(1) A chemical adsorbent consisting of a compound comprising a group of $CR^1CR^2CO$ and a functional group having Si in its chemical structure.

According to a compound having the above-mentioned composition, the functional group having Si functions as a chemisorbed group. Therefore, the compound can be chemically bonded (chemisorbed) through the functional group having Si on a substrate plane having such hydrophilic groups as OH group, COOH group, $NH_2$ group, NH group and SH group. Moreover, a vinyl group functions as a photoreactive group. Therefore, molecules can be crosslinked to each other through the vinyl group by irradiating.

A significance of using a chemical adsorbent having the above-mentioned composition as a material for a liquid crystal alignment layer is as follows. A thin film, which is formed by contacting the above-mentioned chemical adsorbent on a substrate and chemisorbing it, has a monolayer-like structure wherein a molecule, in which an end (a functional group having Si) in a direction of its major axis is bonded on the substrate plane and the other end is aligned in a direction opposite to the substrate, is arrayed in a lateral direction. The film is an extremely thin film in nanometer order, and transparent in a range of visible ray and chemically stable. Meanwhile, the film has a characteristic in which a photoreaction is caused in a vinyl group by irradiating a light in a range of ultraviolet rays. Therefore, after chemisorbing the above-mentioned chemical adsorbent on a substrate, it is possible to crosslink and connect component molecules to each other by irradiating ultraviolet rays, and thereby stabilize an alignment of the component molecules in a steric structure. In addition, if a polarized light is used in irradiating ultraviolet rays, it is possible to cause a crosslinking along a certain direction and thereby control an alignment direction of the component molecules by determining a polarized direction.

In a thin film wherein adsorbent molecules are arrayed in parallel with a substrate plane, a liquid crystal molecule can enter each gap (valley) between component molecules.

Therefore, a thin film wherein the component molecules are aligned in a certain direction has a particular alignment of a liquid crystal. Moreover, since each of the component molecules is involved in an alignment of a liquid crystal, the above-mentioned thin film indicates a strong alignment control force despite an extremely thin film. Furthermore, since a component molecule is connected to each other by crosslinking, an alignment is not deteriorated by an external stimulus such as heat and rubbing. In addition, since the film is extremely thin and transparent, and not an organic polymer film, it scarcely functions as an electrical resistance film. Therefore, the film has an extremely appropriate characteristic for a liquid crystal alignment layer, in which a light transmission and an electric field for driving a liquid crystal are not hindered.

Meanwhile, a conventional liquid crystal alignment layer (such as a polymer film made of the above-mentioned polyimide), which is composed closely in a state wherein a long main chain is tangled up, has difficulty in obtaining a sufficient alignment control force since only a surface of the film can contribute to an alignment of a liquid crystal. Moreover, in a conventional alignment layer for which an alignment is provided by rubbing, the alignment is changed or deteriorated by an external stimulus such as heat and rubbing. Furthermore, since such a polymer film as polyimide has a thick coating and a high electrical resistance, it is a hindrance factor to a light transmission and a liquid crystal driving.

In a chemical adsorbent having a chemical structure in which component molecules can not be crosslinked to each other, a monomolecular thin film can be formed; however, a stable alignment characteristic can not be obtained. For instance, since a chemical adsorbent, which is written in the above-mentioned Japanese Unexamined Patent Publication No. 3-7913, does not have a photoreactive group, adsorbent molecules can not be chemically connected to each other. Therefore, the problem is that an alignment is deteriorated by the heat of around 200.

A chemical adsorbent having the above-mentioned composition is extremely useful as a material for a liquid crystal alignment layer, and a use for the adsorbent is not limited to this. A use for a chemical adsorbent in other invention groups is not limited, either.

In the above-mentioned composition, it is preferable to add the components described below in (2) to (4). According to a composition to which the following components are added, an effect of the above-mentioned function can be actualized even more certainly. That is:

(2) In the above-mentioned composition, it is possible to make a functional group having Si a compound which is bonded to an end of CO in a group of —$CR^1$=$CR^2$—CO—. Each of $R^1$ and $R^2$ is a hydrogen, an alkyl group having 1 to 3 C or an alkoxy group having 1 to 3 C.

The groups of —$CH_3$, —$C_2H_5$ and —$C_3H_7$ can be cited as the above-mentioned alkyl group having 1 to 3 C, and the groups of —$OCH_3$, —$OC_2H_5$ and —$OC_3H_7$ can be cited as the above-mentioned alkoxy group having 1 to 3 C.

(3) It is possible to make the compound in the above-mentioned (2) a compound represented by the following Chemical Formula 1. In Chemical Formula 1, n is an integer of 1 to 14 inclusive, R is an alkyl group having 1 to 14 C or a phenyl group, X is a halogen, an alkoxyl group or an isocyanato group, m is an integer of 1 to 3 inclusive and A is a functional group.

[Chemical Formula 1]

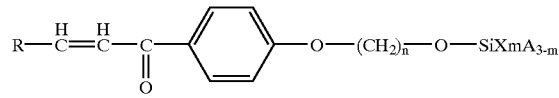

(4) It is possible to make the compound in the above-mentioned (2) a compound represented by the following Chemical Formula 2, Chemical Formula 3 or Chemical Formula 4. In the following Chemical Formulae 2 to 4, n is an integer of 1 to 14 inclusive, R is an alkyl group having 1 to 14 C or a phenyl group, X is a halogen, an alkoxyl group or an isocyanato group, m is an integer of 1 to 3 inclusive (an integer of 1, 2 only in Chemical Formula 4) and A is a functional group.

[Chemical Formula 2]

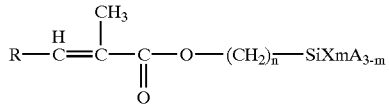

[Chemical Formula 3]

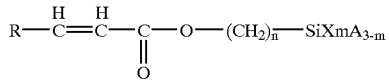

[Chemical Formula 4]

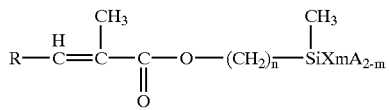

A liquid crystal alignment layer in the first invention group, which is formed by using the above-mentioned chemical adsorbent, is characterized by the following constitution.

(5) A liquid crystal alignment layer wherein liquid crystal molecules can be aligned in a particular direction, a chemical adsorbent comprising a group of —$CR^1$—$CR^2$—CO— and a functional group having Si in its chemical structure is bonded and fixed directly or with an interposition of a different substance layer on a substrate surface through Si, and an adjacent component molecule is crosslinked to each other through at least one bond of a double bond of C=C in the group of —$CR^1$—$CR^2$—CO—.

(6) A liquid crystal alignment layer wherein liquid crystal molecules can be aligned in a particular direction, consisting of a compound comprising a chemical bond unit represented by the following Chemical Formula 5, Chemical Formula 6, Chemical Formula 7 or Chemical Formula 8. In the following Chemical Formulae 5 to 8, n is an integer of 1 to 14 inclusive and R is an alkyl group having 1 to 14 C or a phenyl group.

Since this composition comprises a chemical bond unit represented by the following Chemical Formulae 5 to 8, an alignment function on liquid crystal molecules is large, and particularly, a function of aligning a twisted nematic (TN) type liquid crystal is large. Therefore, a liquid crystal alignment layer having this composition can be used appropriately as a liquid crystal alignment layer for a liquid crystal display device in a TN mode.

[Chemical Formula 5]

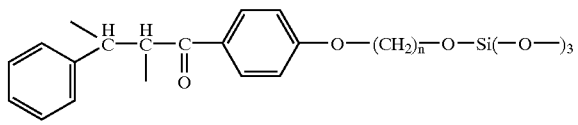

[Chemical Formula 6]

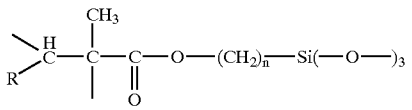

[Chemical Formula 7]

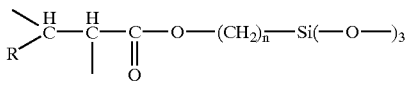

[Chemical Formula 8]

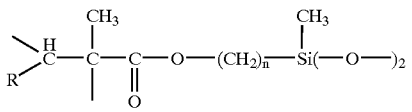

The following constitutions can be adopted as a method of manufacturing a liquid crystal alignment layer having the above-mentioned composition.

(7) A method of manufacturing a liquid crystal alignment layer comprising the steps of producing a chemisorption solution by dissolving a silane-based chemical adsorbent comprising a group of —$CR^1$=$CR^2$—CO— and a functional group having Si in a nonaqueous solvent; forming a monomolecular thin film which is made of the above-mentioned silane-based chemical adsorbent on a substrate plane by contacting the above-mentioned silane-based chemisorption solution on the substrate plane, and chemisorbing it on the substrate plane; and photopolymerizing adsorbent molecules to each other at a double bond of C=C in the group of —$CR^1$=$CR^2$—CO— by irradiating an ultraviolet ray or a far-ultraviolet ray on the above-mentioned thin film plane.

(8) In the above-mentioned composition, it is possible, between the above-mentioned steps of forming a thin film and photopolymerizing, to provide a step of treating a provisional alignment of molecules composing the thin film by drain-drying an organic solvent in a certain direction after contacting the above-mentioned organic solvent on the thin film plane.

According to this composition, an alignment of a liquid crystal can be provided to some extent.

(9) It is possible, between the above-mentioned steps of forming a thin film and photopolymerizing, to provide the steps of washing the thin film plane with a nonaqueous solvent to remove the chemical adsorbent which is not yet adsorbed; and aligning provisionally an alignment direction of molecules of the silane-based chemical adsorbent which is chemisorbed on the substrate plane by drain-drying the nonaqueous solvent remaining on the substrate plane while setting up the substrate through washing in a certain direction.

According to this composition, a liquid crystal alignment layer, which is made of a monomolecular thin film with a more stable alignment function, can be provided.

(10) It is possible to execute an irradiation of the ultraviolet ray or the far-ultraviolet ray in the above-mentioned step of photopolymerizing through a polarizer, a transparent plate having a multitude of grooves of 0.1 to 0.3 µm in width on its surface or a transparent plate on which rubbing is executed.

According to this composition, a direction of photopolymerizing can be controlled in a polarized direction, a groove direction or a rubbing direction.

(11) It is possible to execute an irradiation of the ultraviolet ray or the far-ultraviolet ray in the above-mentioned step of photopolymerizing through a patterned mask which is put further on a polarizer, a transparent plate having a multitude of grooves of 0.1 to 0.3 µm in width on its surface or a transparent plate on which rubbing is executed, and thereby control a direction of a chemical bond between chemisorbed molecules and change an alignment direction of adsorbent molecules in each patterned irradiation area.

In this composition, a liquid crystal alignment layer in a multidomain alignment, wherein a plurality of small sections into which a pixel is divided differ from each other in a liquid crystal alignment direction, can be manufactured by executing a light irradiation more than once, such as changing a polarized direction.

(12) In the above-mentioned step of producing a chemisorption solution, it is possible to use a multicomponent chemisorption solution wherein a first silane-based chemical adsorbent and a second silane-based chemical adsorbent, which differs from the first silane-based chemical adsorbent in a molecular length, are mixed at a predetermined ratio.

According to this composition, a degree of photopolymerization of the first silane-based chemical adsorbent and/or the second silane-based chemical adsorbent can be changed by changing a mixture ratio. Moreover, an inclination of longer adsorbent molecules to a substrate can be controlled with shorter adsorbent molecules by determining a mixture ratio properly. Furthermore, since it is possible to change a density of a polymerizable group, a degree of photopolymerization can be controlled.

(13) In the above-mentioned (12), it is possible, between the above-mentioned steps of forming a thin film and photopolymerizing, to provide a step of treating a provisional alignment of molecules composing the thin film by drain-drying a nonaqueous solvent in a certain direction after contacting the above-mentioned nonaqueous solvent on the thin film plane.

According to this composition in which a light is irradiated after aligning an adsorbent molecule provisionally, a particular alignment characteristic of a liquid crystal can be provided even more certainly.

(14) In the above-mentioned (12), it is possible, between the above-mentioned steps of forming a thin film and photopolymerizing, to provide the steps of washing the thin film plane with a nonaqueous solvent to remove the chemical adsorbent which is not yet adsorbed; and aligning provisionally an alignment direction of molecules of the silane-based chemical adsorbent which is chemisorbed on the substrate plane by drain-drying the nonaqueous solvent remaining on the substrate plane while setting up the substrate through washing in a certain direction.

According to this composition, through a series of operations of washing and drying, the chemical adsorbent which is not yet adsorbed can be removed as well as the adsorbent molecules can be aligned provisionally.

(15) In the above-mentioned (12), it is possible to execute an irradiation of the ultraviolet ray or the far-ultraviolet ray in the above-mentioned step of photopolymerizing through a polarizer, a transparent plate having a multitude of grooves of 0.1 to 0.3 μm in width on its surface or a transparent plate on which rubbing is executed.

(16) In the above-mentioned (12), it is possible to execute an irradiation of the ultraviolet ray or the far-ultraviolet ray in the above-mentioned step of photopolymerizing through a patterned mask which is put further on a polarizer, a transparent plate having a multitude of grooves of 0.1 to 0.3 μm in width on its surface or a transparent plate on which rubbing is executed, and thereby control a direction of a chemical bond between chemisorbed molecules and change an alignment direction of adsorbent molecules in each patterned irradiation area.

A liquid crystal display device in the first invention group, which is formed by using a liquid crystal alignment layer having the above-mentioned composition, can be composed as described below.

(17) A liquid crystal display device comprising, at least, two opposite substrates with an electrode on an inside plane, a liquid crystal alignment layer which is formed on an inside plane of at least one of the above-mentioned opposite substrates, and a liquid crystal which is received into a gap between the above-mentioned opposite substrates, wherein the above-mentioned liquid crystal alignment layer is a monomolecular thin film which is formed by chemisorbing a chemical adsorbent directly or through a different substance layer on the above-mentioned substrate plane, and adsorbent molecules are crosslinked to each other along a particular direction.

Since a rubbingless liquid crystal alignment layer, which is low in a deterioration of an alignment, is used in this composition, a liquid crystal display device with a high reliability can be provided.

(17-1) A liquid crystal display device of an in-plane switching (IPS) type in which an electrode and an opposite electrode are formed on the same substrate, wherein the above-mentioned liquid crystal alignment layer is a monomolecular thin film which is formed by chemisorbing a chemical adsorbent directly or through a different substance layer on the above-mentioned substrate plane, and adsorbent molecules are crosslinked to each other along a particular direction.

Since a rubbingless liquid crystal alignment layer, which is low in a deterioration of an alignment, is used in this composition, a liquid crystal display device in an in-plane switching (IPS) mode can be provided with a high productivity.

(18) In the above-mentioned (17) and (17-1), the chemical adsorbent comprises a group of —$CR^1$=$CR^2$—CO— and a functional group having Si, and the above-mentioned adsorbent molecules are crosslinked to each other at a double bond of C=C in the group of —$CR^1$=$CR^2$—CO—.

(19) In the above-mentioned (18), the thin film has a different liquid crystal alignment control direction at each of a plurality of small patterned sections into which a pixel unit is divided.

The following constitutions can be adopted as a method of manufacturing a liquid crystal display device having the above-mentioned composition.

(20) A method of manufacturing a liquid crystal display device comprising the steps of producing a chemisorption solution by dissolving a silane-based chemical adsorbent comprising a carbon chain as well as a group of —$CR^1$=$CR^2$—CO— and a functional group having Si at an end of or inside the above-mentioned carbon chain in a nonaqueous solvent; forming a monomolecular thin film by contacting the above-mentioned chemisorption solution on a first substrate with at least a group of electrodes in a matrix, and chemisorbing the chemical adsorbent on the above-mentioned substrate plane at the functional group having Si; aligning adsorbent molecules provisionally by drain-drying the nonaqueous solvent for washing while setting up the above-mentioned substrate in a certain direction after washing the above-mentioned thin film with a nonaqueous solvent; providing an alignment characteristic by means of producing the first substrate with a liquid crystal alignment layer having a particular alignment characteristic by irradiating an ultraviolet ray or a far-ultraviolet ray on the provisionally aligned thin film, and crosslinking the adsorbent molecules to each other in a particular direction through a photopolymerization; producing an empty cell by sticking and fixing a periphery of the substrates after joining through the electrode plane with a predetermined gap the above-mentioned first substrate with a liquid crystal alignment layer as well as an opposite substrate or a second substrate with a liquid crystal alignment layer having an opposite electrode, which is produced like the above-mentioned first substrate with a liquid crystal alignment layer; and injecting a liquid crystal into the above-mentioned empty cell.

(21) It is possible to adopt a method of exposing through a patterned mask which is put on a polarizer in irradiating the ultraviolet ray or the far-ultraviolet ray in the above-mentioned step of providing an alignment characteristic.

According to this method, a controlled direction of a liquid crystal alignment can be changed at each of a plurality of small patterned sections into which a pixel unit is divided by controlling a crosslinking direction of the adsorbent molecules.

BRIEF DESCRIPTION OF THE DRAWINGS OF THE FIRST INVENTION GROUP

the above-mentioned chlorosilane-based chemical adsorbent and a hydroxyl group on the above-mentioned substrate surface, and a bond represented by the following Chemical Formula 12 was produced, and additionally, a bond represented by the following Chemical Formula 13 was produced by reacting with humidity in an atmosphere.

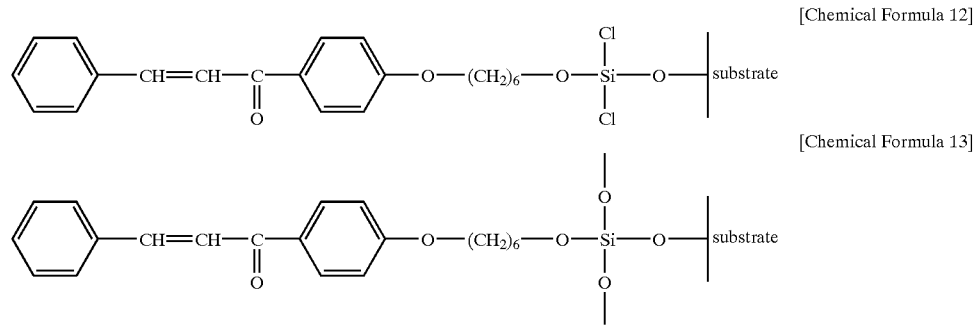

[Chemical Formula 12]

[Chemical Formula 13]

DETAILED DESCRIPTION OF THE PREFERRED EMBODIMENTS OF THE FIRST INVENTION GROUP

The first invention group is detailed based on embodiments below.

(Embodiment 1)

Embodiment 1 of the present invention is described below referring to FIG. 1 to 6.

Figure 1:
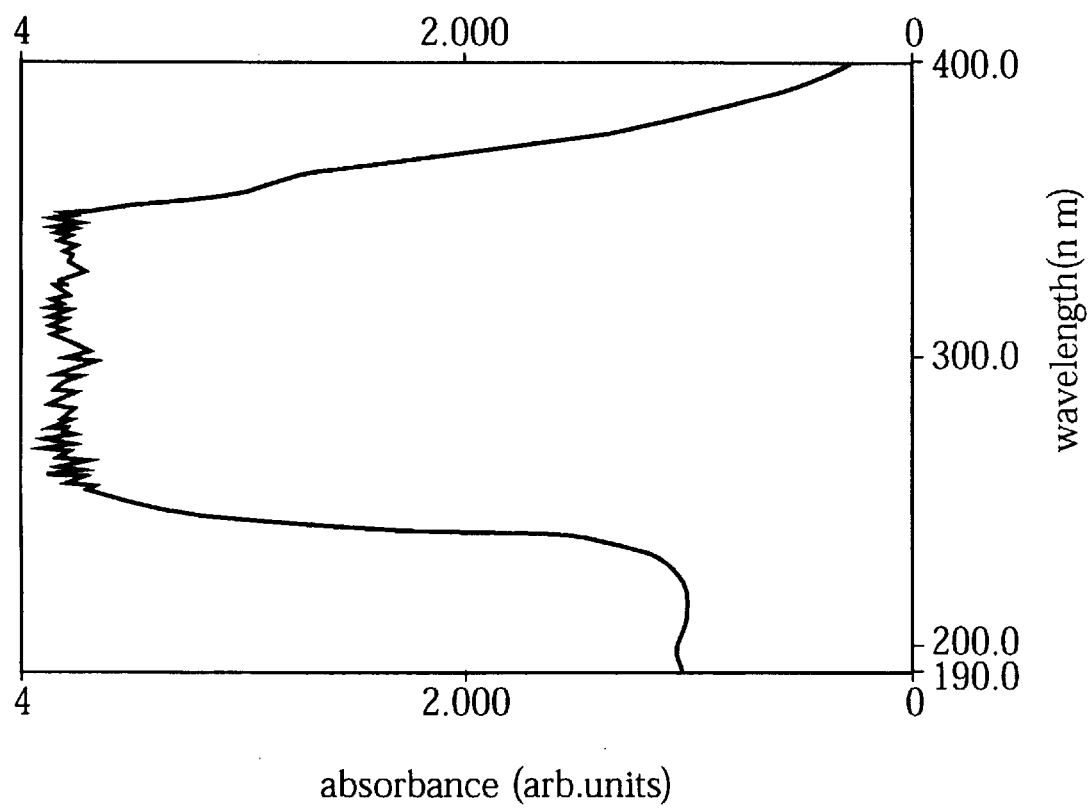
FIG. 1 is a view showing an ultraviolet absorption spectrum of a chlorosilane-based chemical adsorbent (represented by Chemical Formula 11) which is used in Embodiment 1.

A glass substrate 1 (including a multitude of hydroxyl groups on its surface) with a transparent electrode on its surface was prepared, and washed and degreased sufficiently beforehand. Next, a chemisorption solution was produced by dissolving a compound represented by the following Chemical Formula 11 (this adsorbent has a photosensitive peak in a range from 240 to 370 nm as shown in FIG. 1), as a chlorosilane-based chemical adsorbent comprising a carbon chain as well as a group represented by the following Chemical Formula 9 and Si at an end of or inside the above-mentioned carbon chain, in a nonaqueous solvent at a concentration of approximately 1 wt. %.

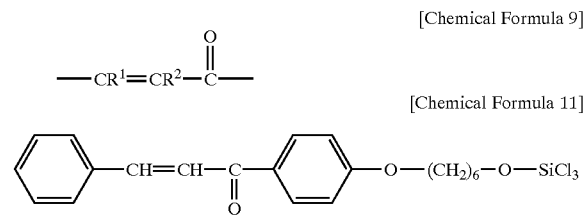

[Chemical Formula 9]

[Chemical Formula 11]

Figure 2:
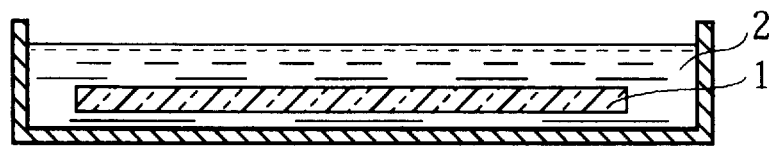
FIG. 2 is a conceptional view of a cross section for describing the step of chemisorbing which is used for manufacturing a monomolecular liquid crystal alignment layer in Embodiment 1.
Figures 1, 2:
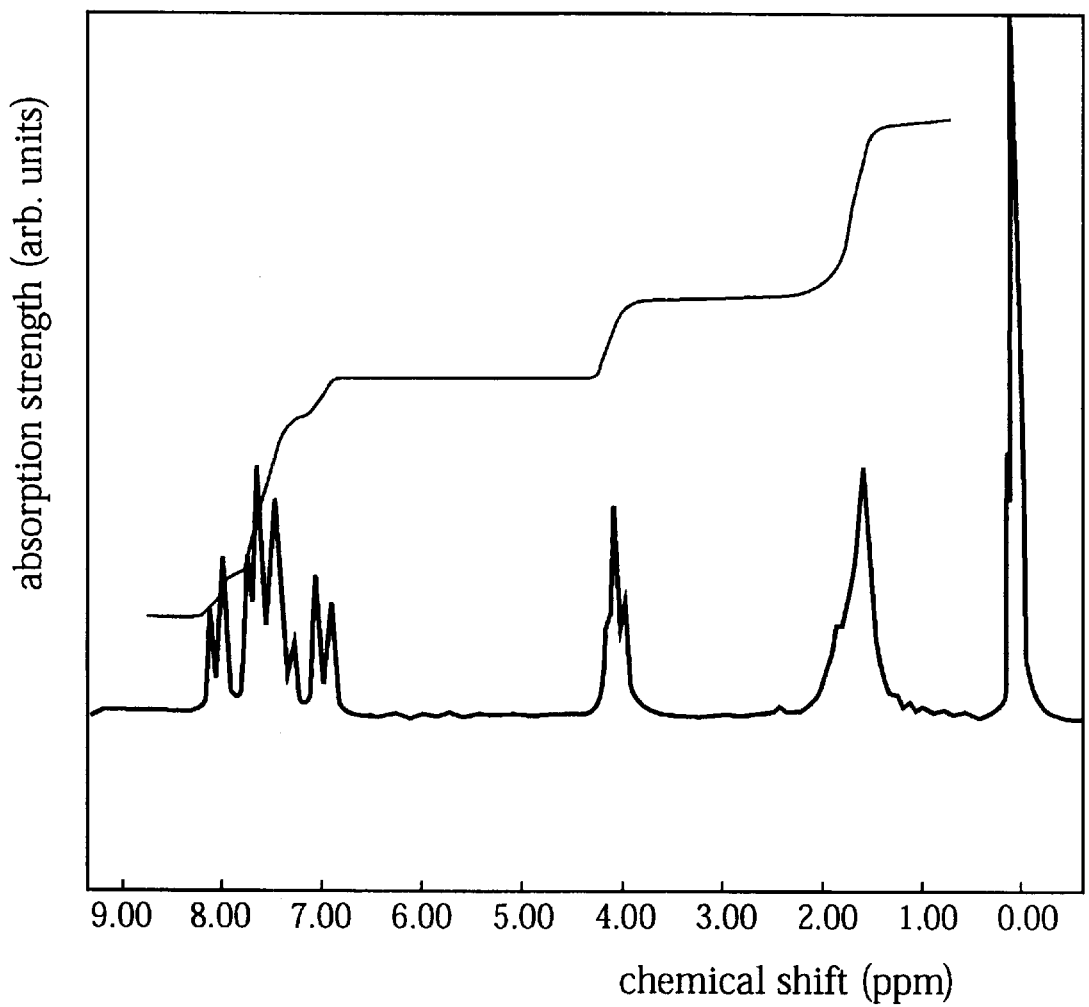
Figure 2:
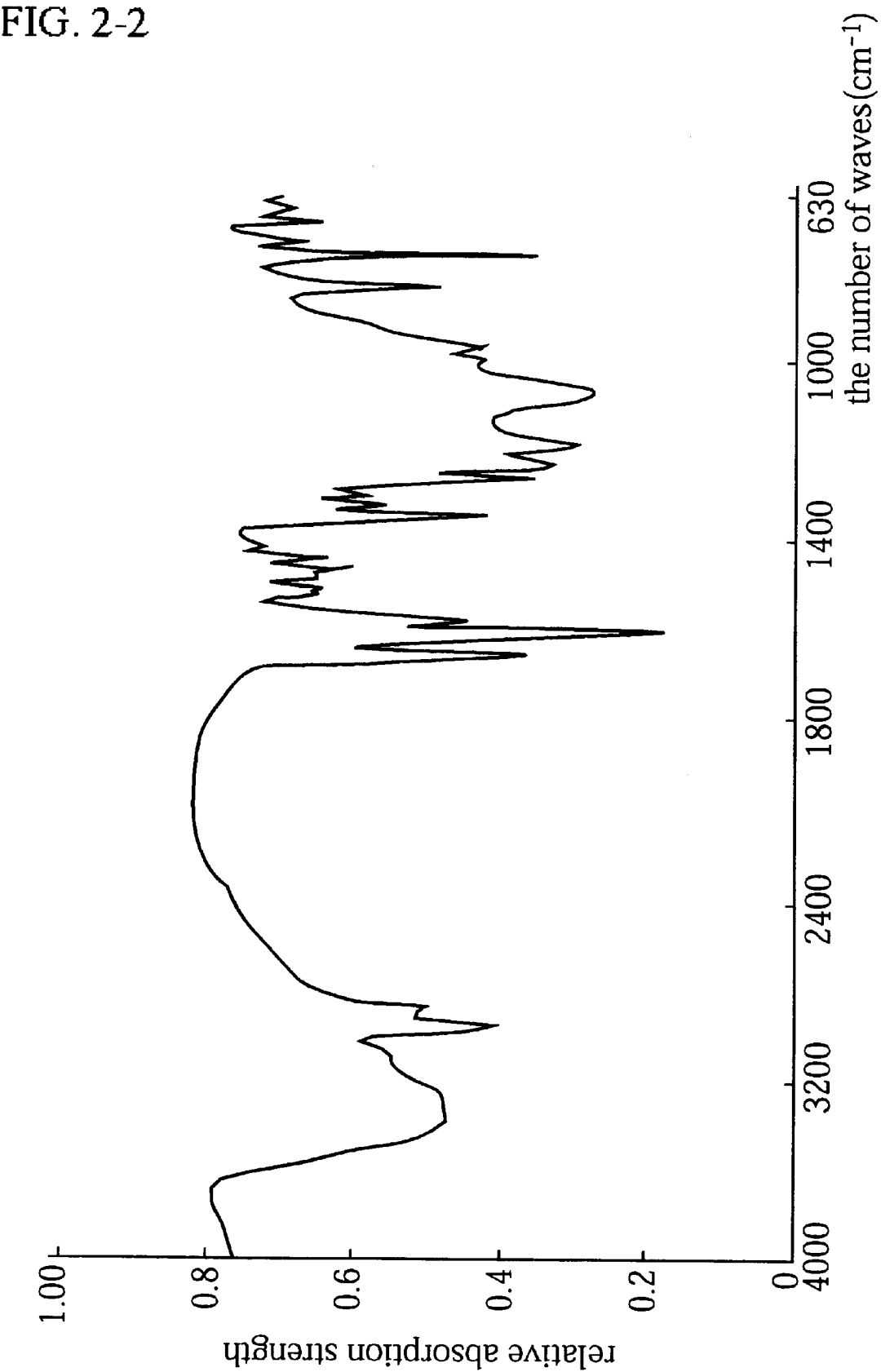
Figures 2, 3:
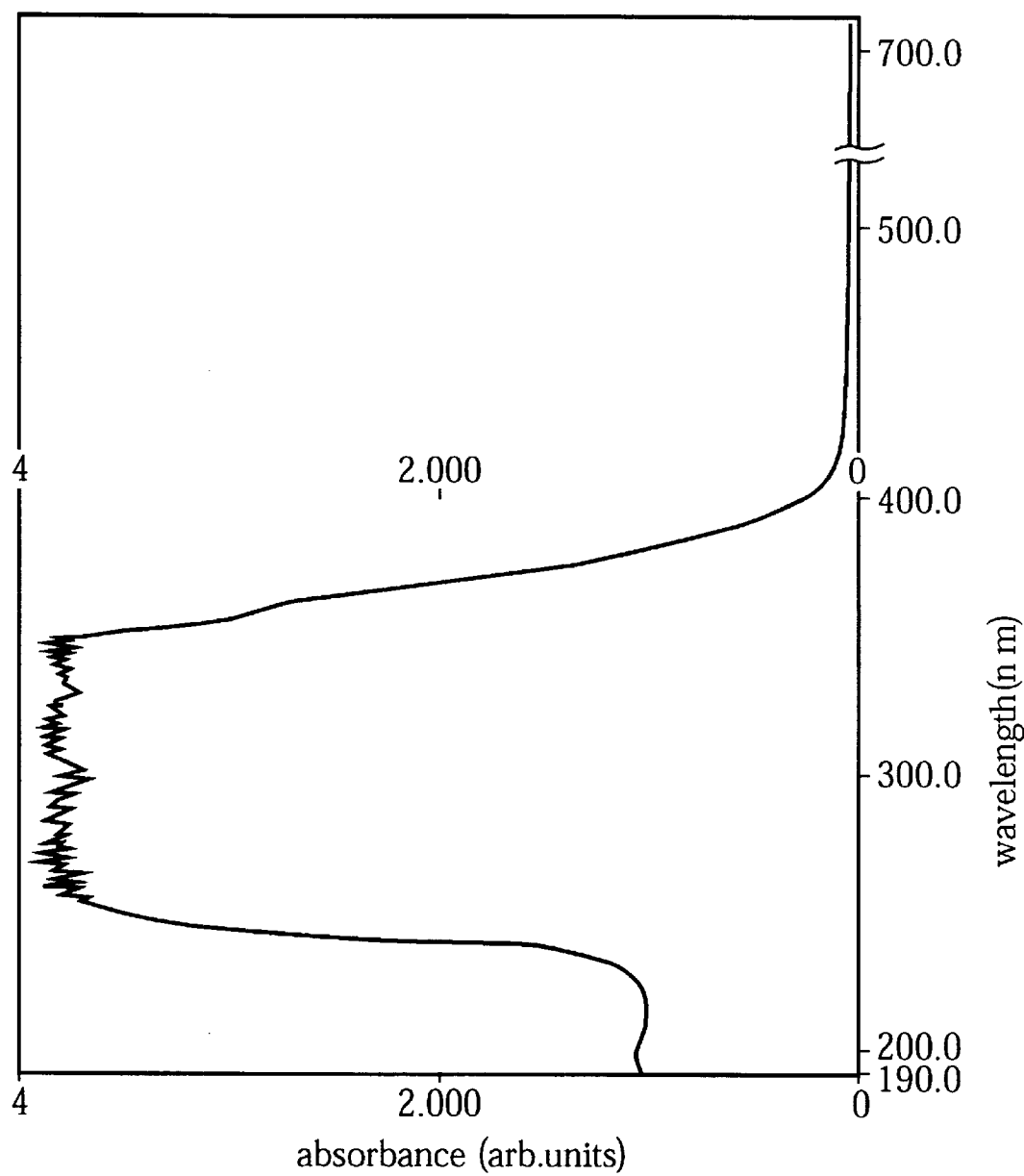
FIG. 3 is a conceptional view of a cross section for describing the step of washing a thin film in Embodiment 1.

In Embodiment 1, well-dehydrated hexadecane was used as the nonaqueous solvent. A solution thus produced was made an adsorption solution 2, and the above-mentioned substrate 1 was immersed (or may be applied) in the adsorption solution 2 in a dry atmosphere (a relative humidity of 30% or less) for approximately an hour (FIG. 2). Later, after pulling up the substrate 1 out of the adsorption solution 2 and washing the substrate 1 with well-dehydrated n-hexane 3 as a nonaqueous solvent, the substrate 1 was pulled up out of a washing solution while setting up the substrate 1 in a desired direction and the washing solution was drained and the substrate 1 was exposed to an atmosphere including humidity (FIG. 3). Through a series of the above-mentioned steps, a reaction of eliminating hydrochloric acid was caused between a group of silicon chloride in Then, furthermore, the above-mentioned fixed molecules can be aligned primarily by washing the substrate 1 with such nonaqueous organic solvents as n-hexane and chloroform and draining while setting up the substrate 1 in a desired direction.

Figures 2, 3, 4:
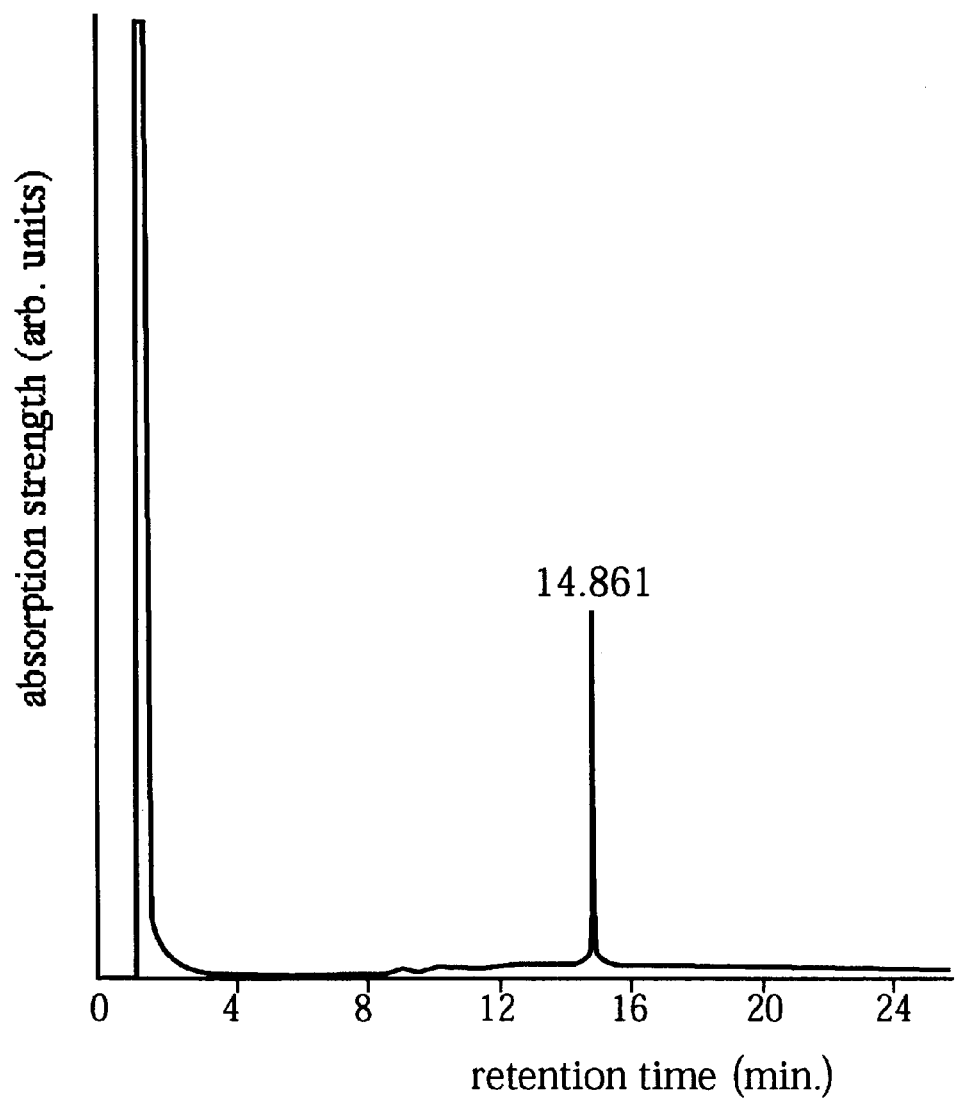
FIG. 4 is a conceptional view of an enlarged cross section to a molecule level for describing an alignment state of adsorbent molecules composing a thin film in a monolayer after washing with a solvent in Embodiment 1.
Figure 3:
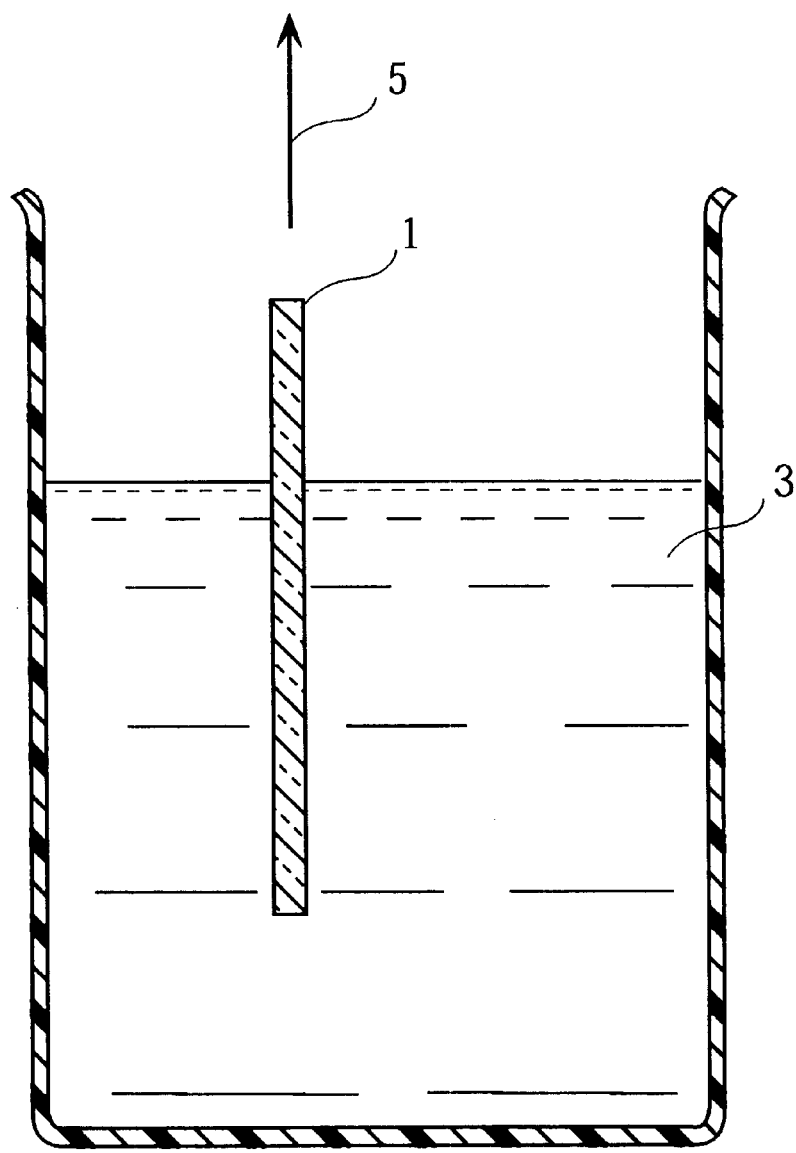
Figures 1, 3:
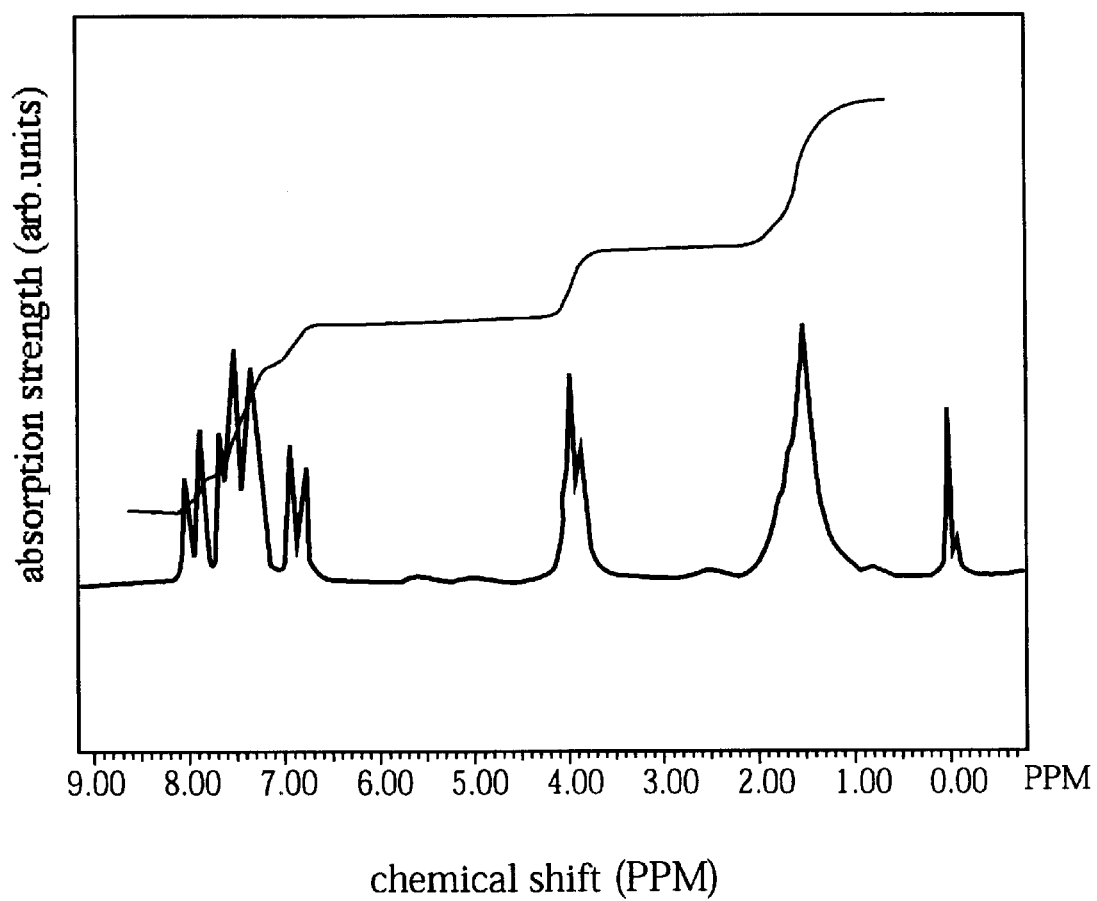
Figures 2, 3:
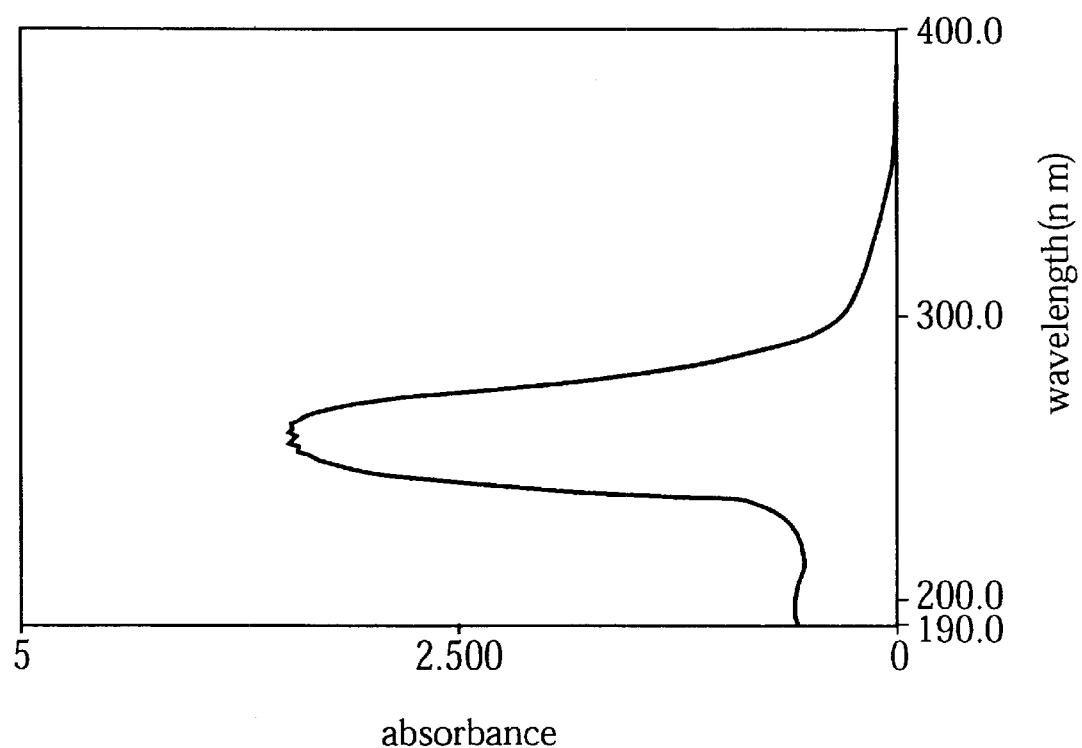

By means of the above treatment, a chemisorbed monomolecular film 4 which is formed by a reaction between the above-mentioned chemical adsorbent and the substrate was chemically bonded to an area including a hydroxyl group on the substrate surface through a covalent bond of siloxane, and the bonded molecules were formed with a coating thickness of approximately 2 nm in an alignment state in a direction opposite to a direction 5 of draining and pulling up (FIG. 4).

Later, furthermore, a polarizer (HNP'B) 7 (made by POLAROID Corp.) as put on two kinds of substrates in this state so that a polarized direction 6 was in approximately parallel with the direction 5 of draining and pulling up, and an ultraviolet ray 8 of 100 mJ with a wavelength of 365 nm (i-line) was irradiated (2.6 mW/cm$^2$, after transmitting a polarized film) by using an extra-high-pressure mercury-vapor lamp of 500W (FIGS. 5, 9 indicates a transparent electrode in the Figure).

Later, when an anisotropy of adsorbent molecules was examined with FT-IR, the above-mentioned photosensitive group was photopolymerized and thereby the absorption peak of a vinyl group did not appear. That is, a bond represented by the following Chemical Formula 14 was produced.

[Chemical Formula 14]

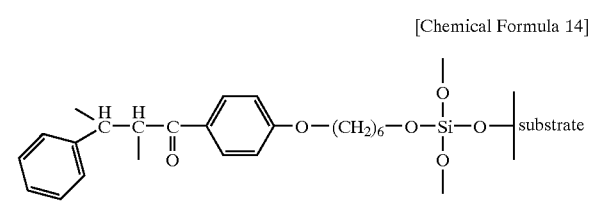

Although a direction of a bond was not clear, the polarized direction differed from a vertical direction to the polarized direction in an absorption of a vinyl group. This indicates that a substance composing the above-mentioned monomolecular film is bonded and fixed on the above-mentioned substrate surface, and crosslinked or photopolymerized at the photosensitive group (a vinyl group) in FIG. 6 along a predetermined direction.

Moreover, two substrates in this state were combined through a chemisorbed film so that polarized directions were parallel and drain directions were opposite, namely, antiparallel, and a liquid crystal cell with a gap of 20 μm was constructed, and a nematic liquid crystal (ZLI4792; made by Merck & Co., Inc.) was injected, and an alignment state was examined.

The injected liquid crystal molecules were aligned at an pretilt angle of approximately 2.5° with the substrate along a direction at an angle of 90° with the polarized direction.

Then, it is necessary that the direction 5 of draining and pulling up crosses the polarized direction 6 at an angle of not completely 90° but with a little shift from 90°, preferably more than some degrees in order to make an alignment direction of adsorbent molecules in an irradiated area the same direction. In this case, the polarized direction 6 may be in parallel with the direction 5 of draining and pulling up at the maximum. If the direction 5 of draining and pulling up crosses the polarized direction 6 at an angle of completely 90°, each molecule is occasionally aligned in two directions.

When an ultraviolet ray of 100 to 200 mJ with a wavelength of 365 nm was irradiated through a patterned mask on a polarizer in order to change an alignment direction selectively, an alignment direction changed only in an irradiated area and it was possible to provide a plurality of parts in which an alignment direction differs in a pattern on the same alignment layer, namely, a liquid crystal is aligned along each of the direction 5 of draining and pulling up and the polarized direction 6. Moreover, it was possible to manufacture extremely easily a monomolecular liquid crystal alignment layer having a plurality of alignment directions which differ in a pattern by executing the step of exposing through a desired mask on a polarizer on the same condition a plurality of times. That is, it was possible to provide a liquid crystal display device wherein a pixel is in a multi-domain alignment.

In Embodiment 1, hydrocarbon-based n-hexane comprising an alkyl group was used as a nonaqueous solvent for washing, and any nonaqueous solvent that dissolves a chemical adsorbent can be used besides this solvent. For instance, it was possible to use a solvent comprising the groups of fluorocarbon, carbon chloride or siloxane such as Freon 113, chloroform and hexamethyldisiloxane.

An effect of aligning a twisted nematic liquid crystal is particularly great in a liquid crystal alignment layer comprising a chemical bond unit represented by the following Chemical Formula 15 as Embodiment 1, and besides Chemical Formula 15, a substance represented by the following Chemical Formula 16 was similarly applicable to a substance for forming a film.

[Chemical Formula 15]

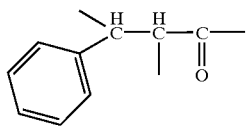

[Chemical Formula 16]

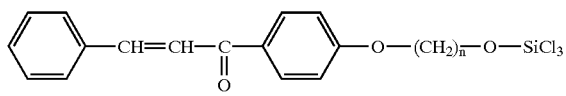

(In the Formulae, n is an integer of 1 to 14 inclusive.)

Then, a solvent comprising the groups of alkyl, fluorocarbon, carbon chloride or siloxane was applicable to a nonaqueous organic solvent for producing a chemisorption solution.

(Embodiment 2)

Figure 4:
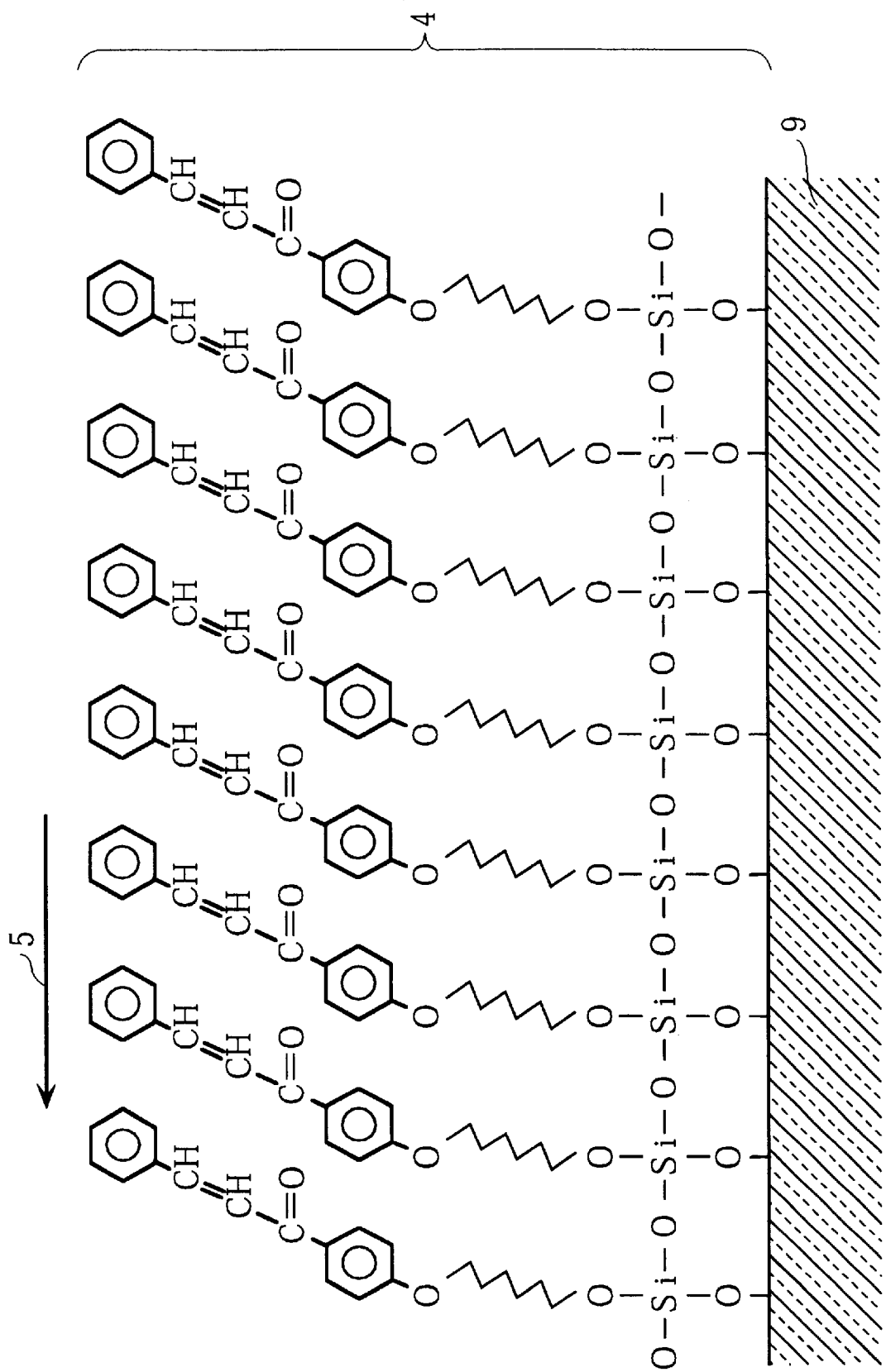
Figures 1, 4:
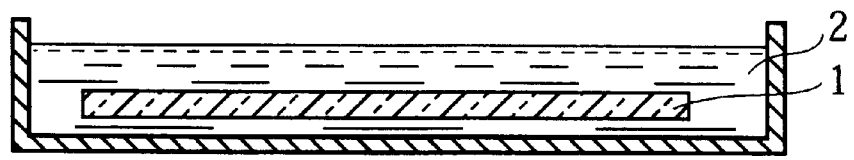
Figures 2, 4:
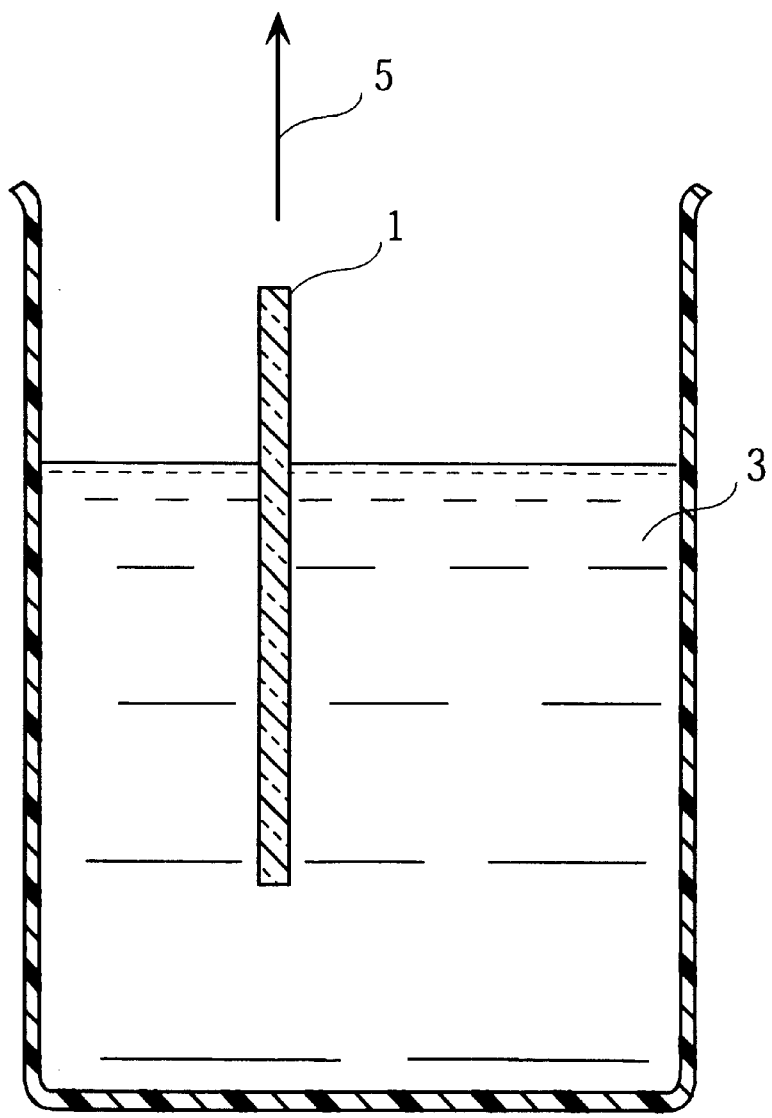
Figures 3, 4:
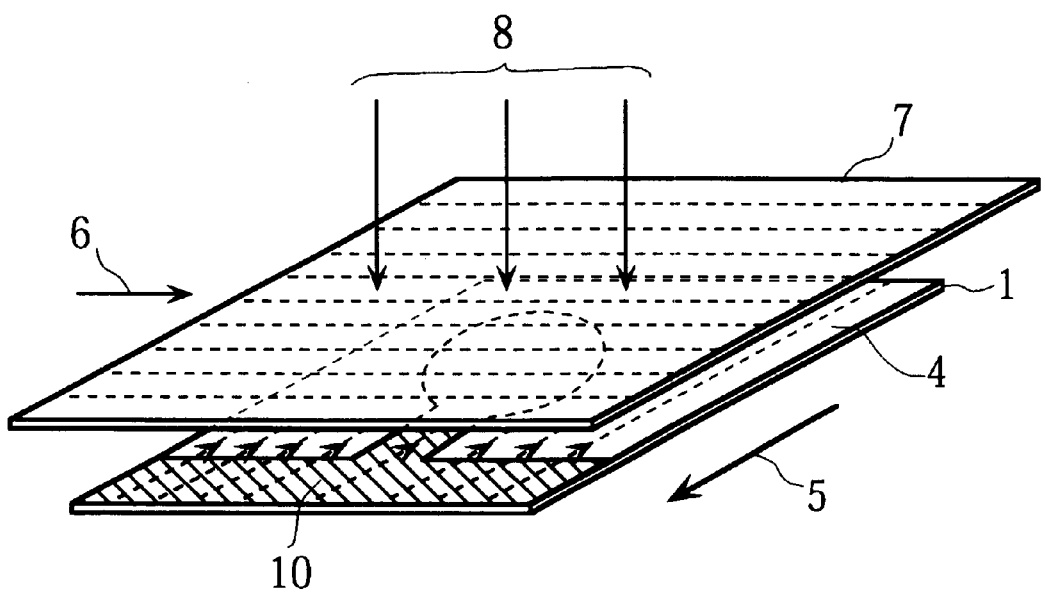
Figure 4:
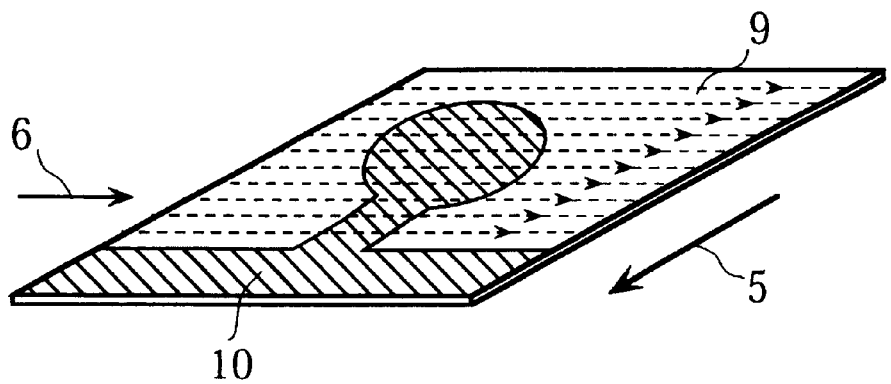
Figures 4, 5:
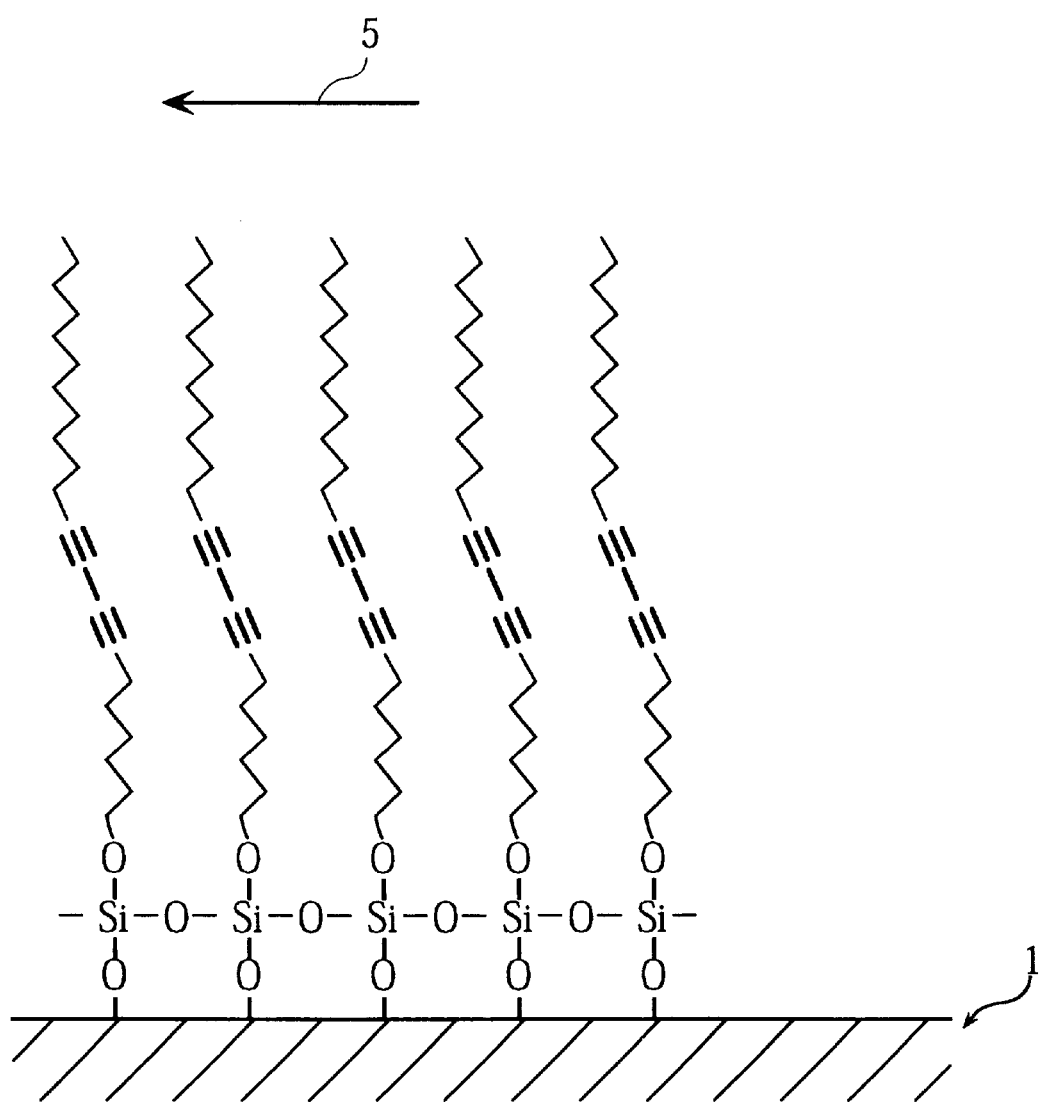
FIG. 5 is a conceptional view of the step of exposing which is used for polymerizing an adsorbent molecule to each other by polarized exposure in Embodiment 1.
Figures 4, 5, 6:
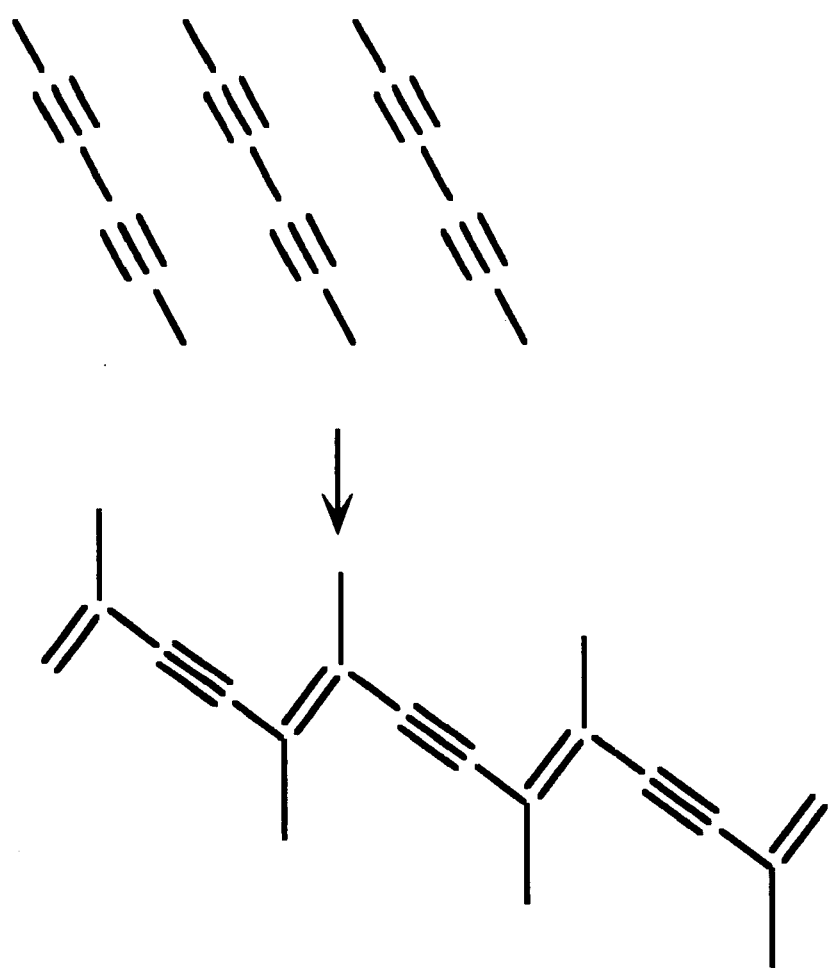
FIG. 6 is a conceptional view of an enlarged thin film to a molecule level for describing a polymerization state of molecules in a thin film after polarized exposure in Embodiment 1.
Figures 4, 5, 6, 7:
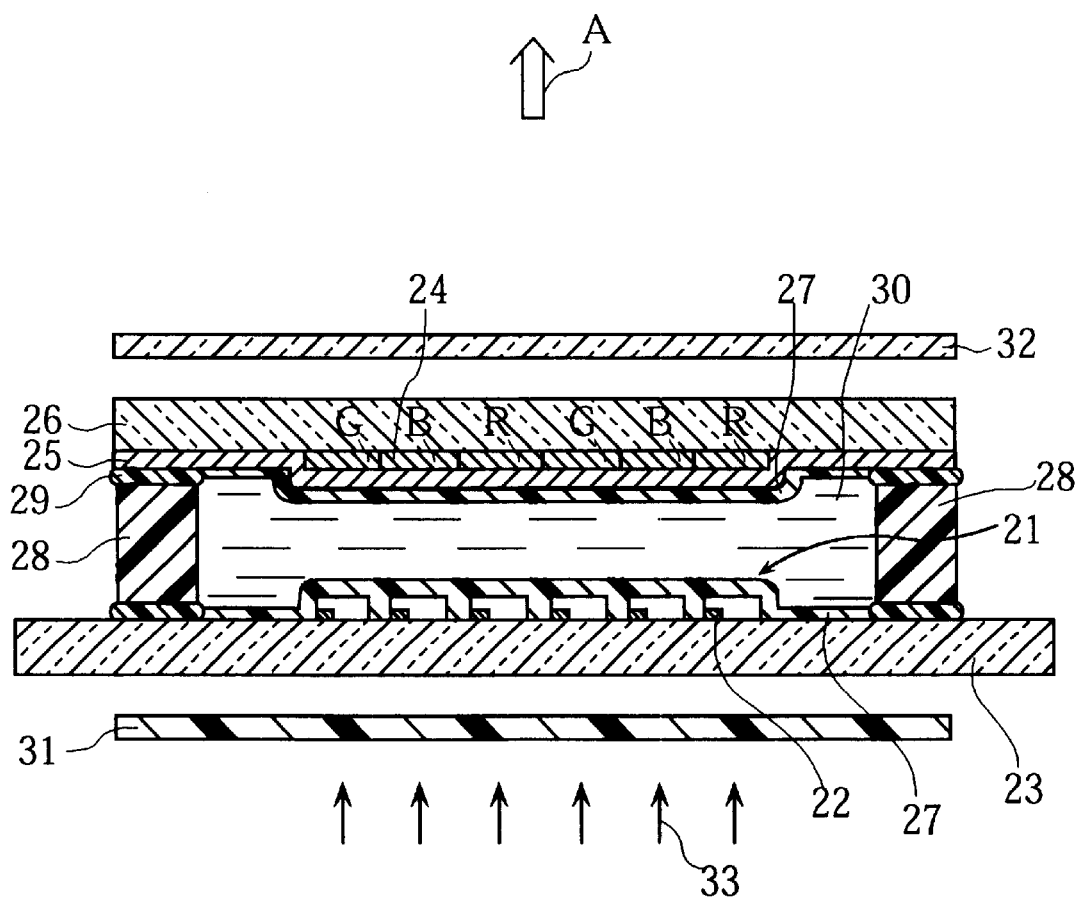
FIG. 7 is a view showing an ultraviolet absorption spectrum of a chlorosilane-based chemical adsorbent (represented by Chemical Formula 17) which is used in Embodiment 2.
Figure 5:
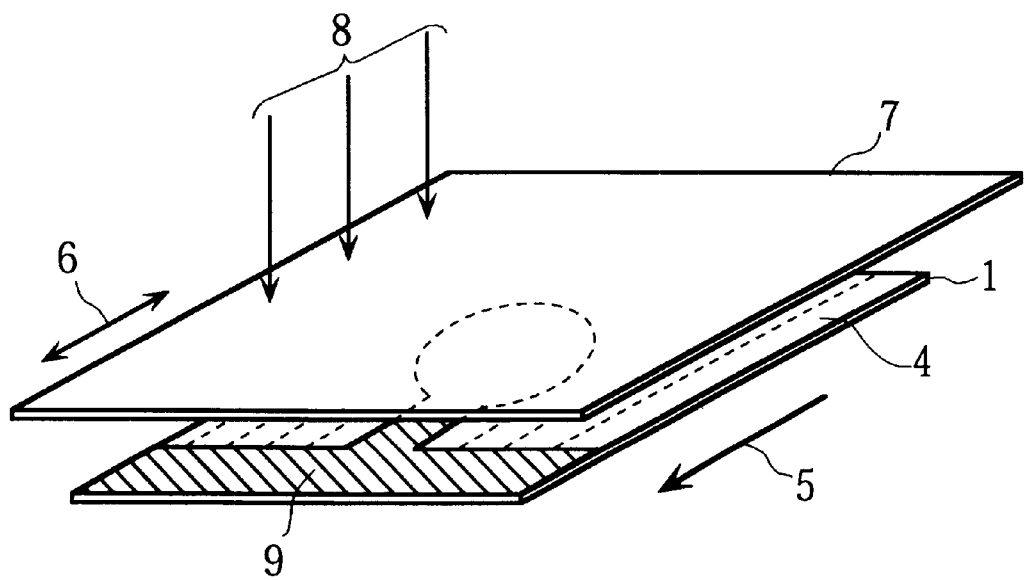
Figures 1, 5:
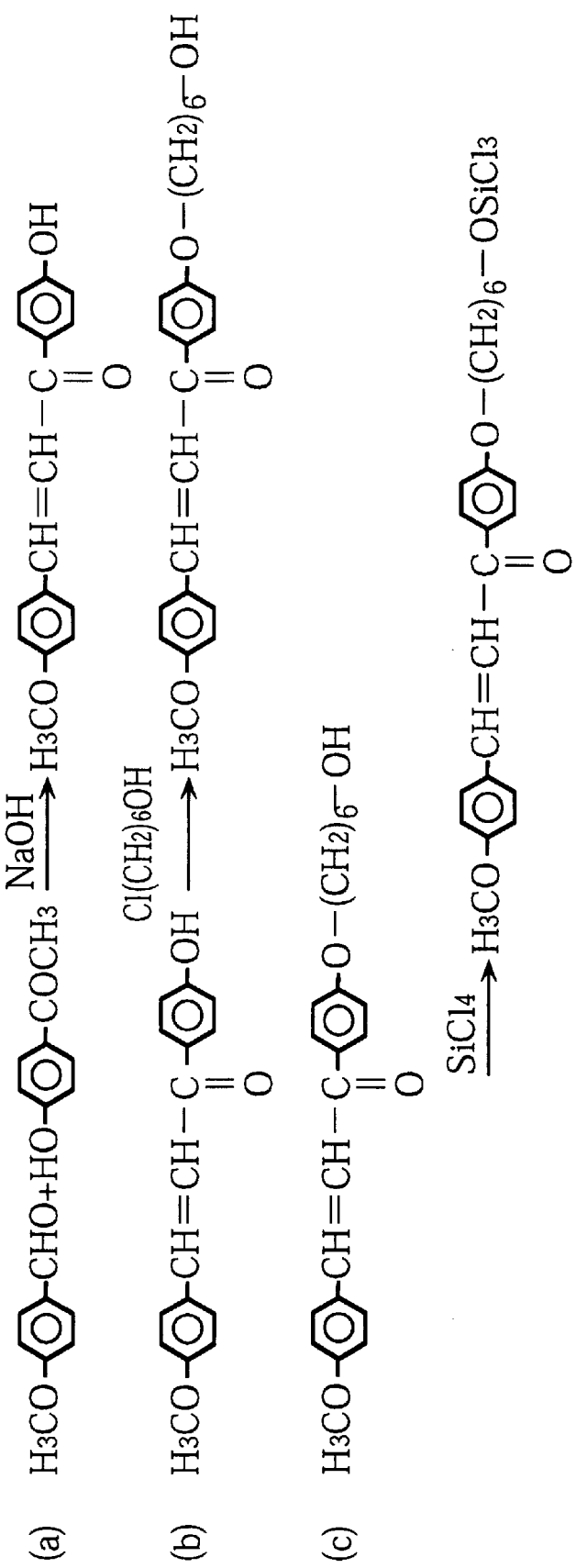
Figures 2, 5:
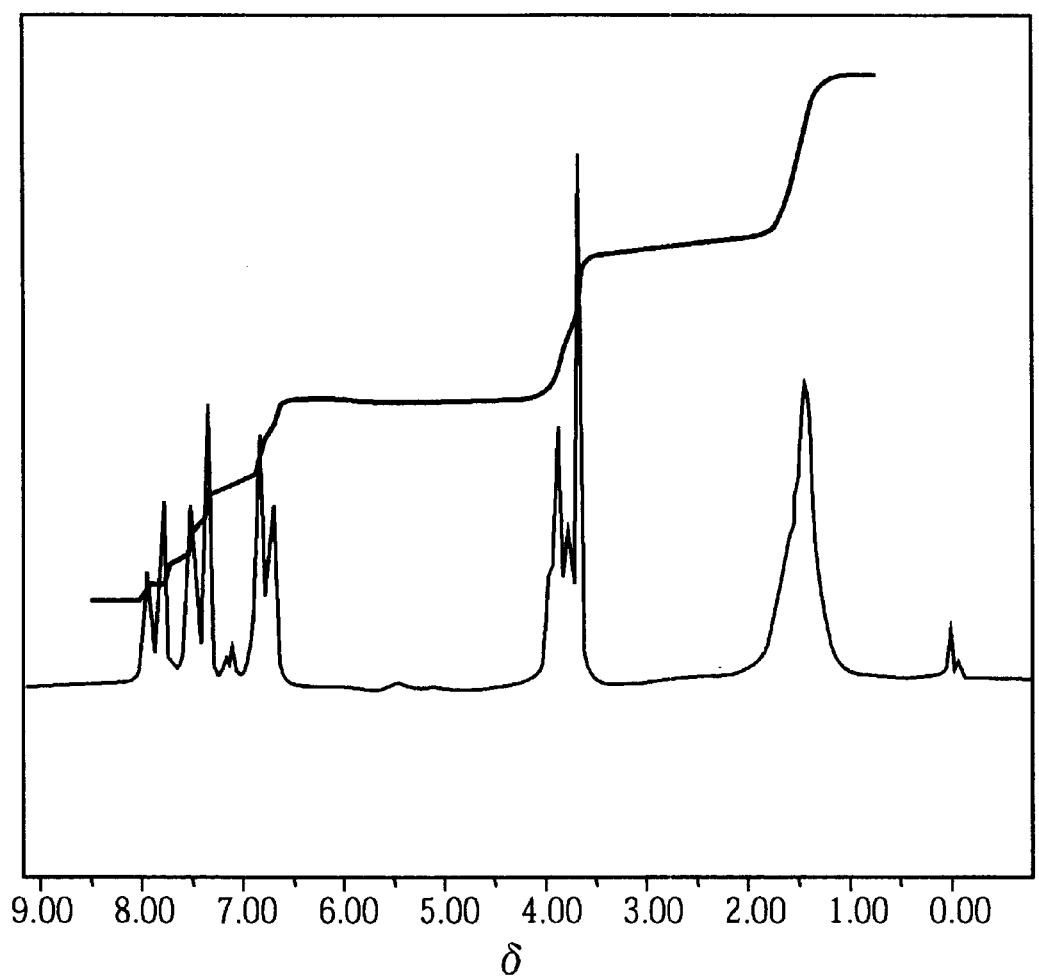
Figures 3, 5:
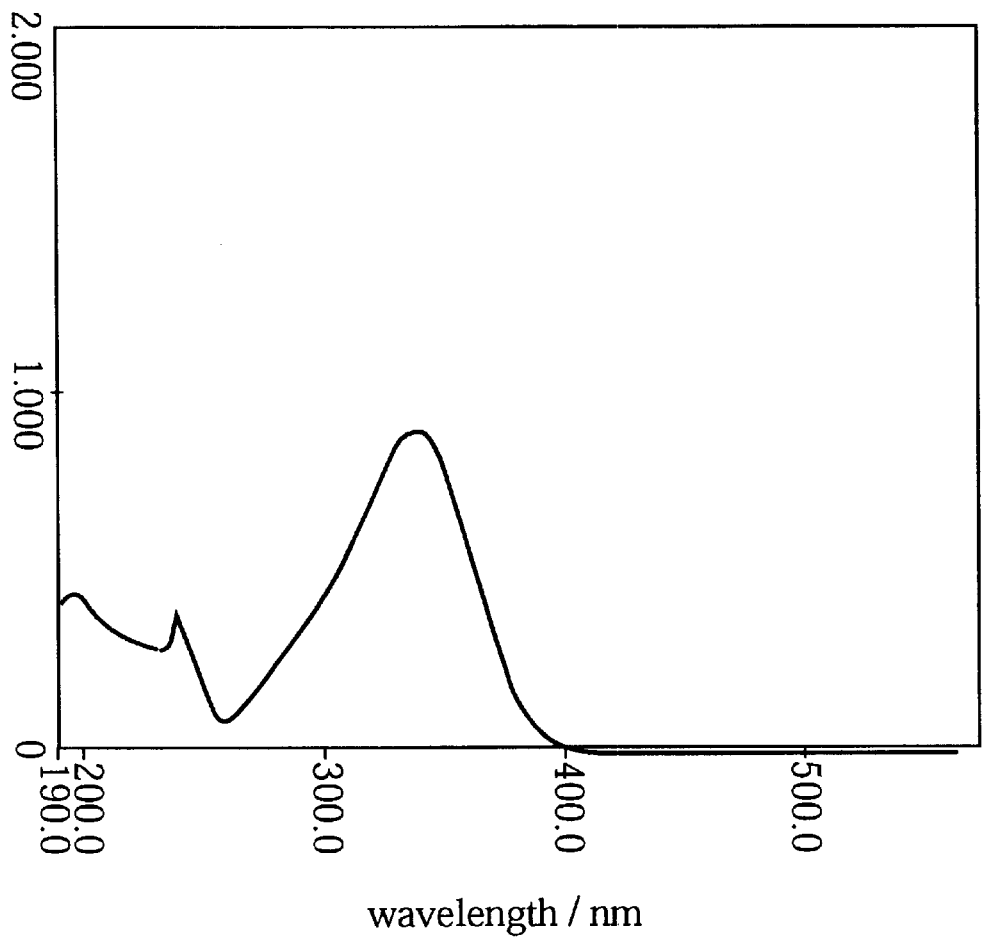
Figures 4, 5:
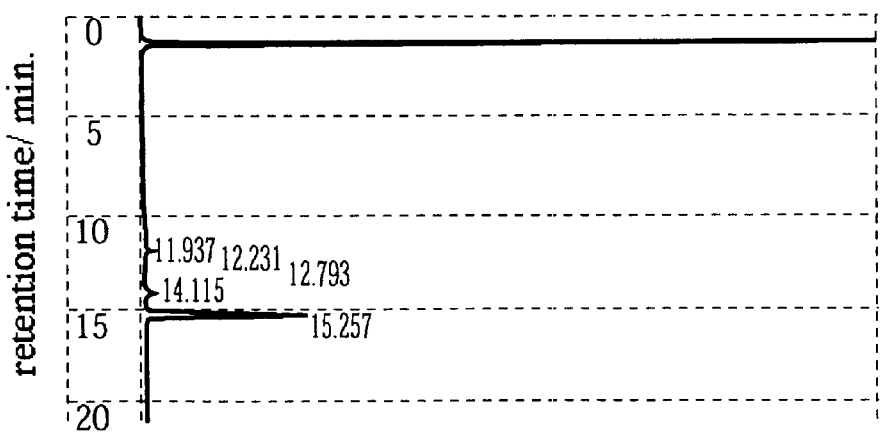
Figure 5:
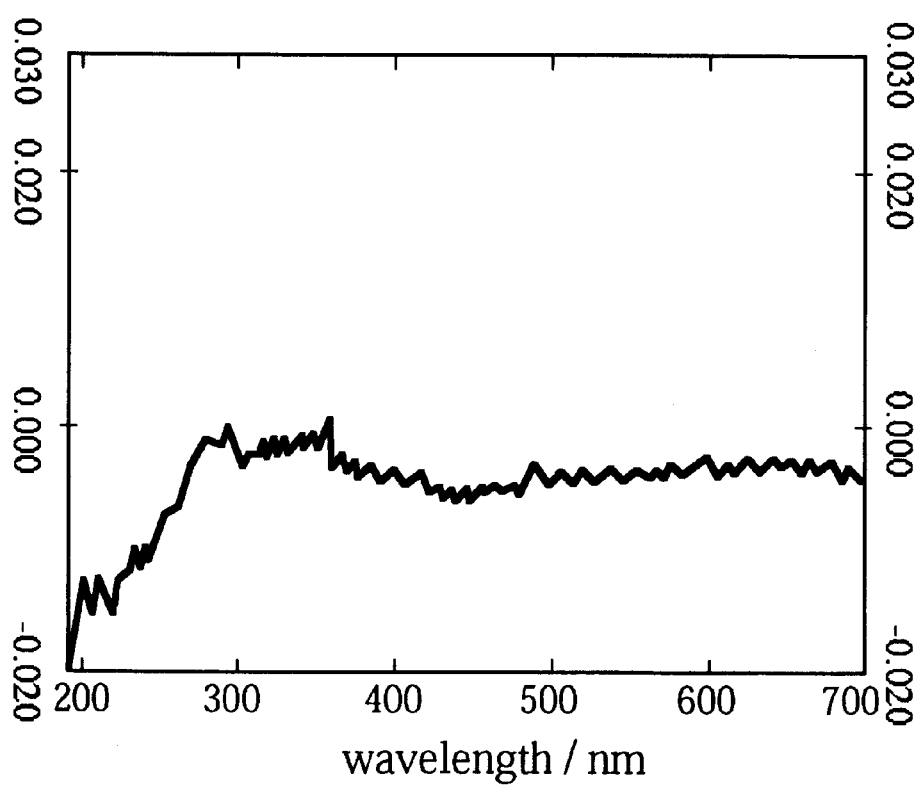
Figure 6:
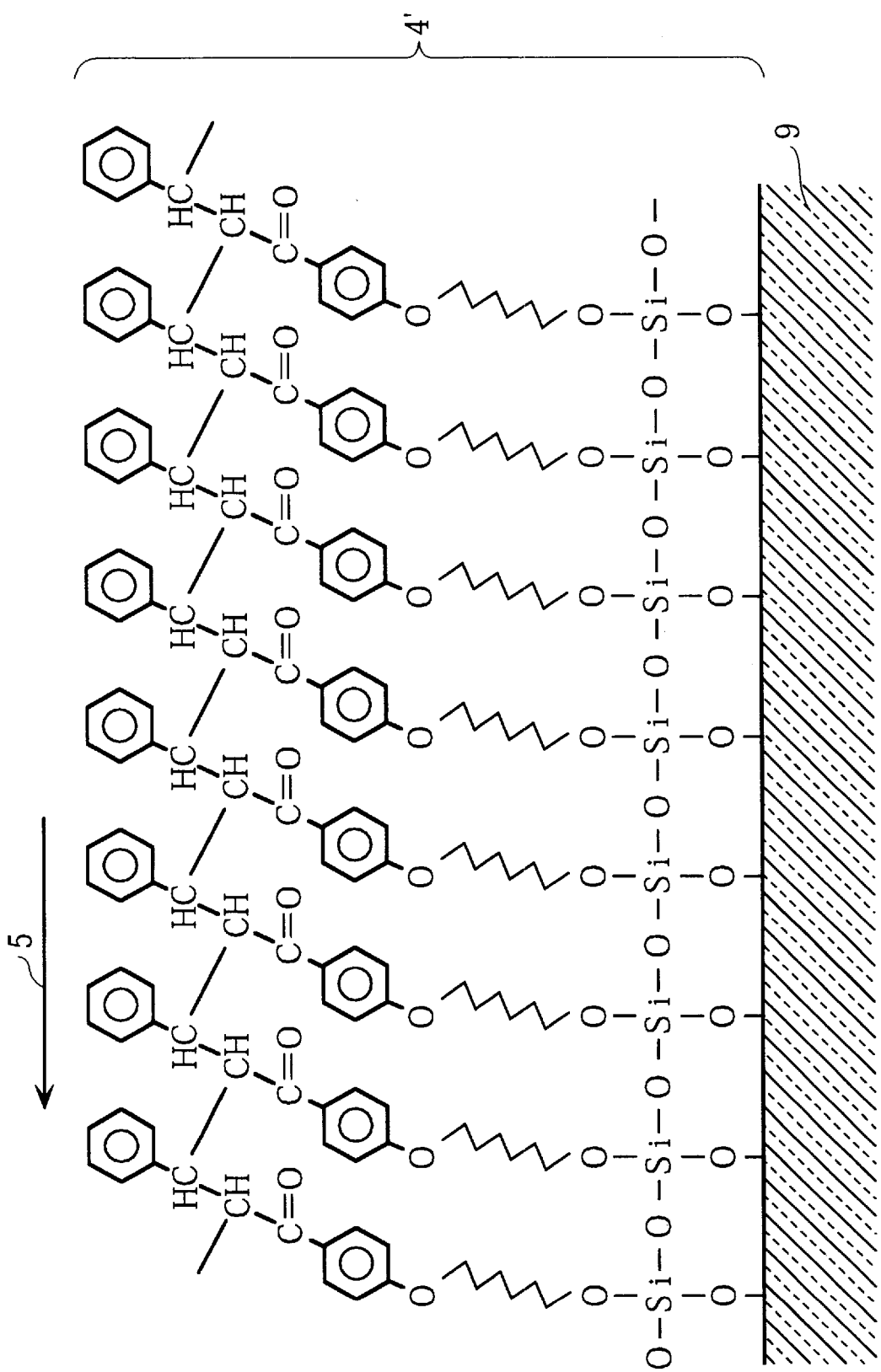
Figures 1, 6:
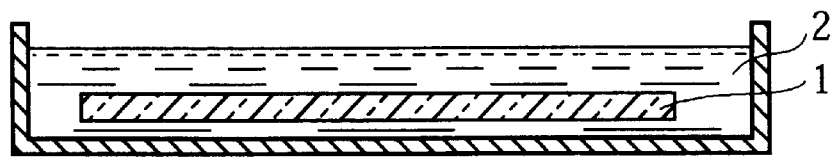
Figures 2, 6:
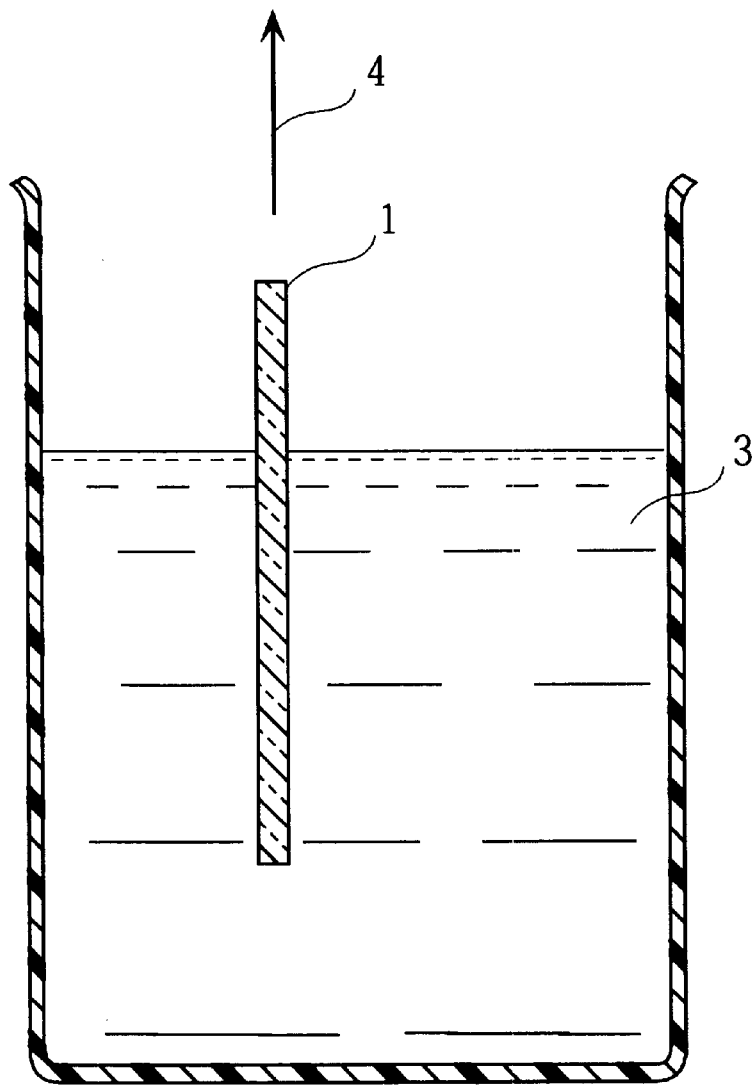
Figures 3, 6:
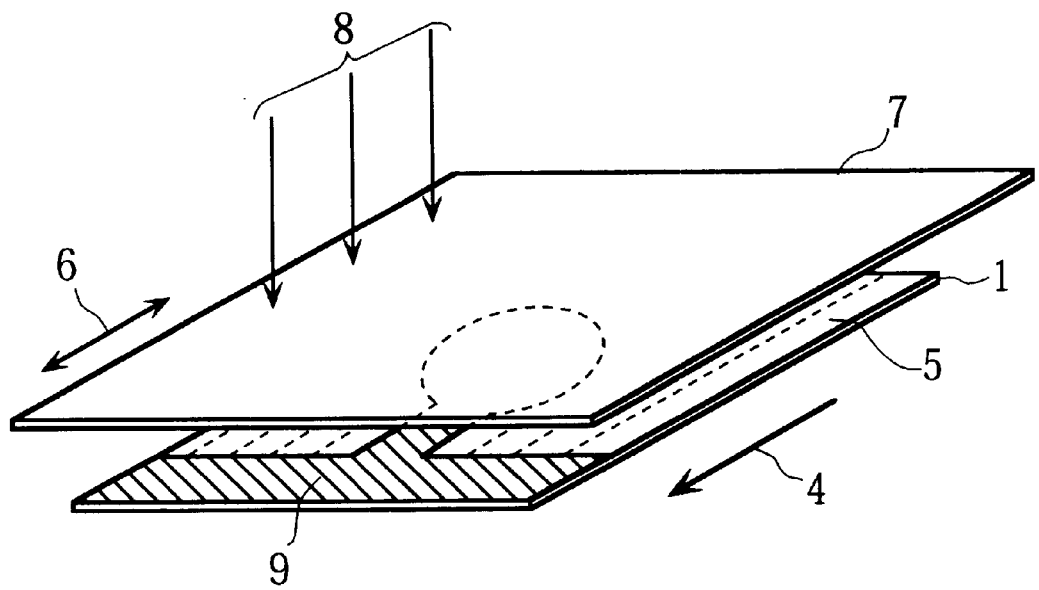
Figures 4, 6:
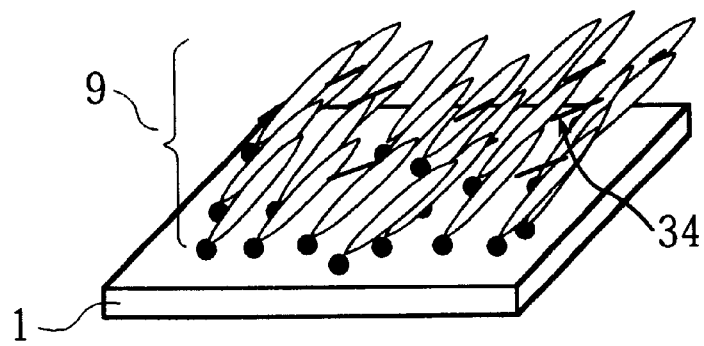
Figures 5, 6:
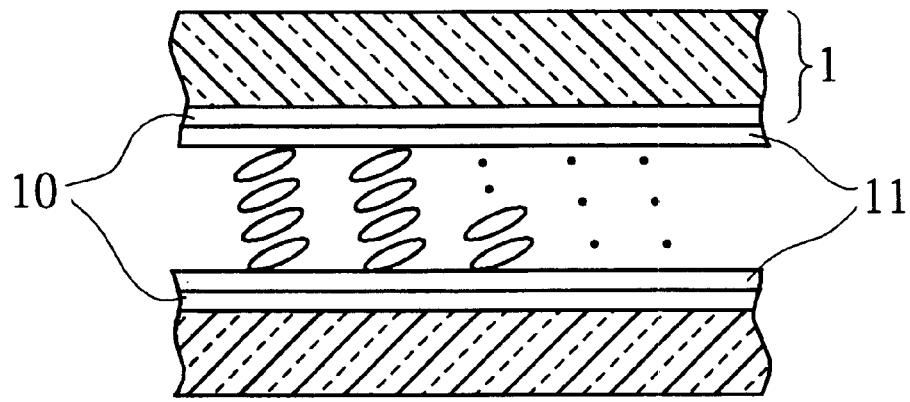
Figure 6:
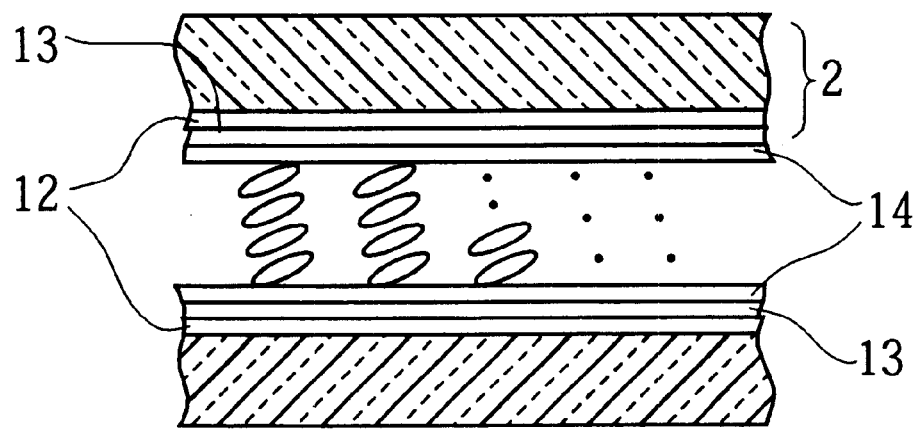
Figures 6, 7:
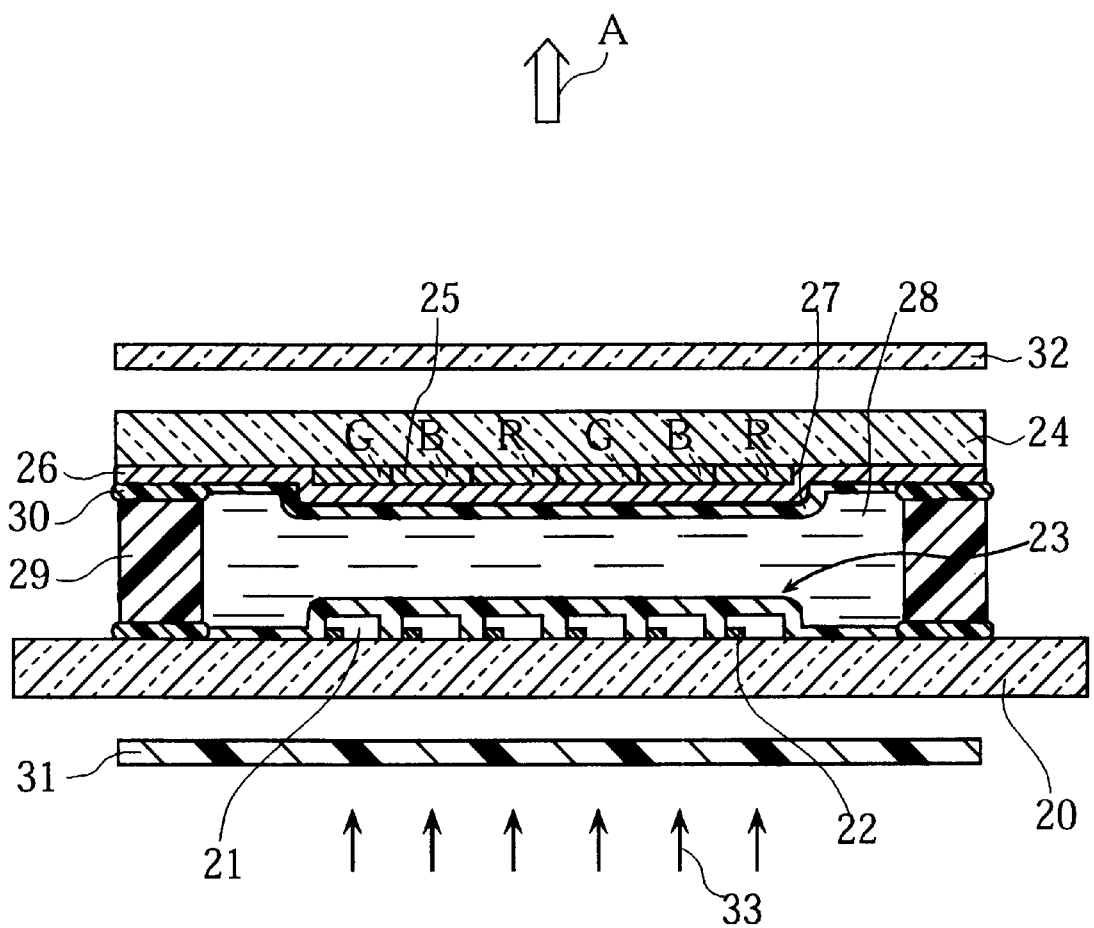
Figure 7:
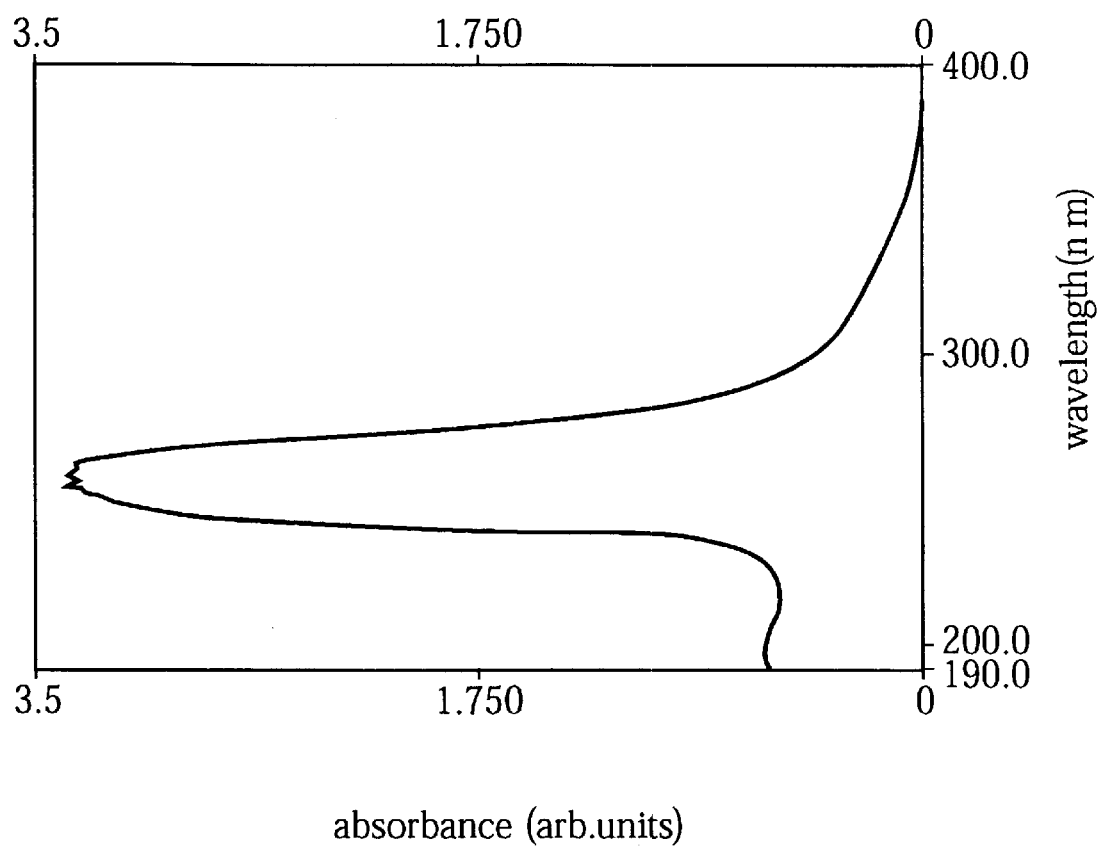

On the condition in Embodiment 1, a substance represented by the following Chemical Formula 17 (this substance has a photosensitive peak in a range from 240 to 290 nm as shown in FIG. 7) was used as a chemical adsorbent comprising a photosensitive group represented by the above-mentioned Chemical Formula 9 and Si instead of a substance used in Embodiment 1. Later, an acrylic plate having a multitude of grooves of 0.1 to 0.3 μm width through rubbing with an abrasive of 0.3 μm was put on a substrate, and a far-ultraviolet ray of 80 mJ with a wavelength of 254 nm was irradiated (2.1 mW/cm², after transmitting a acrylic plate) by using an extra-high-pressure mercury-vapor lamp of 500W. The same experiment except the above was executed.

[Chemical Formula 17]

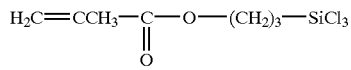

Furthermore, two substrates in this state were combined through a chemisorbed film so as to be antiparallel, and a liquid crystal cell with a gap of 20 μm was constructed, and a nematic liquid crystal (ZLI4792; made by Merck & Co., Inc.) was injected, and an alignment state was examined. The injected liquid crystal molecules were aligned at an pretilt angle of approximately 4° with the substrate along a direction at an angle of 90° with the polarized direction.

Like the above-mentioned substance, a substance which can be used as a substance for forming a film is represented by the following Chemical Formula 18,

[Chemical Formula 18]

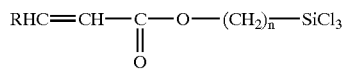

(In the Formulae, n is an integer of 1 to 14 inclusive and R is an alkyl group having 1 to 14 C or a phenyl group. However, the sum of n and the number of C in R is 1 to 26.)

or the following Chemical Formula 19,

[Chemical Formula 19]

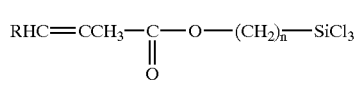

(In the Formulae, n is an integer of 1 to 14 inclusive and R is an alkyl group having 1 to 14 C or a phenyl group. However, the sum of n and the number of C in R is 1 to 26.)

or the following Chemical Formula 20.

[Chemical Formula 20]

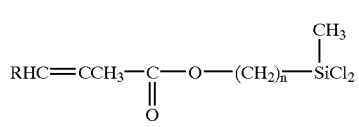

(In the Formulae, n is an integer of 1 to 14 inclusive and R is an alkyl group having 1 to 14 C or a phenyl group. However, the sum of n and the number of C in R is 1 to 26.)

More specifically, a substance represented by the following Chemical Formula 21, Chemical Formula 22, Chemical Formula 23, Chemical Formula 24 or Chemical Formula 25 was similarly applicable although it had a different amount of exposure.

[Chemical Formula 21]

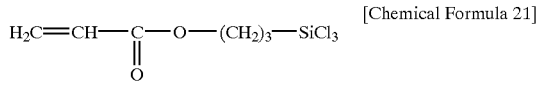

(This substance has a photosensitive peak in a range from 240 to 280 nm.)

[Chemical Formula 22]

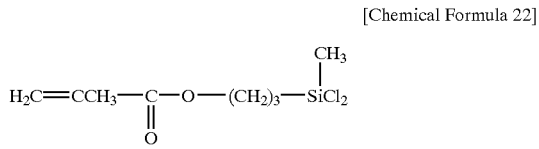

(This substance has a photosensitive peak in a range from 240 to 290 nm.)

[Chemical Formula 23]

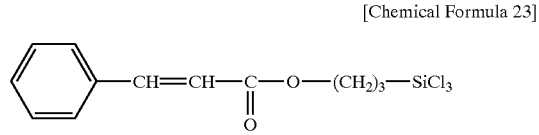

(This substance has a photosensitive peak in a range from 240 to 310 nm.)

[Chemical Formula 24]

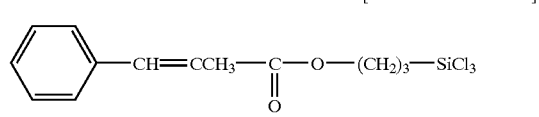

(This substance has a photosensitive peak in a range from 240 to 330 nm.)

[Chemical Formula 25]

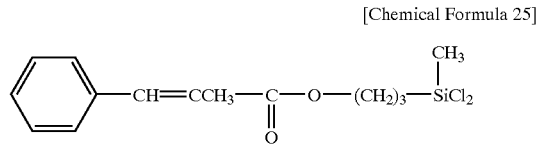

(This substance has a photosensitive peak in a range from 240 to 330 nm.)

(Embodiment 3)

On the condition in Embodiment 1, a chemisorption solution was produced by mixing a substance represented by the above-mentioned Chemical Formula 11, as a chlorosilane-based chemical adsorbent, and a substance represented by the following Chemical Formula 26 at an equal mole ratio, and dissolving the mixture in a nonaqueous solvent at a concentration of approximately 1 wt. % as a chlorosilane-based chemical adsorbent. The same experiment except the above was executed.

[Chemical Formula 26]

As a result, a reaction of eliminating hydrochloric acid was caused between a group of silicon chloride in each of the above-mentioned two kinds of chlorosilane-based chemical adsorbents and a hydroxyl group on the above-mentioned substrate surface, and additionally, a monomolecular thin film 10 (hereinafter referred to as 'monomolecular film') comprising a bond represented by the above-mentioned Chemical Formula 13 and the following Chemical Formula 27 at a ratio of 1:1 approximately was formed by reacting with humidity in an atmosphere.

[Chemical Formula 27]

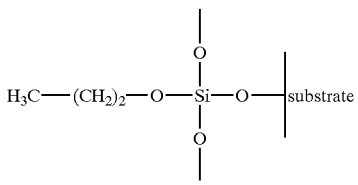

Later, furthermore, a polarizer (HNP'B) (made by POLAROID Corp.) was put on two kinds of substrates in this state so that a polarized direction was in approximately parallel with the direction of draining and pulling up, and an ultraviolet ray of 70 mJ with a wavelength of 365 nm (i-line) was irradiated (2.6 mW/cm$^2$, after transmitting a polarized film) by using an extra-high-pressure mercury-vapor lamp of 500W.

Later, when an anisotropy of adsorbent molecules were examined with FT-IR, the above-mentioned photosensitive group was photopolymerized and thereby a vinyl group was not absorbed like Embodiment 1. Although a direction of a bond was not clear, the polarized direction differed from a vertical direction to the polarized direction in an absorption of a vinyl group.

Figure 8:
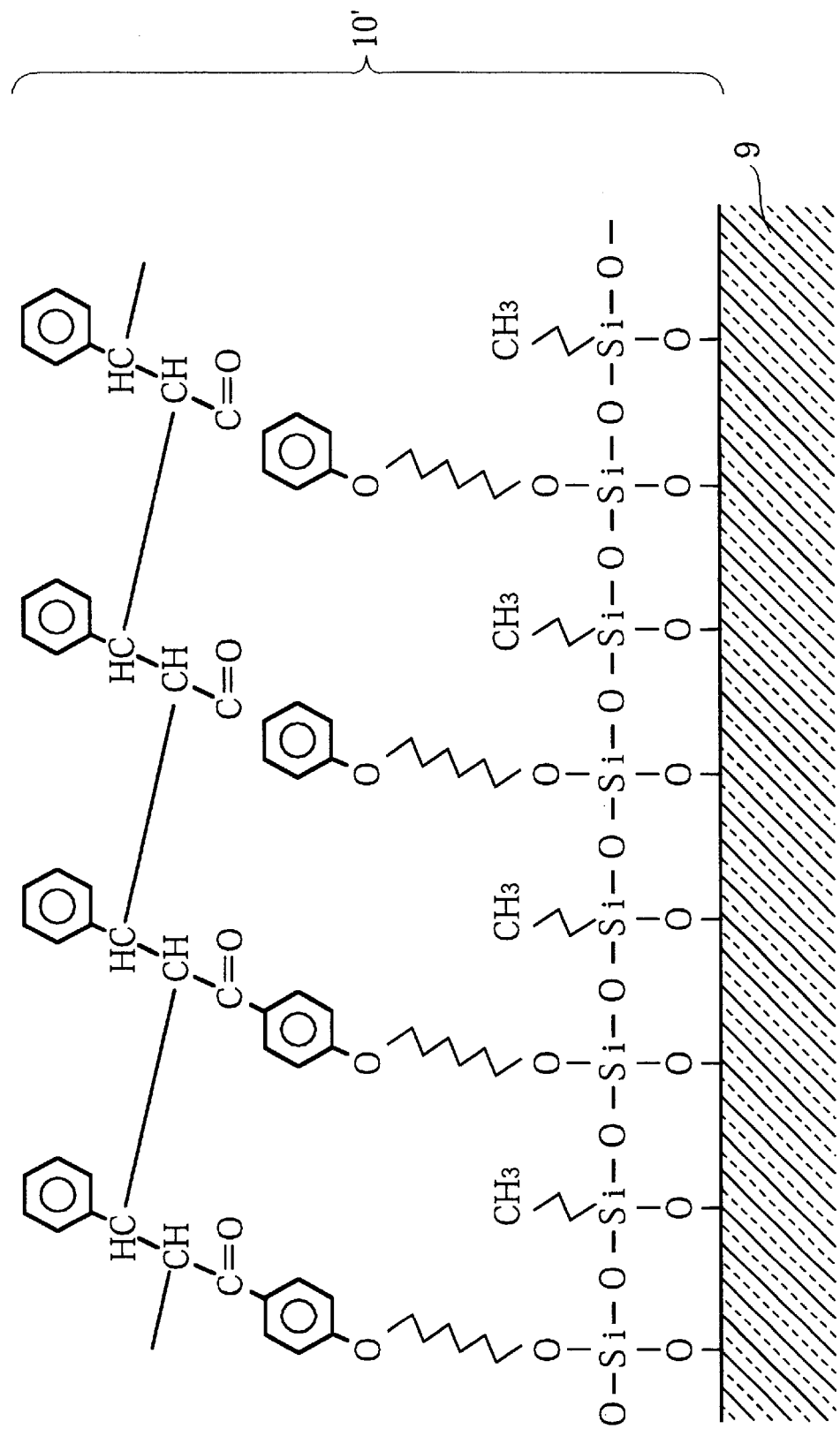
FIG. 8 is a conceptional view of an enlarged thin film to a molecule level for describing a polymerization state ofmolecules in a thin film after polarized exposure in Embodiment 3.

This indicates that a substance composing the above-mentioned monomolecular film is bonded and fixed on the above-mentioned substrate surface, and a monomolecular film 10', which is photopolymerized at the above-mentioned photosensitive group as shown in FIG. 8 along a predetermined direction, is formed.

Next, two substrates in this state were combined through a chemisorbed film so that polarized directions were parallel and drain directions were opposite, namely, antiparallel, and a liquid crystal cell with a gap of 20 μm was constructed, and a nematic liquid crystal (ZLI4792; made by Merck & Co., Inc.) was injected, and an alignment state was examined. The injected liquid crystal molecules were aligned at a pretilt angle of approximately 1.5° with the substrate along a direction at an angle of 90° with the polarized direction.

This indicates that photopolymerized molecules were tilted more than Embodiment 1. The film in Embodiment 3 had a larger alignment control force than a film in Embodiment 1.

(Embodiment 4)

An actual process of manufacturing a liquid crystal display device by using the above-mentioned liquid crystal alignment layer is described below referring to FIG. 9.

Figure 9:
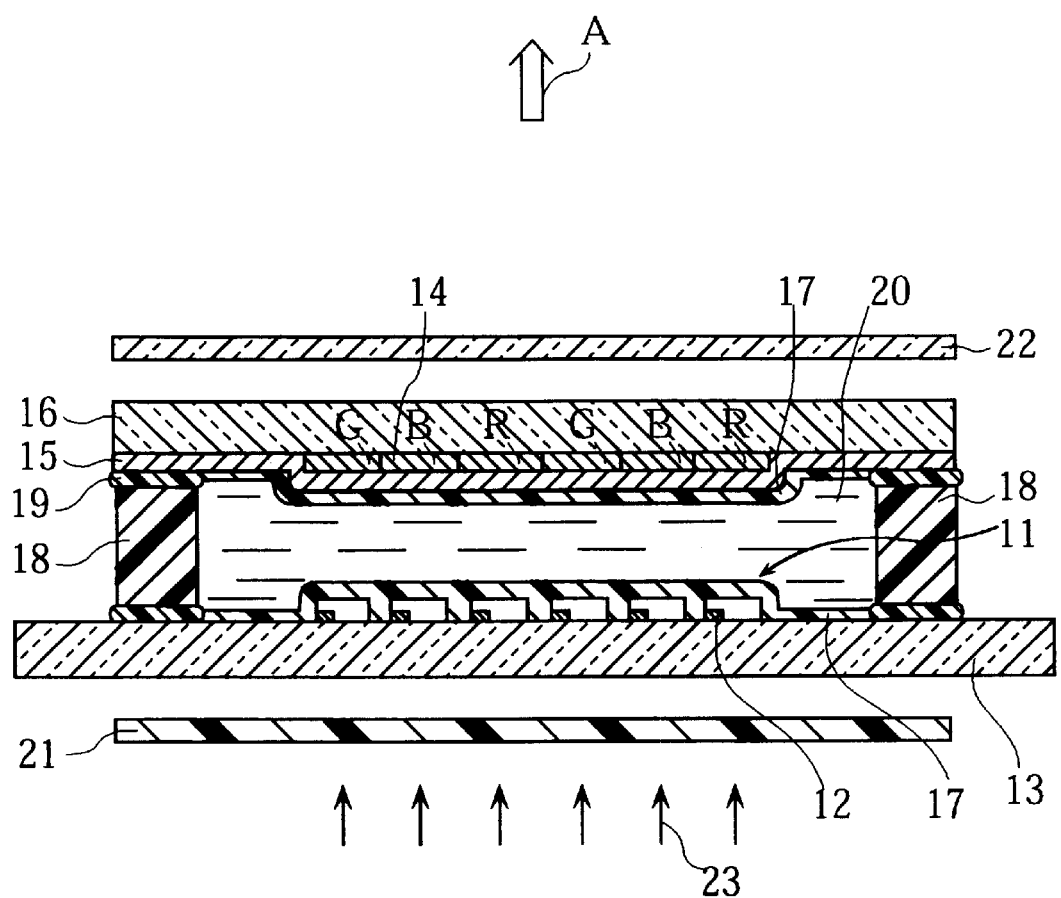
FIG. 9 is a conceptual view of a cross section for describing a method of manufacturing a liquid crystal display device in Embodiment 4.

First, as shown in FIG. 9, a similar chemisorbed film was manufactured by applying a chemisorption solution, which was produced under the same procedure as Embodiment 1, on a first substrate 13 having a first group of electrodes 11 in a matrix and a group of transistors 12 for driving the electrodes as well as a second substrate 16 having a group of color filters 14 opposite to the first group of electrodes and a second electrode 15.

As a result, a liquid crystal alignment layer 17, which was realigned along an electrode pattern, was manufactured like Embodiment 1. Next, the above-mentioned first and second substrates 13, 16 were joined so that their electrodes were opposite, and a cell with a gap of approximately 5 μm in which an alignment direction is twisted by 90° was constructed with a spacer 18 and an adhesive 19. Later, after injecting the above-mentioned nematic liquid crystal 20 (ZLI4792; made by Merck & Co., Inc.) between the above-mentioned first and second substrates, a display device was completed by combining polarizers 21, 22. Then, a pretilt angle of the injected liquid crystal was 2.3°.

Such a device could display a picture in a direction of an arrow A by driving each transistor with a video signal while irradiating a backlight 23 on the whole surface.

(Embodiment 5)

After forming a monomolecular film in Embodiment 3, it was possible to provide four parts in which an alignment direction differs in a pattern in the same pixel by executing the step of exposing through a patterned mask dividing each pixel into four sections in a check on the above-mentioned polarizer twice on the same condition as Embodiment 1. Moreover, it was possible to improve a conventional viewing angle of a liquid crystal display device, 60° right and left, 20° up, 50° down greatly to 60° right and left, 50° up and down by using the substrate with this alignment layer.

A liquid crystal display device with a superior stability of alignment was obtained by forming the above-mentioned film on each surface of two substrates with an opposite electrode as an alignment layer. The alignment layer was extremely effective in a liquid crystal display device wherein opposite electrodes are formed on a substrate surface, namely, in-plane switching (IPS) type because of no rubbing.

An ultraviolet ray with a wavelength of 365 nm (i-line of an extra-high-pressure mercury-vapor lamp) and a far-ultraviolet ray with a wavelength of 254 nm were used as a light for exposing respectively in the above-mentioned Embodiments 1 and 2, and it is possible to use a visible ray with a wavelength of 436 nm and 405 nm as well as a far-ultraviolet ray with a wavelength of 248 nm by KrF excimer laser depending on an absorption of light into a film substance. In particular, the light with a wavelength of 248 nm and 254 nm has a high efficiency in energy alignment since the light is easily absorbed into most substances.

In addition, a substance comprising an alkoxysilyl group and an isocyanatosilyl group could be used as a chemical adsorbent instead of a substance comprising a group of silicon chloride such as a chlorosilane-based chemical adsorbent used in the embodiments of the first invention group. In this case, a film with a high alignment was obtained.

As described above, the first invention group can provide a liquid crystal alignment layer having a superior alignment control force despite a remarkably uniform and thin layer as compared with a conventional layer. Furthermore, an alignment direction of injected liquid crystal can be controlled by irradiating for photopolymerization with the use of an ultraviolet ray and a far-ultraviolet ray, and a pretilt angle can be altered by changing a composition of a monolayer. According to a manufacturing method of the present invention, a liquid crystal alignment layer as described above can be manufactured with a high productivity.

Moreover, a plurality of parts in which only an alignment direction differs in a pattern on the same alignment layer can be provided by executing the step of exposing through a patterned mask on a polarizer a plurality of times after the step of forming a monomolecular film, and although it was difficult to manufacture a liquid crystal display device in a multidomain alignment, wherein an alignment of each pixel is divided into a plurality of kinds, in a rubbing method, the liquid crystal display device in a multidomain alignment can be manufactured rationally with a high efficiency.

In addition, a liquid crystal display device with a high reliability can be provided since such an alignment layer is bonded firmly on a substrate surface through a covalent bond.

DISCLOSURE OF THE SECOND INVENTION GROUP

The main purpose of the second invention group is to provide a new chemical adsorbent which can form a liquid crystal alignment layer with superior thermal stability, and a method of manufacturing such a chemical adsorbent like the above-mentioned first invention group. Although a description of a liquid crystal alignment layer and a liquid crystal display device using a chemical adsorbent is omitted in the second invention group in order to avoid a redundancy with a description in the first invention group, it is, needless to say, possible to manufacture a liquid crystal alignment layer and a liquid crystal display device by applying a manufacturing method in other invention groups to a chemical adsorbent in the second invention group.

The invention in the second invention group is characterized by the following constitution.

(1) A chemical adsorbent consisting of a 4'-substitution chalcone derivative represented by the following Chemical Formula 2-1.

[Chemical Formula 2-1]

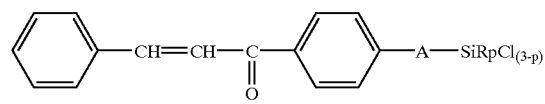

R is an alkyl group having 1 to 3 C or an alkoxy group having 1 to 3 C, p is an integer of 0 to 2 inclusive and A is a bifunctional group.

In the above-mentioned composition, it is possible to make A in the above-mentioned Chemical Formula 2-1 a group of $-(CH_2)_n-$ (n is an integer of 3 to 14 inclusive).

A compound having a skeleton group of chalcone represented by the following Chemical Formula 2-6 is generally transparent and stable in a range of a visible ray (a wavelength from 400 nm to 700 nm), and has a photosensitivity of photopolymerizing in a range of an ultraviolet ray and a far-ultraviolet ray. A group of silicon chloride is chemisorbed on a substrate having a hydrophilic group. Therefore, since a chemical adsorbent having the above-mentioned composition can form a monomolecular thin film by chemisorbing and crosslink molecules to each other by irradiating a light in a range of an ultraviolet ray and a far-ultraviolet ray, the chemical adsorbent is appropriate for a material for forming a liquid crystal alignment layer.

[Chemical Formula 2-6]

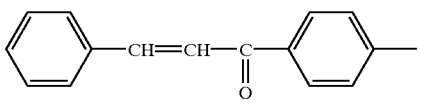

(2) A chemical adsorbent having the above-mentioned composition can be manufactured in a manufacturing method having the following composition.

That is, a method of manufacturing a chemical adsorbent comprising a first step of synthesizing a substance represented by the following Chemical Formula 2-4 by coupling 4'-hydroxychalcone represented by the following Chemical Formula 2-2 and a compound represented by the following Chemical Formula 2-3; and a second step of synthesizing a 4'-substitution chalcone derivative represented by the following Chemical Formula 2-5 by causing a reaction of eliminating hydrochloric acid with a substance represented by the above-mentioned Chemical Formula 2-4 and silicon tetrachloride in an atmosphere of inert gas.

[Chemical Formula 2-2]

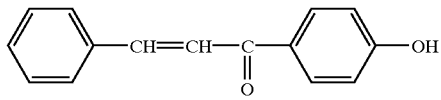

[Chemical Formula 2-3]

Hal—$(CH_2)_n$—OH (Hal is I, Br or Cl and n is an integer of 3 to 14 inclusive.)

[Chemical Formula 2-4]

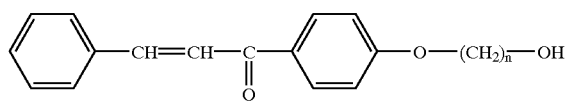

(n is an integer of 3 to 14 inclusive.)

[Chemical Formula 2-5]

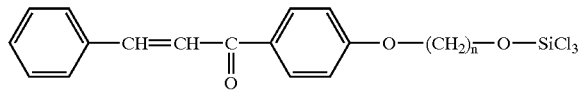

(n is an integer of 3 to 14 inclusive.)

The above-mentioned manufacturing method is described in detail. 4'-substitution chalcone derivative represented by the above-mentioned Chemical Formula 2-1 can be synthesized, for instance, by the following steps of (1) and (2).

(1) Synthesis of 4'-Substitution Chalcone Derivative Represented by the Above-mentioned Chemical Formula 2-4

For instance, it is possible to synthesize by coupling 4'-hydroxychalcone (Chemical Formula 2-2) and a compound represented by the above-mentioned Chemical Formula 2-3. That is, it is possible to obtain 4'-substitution chalcone derivative represented by the above-mentioned Chemical Formula 2-4 by dissolving 4'-hydroxychalcone (Chemical Formula 2-2) in dry DMF in an air current of inert gas, and adding sodium hydride through dropping in ice cooling; later, heating to a room temperature, and stirring ordinarily for 2 to 10 hours, preferably 5 hours; next, adding a compound represented by the above-mentioned Chemical Formula 2-3 (such as 6-chloro-1-hexanol) through dropping at a room temperature ordinarily for 5 to 10 minutes, preferably 10 minutes; furthermore, heating ordinarily to 60 to 85, preferably 80, and reacting ordinarily for 5 to 10 hours, preferably 7 hours.

A mixture ratio of 4'-hydroxychalcone (X) and a compound represented by the above-mentioned Chemical Formula 2-3 (Y) is ordinarily 0.8:1 to 1:0.8 (mole ratio), preferably approximately 1:1. A mixture ratio of 4'-hydroxychalcone (X) and a basic reagent (Z) such as sodium hydride is ordinarily 1:0.8 to 1:2, preferably 1:1.

(2) Synthesis of 4'-Substitution Chalcone Derivative Represented by the Above-mentioned Chemical Formula 2-5

For instance, it is possible to synthesize by causing a reaction of eliminating hydrochloric acid between 4'-substitution chalcone derivative represented by the above-mentioned Chemical Formula 2-4 and silicon tetrachloride. That is, it is possible to obtain 4'-substitution chalcone derivative represented by the above-mentioned Chemical Formula 2-5 by stirring 4'-substitution chalcone derivative represented by the above-mentioned Chemical Formula 2-4 and silicon tetrachloride in a reaction flask in air current of inert gas at a room temperature ordinarily for 1 to 10 hours, preferably 5 hours; later, removing excessive silicon tetrachloride through distillation; furthermore, after adding dehydrated hexane to the residue and dispersing a crystal, drying through filtration.

A mixture ratio of 4'-substitution chalcone derivative (X) represented by the above-mentioned Chemical Formula 2-4 and silicon tetrachloride (Y) is ordinarily 0.8:1 to 1:0.8 (mole ratio), preferably approximately 1:1.

DETAILED DESCRIPTION OF THE PREFERRED EMBODIMENTS OF THE SECOND INVENTION GROUP

The second invention group is detailed based on embodiments below. In embodiments below, R-1200 made by HITACHI Ltd. was used for an analysis of $^1$H-NMR (nuclear magnetic resonance) spectrum, FTIR 4300 made by SHIMADZU Corp. was used for an analysis of IR (infrared absorption) spectrum, and UV-240 made by SHIMADZU Corp. was used for an analysis of UV (ultraviolet absorption) spectrum.

(Embodiment 2-1)

(1) Synthesis of 4'-(6-Hydroxyhexyloxy)-chalcone (Chemical Formula 2-7)

A refined 4'-(6-hydroxyhexyloxy)-chalcone (10.7 g, 23.4 mmol) was obtained with a yield of 49.3% by adding 90 ml of dry DMF (N,N-dimethylformamide) to 4-hydroxychalcone (15.0 g, 67 mmol; made by LANCASTER Corp.) in an air current of argon, and adding sodium hydride (60%, 2.68 g,67 mmol) through dropping in a reaction flask of 200 ml in ice cooling for 30 minutes; later, after heating to a room temperature and stirring for 5 hours, adding 6-chloro-1-hexanol (19.2 g, 67 mmol; made by TOKYO CHEMICAL INDUSTRY Co., Ltd.) through dropping at the same temperature for 10 minutes; furthermore, heating to 80° C., and reacting for 7 hours; next, after injecting the solution into water with ice and extracting the product with ethyl acetate, washing with water, and drying the solution after washing through dehydration with magnesium sulfate, and removing the ethyl acetate; after refining (mobile phase, hexane:ethyl acetate=4:1) the gained coarse crystal with silica gel column, recrystallizing with ethyl acetate.

[Chemical Formula 2-7]

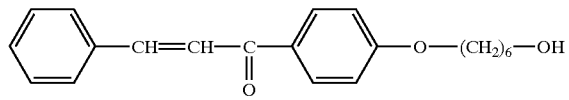

(2) Synthesis of 4-(6-Trichlorosiloxyhexyloxy)-chalcone (Chemical Formula 2-8)

A refined 4'-(6-trichlorosiloxyhexyloxy)-chalcone (6.2 g) was obtained with a yield of 42.3% by stirring 4'-(6-hydroxyhexyloxy)-chalcone (10.5 g, 32 mmol) and silicon tetrachloride (20 g, 118 mmol; made by WAKO PURE CHEMICALS INDUSTRIES, Ltd.) in a reaction flask of 100 ml in air current of argon at a room temperature for 5 hours; later, removing excessive silicon tetrachloride through distillation; furthermore, after adding dehydrated hexane to the residue and dispersing a crystal, drying through filtration.

[Chemical Formula 2-8]

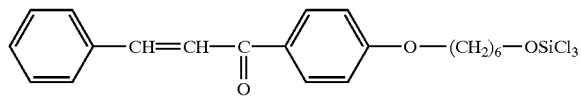

4'-(6-trichlorosiloxyhexyloxy)-chalcone (Chemical Formula 2-8) thus obtained was a light yellow crystal in powder.

BRIEF DESCRIPTION OF THE DRAWINGS OF THE SECOND INVENTION GROUP

FIG. 2-1 shows a result of an analysis (CDCl3) by $^1$H-NMR spectrum. As shown in FIG. 2-1, the signals of δ 1.6 (s, CH$_2$), 4.0 (d, olefin H), 6.9 (d), 7.4 (m), 8.0 (d) (benzene ring H) ppm existed.

FIG. 2-2 shows a result of an analysis by IR spectrum. As shown in FIG. 2-2, an absorption was shown at 2940, 2860 (CH$_2$), 1650 (C=O), 1600, 1580, 1450 (benzene ring skeleton), 1230 (θ-O—C), 1080 (SiO), 830 (SiCl) cm$^{-1}$.

FIG. 2-3 shows an ultraviolet absorption spectrum which was obtained in chloroform. The ultraviolet absorption spectrum shown in FIG. 2-3 proves no absorption in a range of visible ray and a strong absorption in a range of an ultraviolet ray and a far-ultraviolet ray. In FIG. 2-3, an absorption curve was omitted because of no absorption in a range of a wavelength from 500 nm to 700 nm.

FIG. 2-4 shows a result of determining gas chromatography. The peak at a retention time of 14.861 min. indicates 4'-(6-trichlorosiloxyhexyloxy)-chalcone with a purity of 99% or more, which was obtained in Embodiment 2-1. The peak at a retention time of 1 to 2 min. indicates a solvent with a low boiling point of a carrier.

(Embodiment 2-2)

(1) Synthesis of 4'-(12-Hydroxydodecyloxy)-chalcone (Chemical Formula 2-9)

A refined 4'-(12-hydroxydodecyloxy)-chalcone (12.9 g, 31.6 mmol) was obtained with a yield of 47.2% by adding 90 ml of dry DMF to 4'-hydroxychalcone (15.0 g, 67 mmol) in an air current of argon, and adding sodium hydride (60%, 2.68 g,67 mmol) through dropping in a reaction flask of 200 ml in ice cooling for 30 minutes; later, after heating to a room temperature and stirring for 5 hours, adding 12-chloro-1-dodecanol (14.8 g, 67 mmol) through dropping at the same temperature for 10 minutes; furthermore, heating to 80, and reacting for 7 hours; next, after injecting the solution into water with ice and extracting the product with ethyl acetate, washing with water, and drying through dehydration with magnesium sulfate, and removing the solvent; after refining (mobile phase, hexane:ethyl acetate=4:1) the gained coarse crystal with silica gel column, recrystallizing with ethyl acetate.

[Chemical Formula 2-9]

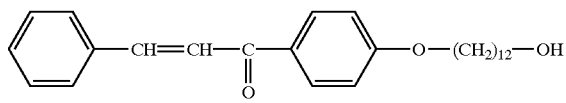

(2) Synthesis of 4'-(12-Trichlorosiloxydodecyloxy)-chalcone (Chemical Formula 2-10)

A refined 4'-(12-trichlorosiloxydodecyloxy)-chalcone (5.9 g, 10.9 mmol) was obtained with a yield of 34.1% by stirring 4'-(12-hydroxydodecyloxy)-chalcone (13.1 g, 32 mmol) and silicon tetrachloride (20 g, 118 mmol) in a reaction flask of 100 ml in air current of argon at a room temperature for 5 hours; later, removing excessive silicon tetrachloride through distillation; furthermore, after adding dehydrated hexane to the residue and dispersing a crystal, drying through filtration.

[Chemical Formula 2-10]

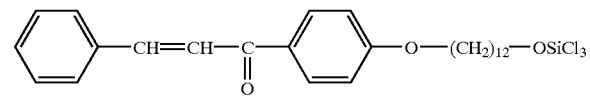

4'-(12-trichlorosiloxydodecyloxy)-chalcone (Chemical Formula 2-10) thus obtained was a light yellow crystal in powder.

An ultraviolet absorption spectrum which was obtained in chloroform was the same as FIG. 2-3. The ultraviolet absorption spectrum proves no absorption in a range of visible ray and a strong absorption in a range of an ultraviolet ray and a far-ultraviolet ray.

(Embodiment 2-3)

(1) Synthesis of 4'-(14-Hydroxytetradecyloxy)-chalcone (Chemical Formula 2-11)

A refined 4'-(14-hydroxytetradecyloxy)-chalcone (13.6 g, 31.2 mmol) was obtained with a yield of 46.6% by adding 90 ml of dry DMF to 4'-hydroxychalcone (15.0 g, 67 mmol) in an air current of argon, and adding sodium hydride (60%, 2.68 g,67 mmol) through dropping in a reaction flask of 200 ml in ice cooling for 30 minutes; later, after heating to a room temperature and stirring for 5 hours, adding 14-chloro-1-tetradecanol (16.6 g, 67 mmol) through dropping at the same temperature for 10 minutes; furthermore, heating to 80, and reacting for 7 hours; next, after injecting the solution into water with ice and extracting the product with ethyl acetate, washing with water, and drying through dehydration with magnesium sulfate, and removing the solvent; after refining (mobile phase, hexane:ethyl acetate=4:1) the gained coarse crystal with silica gel column, recrystallizing with ethyl acetate.

[Chemical Formula 2-11]

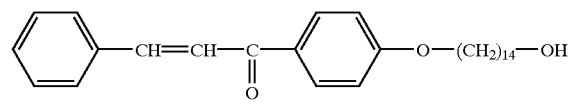

(2) Synthesis of 4'-(14-Trichlorosiloxytetradecyloxy)-chalcone (Chemical Formula 2-12)

A refined 4'-(14-trichlorosiloxytetradecyloxy)-chalcone (5.34 g, 9.38 mmol) was obtained with a yield of 29.3% by stirring 4'-(14-hydroxytetradecyloxy)-chalcone (10.5 g, 32 mmol) and silicon tetrachloride (20 g, 118 mmol) in a reaction flask of 100 ml in air current of argon at a room temperature for 5 hours; later, removing excessive silicon tetrachloride through distillation; furthermore, after adding dehydrated hexane to the residue and dispersing a crystal, drying through filtration.

[Chemical Formula 2-12]

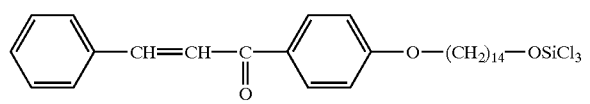

4'-(14-trichlorosiloxytetradecyloxy)-chalcone (Chemical Formula 2-12) thus obtained was a light yellow crystal in powder.

An ultraviolet absorption spectrum which was obtained in chloroform was the same as FIG. 2-3. The ultraviolet absorption spectrum proves no absorption in a range of visible ray and a strong absorption in a range of an ultraviolet ray and a far-ultraviolet ray.

(Embodiment 2-4)

(1) Synthesis of 4-(3-Hydroxypropyloxy)-chalcone (Chemical Formula 2-13)

A refined 4'-(3-hydroxypropyloxy)-chalcone (9.71 g, 34.4 mmol) was obtained with a yield of 51.4% by adding 90 ml of dry DMF to 4'-hydroxychalcone (15.0 g, 67 mmol) in an air current of argon, and adding sodium hydride (60%, 2.68 g, 67 mmol) through dropping in a reaction flask of 200 ml in ice cooling for 30 minutes; later, after heating to a room temperature and stirring for 5 hours, adding 3-chloro-1-propanol (6.33 g, 67 mmol) through dropping at the same temperature for 10 minutes; furthermore, heating to 80° C., and reacting for 7 hours; next, after injecting the solution into water with ice and extracting the product with ethyl acetate, washing with water, and drying through dehydration with magnesium sulfate, and removing the solvent; after refining (mobile phase, hexane:ethyl acetate=4:1) the gained coarse crystal with silica gel column, recrystallizing with ethyl acetate.

[Chemical Formula 2-13]

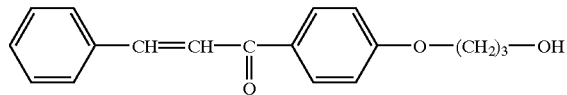

(2) Synthesis of 4'-(3-Trichlorosiloxypropyloxy)-chalcone (Chemical Formula 2-14)

A refined 4'-(3-trichlorosiloxypropyloxy)-chalcone (22.8 g, 55.0 mmol) was obtained with a yield of 46.6% by stirring 4'-(3-hydroxypropyloxy)-chalcone (9.02 g, 32 mmol) and silicon tetrachloride (20 g, 118 mmol) in a reaction flask of 100 ml in air current of argon at a room temperature for 5 hours; later, removing excessive silicon tetrachloride through distillation; furthermore, after adding dehydrated hexane to the residue and dispersing a crystal, drying through filtration.

[Chemical Formula 2-14]

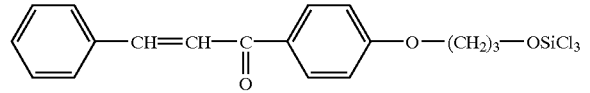

4'-(3-trichlorosiloxypropyloxy)-chalcone (Chemical Formula 2-14) thus obtained was a light yellow crystal in powder.

An ultraviolet absorption spectrum which was obtained in chloroform was the same as FIG. 2-3. The ultraviolet absorption spectrum proves no absorption in a range of visible ray and a strong absorption in a range of an ultraviolet ray and a far-ultraviolet ray.

(Embodiment 2-5)

Synthesis of 4'-(6-Hydroxyhexyloxy)-chalcone (Chemical Formula 2-7) by using 6-Bromo-1-hexanol A refined 4-(6-hydroxyhexyloxy)-chalcone (12.2 g, 37.7 mmol) was obtained with a yield of 56.2% by adding 90 ml of dry DMF to 4'-hydroxychalcone (15.0 g, 67 mmol) in an air current of argon, and adding sodium hydride (60%, 2.68 g,67 mmol) through dropping in a reaction flask of 200 ml in ice cooling for 30 minutes; later, after heating to a room temperature and stirring for 5 hours, adding 6-bromo-1-hexanol (12.1 g, 67 mmol) through dropping at the same temperature for 10 minutes; furthermore, heating to 80, and reacting for 7 hours; next, after injecting the solution into water with ice and extracting the product with ethyl acetate, washing with water, and drying through dehydration with magnesium sulfate, and removing the solvent; after refining (mobile phase, hexane:ethyl acetate=4:1) the gained coarse crystal with silica gel column, recrystallizing with ethyl acetate.

A composition of the product was confirmed by $^1$H-NMR and IR.

(Embodiment 2-6)

Synthesis of 4'-(6-Hydroxyhexyloxy)-chalcone (Chemical Formula 2-7) by using 6-Iodo-1-hexanol A refined 4'-(6-hydroxyhexyloxy)-chalcone (13.1 g, 40.5 mmol) was obtained with a yield of 60.5% by adding 90 ml of dry DMF to 4'-hydroxychalcone (15.0 g, 67 mmol) in an air current of argon, and adding sodium hydride (60%, 2.68 g, 67 mmol) through dropping in a reaction flask of 200 ml in ice cooling for 30 minutes; later, after heating to a room temperature and stirring for 5 hours, adding 6-iodo-1-hexanol (15.3 g, 67 mmol) through dropping at the same temperature for 10 minutes; furthermore, heating to 80° C., and reacting for 7 hours; next, after injecting the solution into water with ice and extracting the product with ethyl acetate, washing with water, and drying through dehydration with magnesium sulfate, and removing the solvent; after refining (mobile phase, hexane:ethyl acetate=4:1) the gained coarse crystal with silica gel column, recrystallizing with ethyl acetate.

A composition of the product was confirmed by $^1$H-NMR and IR.

A group represented by the above-mentioned Chemical Formula 2-6 was used as a photosensitive group in the above embodiments, and it is possible to synthesize a substance comprising a photosensitive group represented by the following Chemical Formula 2-15 similarly.

[Chemical Formula 2-15]

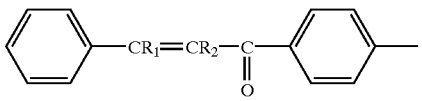

(In the Formulae, each of $R^1$ and $R^2$ is —H, —$CH_3$, —$C_2H_5$ and —$OCH_3$.)

A group of —$SiCl_3$ was used as a group of silicon chloride at an area for adsorbing, and it is possible to synthesize a substance comprising a group of silicon chloride represented by the following Chemical Formula 2-16 similarly.

—$SiR_pCl_{(3-p)}$      [Chemical Formula 2-16]

(R is an alkyl group having 1 to 3 C or an alkoxy group having 1 to 3 C, and p is an integer of 0 to 2 inclusive.)

However, a substance with a practical value as a chemical adsorbent for a liquid crystal alignment layer is limited to a substance which has a range of a photosensitive wavelength in a range of an ultraviolet ray and a far-ultraviolet ray, and is transparent in a range of visible ray.

As described above, 4-substitution chalcone derivative in the second invention group is a new and useful compound represented by the above-mentioned Chemical Formula 2-1. This compound can be used as an appropriate chemical adsorbent for manufacturing a monomolecular film for a liquid crystal alignment layer since the compound is transparent and stable in a range of a visible ray, and has a group represented by the above-mentioned Chemical Formula 2-6 in its molecule as a photosensitive group for photopolymerizing in a range of an ultraviolet ray and a far-ultraviolet ray, and comprises a group of silicon chloride effective as an area for adsorbing in the case of using a chemisorbing method.

BRIEF DESCRIPTION OF THE DRAWINGS OF THE SECOND INVENTION GROUP

FIG. 2-1 is a chart showing a result of an analysis (CDCl3) by $^1$H-NMR spectrum of a compound which was synthesized in Embodiment 2-1.

FIG. 2-2 is a chart showing a result of an analysis by IR spectrum of a compound which was synthesized in Embodiment 2-1.

FIG. 2-3 is a chart showing an ultraviolet absorption spectrum in chloroform of a compound which was synthesized in Embodiment 2-1.

FIG. 2-4 is a chart showing a result of determining gas chromatography of a compound which was synthesized in Embodiment 2-1.

DISCLOSURE OF THE THIRD INVENTION GROUP

The main purpose of the third invention group is to provide a new chemical adsorbent which can form a liquid crystal alignment layer with superior thermal stability of alignment, and a manufacturing method thereof like the above-mentioned second invention group. A chemical adsorbent in the third invention group is used for a liquid crystal alignment layer and a liquid crystal display device in the following fourth invention group.

The invention in the third invention group is characterized by the following constitution, and this constitution can provide a coating material which is transparent in a range of visible ray and can be crosslinked in a range of an ultraviolet ray as well as can be bonded and fixed on a substrate by a chemisorbing method.

(1) A chemical adsorbent consisting of a compound in a normal chain comprising a group represented by the following Chemical Formula 3-1 and a group of —SiX (X is a halogen).

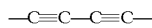  [Chemical Formula 3-1]

(2) It is possible that the above-mentioned compound is represented by the following Chemical Formula 3-2 in the above-mentioned composition (1).

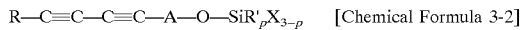  [Chemical Formula 3-2]

(R is an alkyl group, R' is an alkyl group or an alkoxy group, X is a halogen, p is an integer of 0 to 2 inclusive and A is a bifunctional group.)

(3) It is possible that the above-mentioned compound is represented by the following Chemical Formula 3-3 in the above-mentioned composition (1).

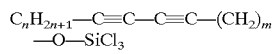  [Chemical Formula 3-3]

(n and m is an integer of 3 to 14 inclusive.)

The following constitutions can be adopted as a method of manufacturing a chemical adsorbent having the above-mentioned composition.

(4) A method of manufacturing a chemical adsorbent wherein a compound having a bond of —O—SiX$_3$ is synthesized by causing a condensation reaction of an alcohol comprising a group represented by the following Chemical Formula 3-1 and SiX$_4$ (X is a halogen) in an atmosphere of inert gas.

  [Chemical Formula 3-1]

(5) In the above-mentioned composition (4), it is possible to synthesize an alcohol having an organic group represented by the above-mentioned Chemical Formula 3-1 by a condensation reaction of a compound comprising a group represented by the following Chemical Formula 3-4 at an end and a compound having a group represented by the following Chemical Formula 3-5 at an end and a hydroxyl group at the other end.

  [Chemical Formula 3-4]

  [Chemical Formula 3-5]

(X is a halogen.)

BRIEF DESCRIPTION OF THE DRAWINGS OF THE THIRD INVENTION GROUP

FIG. 3-1 is a chart showing $^1$H-NMR spectrum of a chemical adsorbent in Embodiment 3-1.

FIG. 3-2 is a chart showing an ultraviolet and visible absorption spectrum in chloroform of a chemical adsorbent in Embodiment 3-1.

DETAILED DESCRIPTION OF THE PREFERRED EMBODIMENTS OF THE THIRD INVENTION GROUP

The third invention group is detailed based on embodiments below. In embodiments below, R-1200 made by HITACHI Ltd. was used for an analysis of $^1$H-NMR (nuclear magnetic resonance) spectrum, FTIR 4300 made by SHIMADZU Corp. was used for an analysis of IR (infrared absorption) spectrum, and UV-240 made by SHIMADZU Corp. was used for an analysis of UV (ultraviolet absorption) spectrum.

(Embodiment 3-1)

Reaction Process 1

A refined product of 57.5 g was obtained (a yield of 70.8%) by preparing 115.2 g of potassium hydroxide and 300 ml of water in a reaction flask of 1 L, and cooling to −5 to 0° C., and dropping 122.4 g of bromine in this solution through a strong stirring for 25 minutes; next, dropping 45.0 g of 5-Hexyn-1-ol (0.459 mol) at a temperature of 15° C. for 30 minutes, and after stirring at the same temperature for 30 minutes, extracting the mixture with isopropyl alcohol, and after washing the extracted solution with saturated saltwater, drying on MgSO$_4$; after removing the solvent, gaining a coarse product of 78.6 g, and refining this product with silica gel column while using a mobile phase of n-hexane:ethyl acetate=2:1.

Reaction Process 2

A refined product of 12.8 g was obtained (a yield of 32.3%) by preparing 1.16 g of copper (I) chloride and 26 ml of water and 58 ml of 70%-ethyl amine and 7.21 g of hydroxylamine hydrochloride in a reaction flask of 1L in an air current of nitrogen, and stirring at a room temperature for 20 minutes; later, adding a solution of 26.0 g of 1-Tridecyne (0.144 mol) in 270 ml of methanol to the solution, and stirring for 20 minutes; dropping a solution of 25.5 g of 6-Bromohex-5-yn-1-ol (0.144 mol) in 70 ml of methanol in the yellow suspension at a temperature of 40° C. for 50 minutes, and after dropping, stirring at the same temperature for 1 hour; next, adding 230 ml of aqueous solution of 3.6 g of potassium cyanide and 14.4 g of ammonium chloride through a strong stirring, and extracting the mixture with ethyl acetate, and after washing the extracted solution with saturated aqueous solution of ammonium chloride, drying on MgSO4; after removing the solvent, gaining a coarse product of 39.0 g, and refining this product with silica gel column while using a mobile phase of n-hexane:ethyl acetate=4:1.

Reaction Process 3

A refined product (the following general Chemical Formula 3-6) of 16.2 g was obtained (a yield of 85.3%) by preparing 12.8 g of 5,7-Nonadecadiyne-1-ol (46.4 mol) and 20 g of $SiCl_4$ in a reaction flask of 100 ml in air current of argon, and stirring at a room temperature for 1 hour; after removing excessive $SiCl_4$, filtering the insolubles.

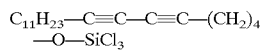

[Chemical Formula 3-6]

A product and an end product in each process were confirmed by $^1$H-NMR (FIG. 3-1).

FIG. 3-2 shows an ultraviolet and visible absorption spectrum which was obtained in chloroform. The absorption spectrum proves the existence of a signal in a range from 240 nm to 280 nm as well as no absorption in a range of visible ray and a strong absorption in a range of an ultraviolet ray and a far-ultraviolet ray.

(Embodiment 3-2)

7-Octyn-1-ol was substituted for 5-Hexyn-1-ol in Reaction Process 1 of Embodiment 3-1. The same reaction except the above was executed. As a result, a substance represented by the following general Chemical Formula 3-7 was obtained with a final yield of 35.6%.

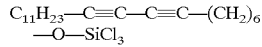

[Chemical Formula 3-7]

(Embodiment 3-3)

1-Dodecyne was substituted for 1-Tridecyne in Reaction Process 2 of Embodiment 3-1. The same reaction except the above was executed. As a result, a substance represented by the following general Chemical Formula 3-8 was obtained with a final yield of 28.2%.

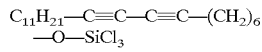

[Chemical Formula 3-8]

A group of —$SiCl_3$ was used as an area for adsorbing in the above embodiments, and it is possible to synthesize a substance comprising a halosilyl group represented by the following general Chemical Formula 3-9 similarly.

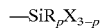

[Chemical Formula 3-9]

(R is an alkyl group or an alkoxy group, X is a halogen and p is an integer of 0 to 2 inclusive.)

As described above, according to the third invention group, it is possible to efficiently manufacture a chemical adsorbent in a normal chain which is transparent and stable in a range of a visible ray, and has a functional group represented by the above-mentioned Chemical Formula 3-1 in its molecule as a photosensitive group for photopolymerizing in a range of an ultraviolet ray, and comprises a group of $SiCl_3$ effective as an area for adsorbing in the case of using a chemisorbing method. Among a chemical adsorbent in the third invention group, it is possible to use a chemical adsorbent, which has a range of a photosensitive wavelength in a range of an ultraviolet ray and a far-ultraviolet ray (a wavelength from 200 nm to 400 nm) and is transparent in a range of visible ray (a wavelength from 400 nm to 700 nm), appropriately for a material for a liquid crystal alignment layer.

DISCLOSURE OF THE FOURTH INVENTION GROUP

The invention in the fourth invention group is characterized by the following constitution.

(1) A liquid crystal alignment layer consisting of a monomolecular thin film which is chemisorbed on a substrate surface with at least an electrode, wherein the above-mentioned thin film is composed of a substance comprising a molecule which originates in a group represented by the following Chemical Formula 4-1.

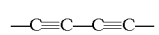

[Chemical Formula 4-1]

(2) In the above-mentioned (1), the above-mentioned substance comprises at least one of chemical bond units represented by the following Chemical Formula 4-2, Chemical Formula 4-3, Chemical Formula 4-4 or Chemical Formula 4-5, and is chemisorbed on the above-mentioned substrate surface through Si in the above-mentioned chemical bond unit, which is crosslinked to each other through a bond of C C in a particular direction.

[Chemical Formula 4-2]

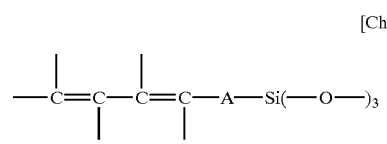

[Chemical Formula 4-3]

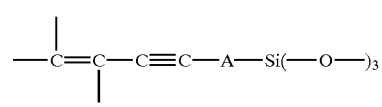

[Chemical Formula 4-4]

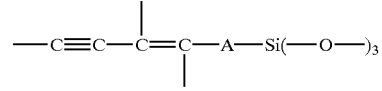

[Chemical Formula 4-5]

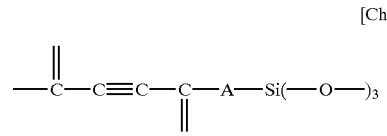

(In the above-mentioned Chemical Formulae 4-2 to 4-5, A is a bifunctional group.)

A liquid crystal alignment layer having a structure in which component molecules are crosslinked to each other at a group represented by the above-mentioned Chemical Formula 4-1 is suitable for aligning liquid crystal molecules. In particular, the liquid crystal alignment layer has a large alignment control force over a twisted nematic type liquid crystal.

A liquid crystal alignment layer having the above-mentioned composition can be manufactured by a manufacturing method having the following constitutions. (3) A method of manufacturing a liquid crystal alignment layer comprising the steps of forming a thin film consisting of chemisorbed molecules by contacting a solution comprising a chemical adsorbent having a group represented by the following Chemical Formula 4-1 and a group of —SiX (X is a halogen) on a substrate surface with at least an electrode, and chemisorbing the above-mentioned chemical adsorbent on the above-mentioned substrate surface; and crosslinking the chemisorbed molecules composing the thin film along a particular direction by irradiating an ultraviolet ray or a far-ultraviolet ray on the above-mentioned thin film surface.

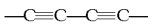  [Chemical Formula 4-1]

(4) In the above-mentioned (3), it is possible to add the steps of washing for removing the chemical adsorbent which is not yet adsorbed, and draining a washing solution in a certain direction after the above-mentioned step of forming a thin film, and to execute the above-mentioned step of crosslinking after the step of draining.

According to this composition, it is easy to control a direction of crosslinking since a removal of molecules that are not yet adsorbed and a provisional alignment of adsorbent molecules can be executed efficiently, and light is irradiated to the provisionally aligned adsorbent molecules.

(5) In the above-mentioned (4), it is possible to use a nonaqueous solvent as the above-mentioned washing solution.

(6) In the above-mentioned (4), it is possible to execute the above-mentioned draining by pulling up the above-mentioned substrate while holding in a vertical direction to a solution surface after immersing the substrate with a thin film in a washing solution comprising a nonaqueous solvent.

(7) In the above-mentioned (3), it is possible to execute the above-mentioned irradiation through a polarizer or a transparent plate on which rubbing is executed.

According to this composition, adsorbent molecules can be aligned in a particular direction.

(8) In the above-mentioned (4), it is possible to execute the above-mentioned irradiation through a polarizer or a transparent plate on which rubbing is executed.

According to this composition, adsorbent molecules can be aligned in a particular direction.

(9) In the above-mentioned (3), it is possible to execute the above-mentioned irradiation through a patterned mask which is put on a polarizer or a transparent plate on which rubbing is executed, and thereby control a direction of a chemical bond between adsorbent molecules and change an alignment direction of an adsorbent molecule in each patterned small section.

(10) In the above-mentioned (4), it is possible to execute the above-mentioned irradiation through a patterned mask which is put on a polarizer or a transparent plate on which rubbing is executed, and thereby control a direction of a chemical bond between adsorbent molecules and change an alignment direction of adsorbent molecules in each patterned small section.

(11) In the above-mentioned (3), it is possible to use a solvent consisting of molecules comprising the groups of alkyl, fluorocarbon, carbon chloride or siloxane as a solvent in a solution comprising the above-mentioned chemical adsorbent.

A liquid crystal display device in the present invention using a liquid crystal alignment layer manufactured by the above-mentioned manufacturing method can be composed as described below.

(12) A liquid crystal display device with a structure in which two substrates with at least an electrode are opposed through the electrode side and a liquid crystal is sealed between the substrates, wherein a liquid crystal alignment layer is formed on a surface of at least one of the above-mentioned substrates and the above-mentioned liquid crystal alignment layer is made by bonding and fixing on a substrate surface a thin film comprising a substance which originates in a chemical adsorbent having a functional group represented by the following Chemical Formula 4-1 and a group of —SiX (X is a halogen) in a molecular structure.

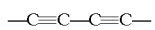  [Chemical Formula 4-1]

(13) In the above-mentioned (12), it is possible that the above-mentioned liquid crystal alignment layer is composed of a monomolecular thin film that comprises at least one of chemical bond units represented by the above-mentioned Chemical Formula 4-2, Chemical Formula 4-3, Chemical Formula 4-4 or Chemical Formula 4-5, and is chemisorbed on a surface of the above-mentioned substrate at an end of an Si group in the chemical bond unit, which is crosslinked to each other through a bond of C—C in a particular direction.

(14) In the above-mentioned (12), it is possible that the above-mentioned liquid crystal alignment layer has a different liquid crystal alignment direction at each of a plurality of small sections into which a pixel unit is divided.

(15) In the above-mentioned (14), it is possible that the above-mentioned small section is arrayed in a pattern in a pixel area on a substrate.

(16) In the above-mentioned (13), it is possible that the above-mentioned liquid crystal alignment layer has a different liquid crystal alignment direction at each of a plurality of small sections into which a pixel unit is divided.

(17) In the above-mentioned (16), it is possible that the above-mentioned small section is arrayed in a pattern in a pixel area on a substrate.

A liquid crystal display device in the fourth invention group can be composed as described below.

(18) A liquid crystal display device of an in-plane switching type (IPS) in which an electrode and an opposite electrode are formed on the same substrate, wherein a liquid crystal alignment layer is formed on a surface with the electrode and the opposite electrode of the above-mentioned substrate and the above-mentioned liquid crystal alignment layer is made by bonding and fixing a chemical adsorbent having a functional group represented by the above-mentioned Chemical Formula 4-1 and a group of —SiX (X is a halogen) in a molecular structure on a substrate surface through a bond of —Si—O— as well as crosslinking component molecules to each other in a particular direction.

(19) In the above-mentioned (18), the above-mentioned liquid crystal alignment layer is composed of a monomolecular thin film which comprises at least one of chemical bond units represented by the above-mentioned Chemical Formula 4-2, Chemical Formula 4-3, Chemical Formula 4-4 or Chemical Formula 4-5, and is chemisorbed on a surface of the above-mentioned substrate at an end of an Si group in the chemical bond unit, which is crosslinked to each other through a bond of C—C in a particular direction.

The above-mentioned liquid crystal display device can be manufactured by a manufacturing method having the following constitutions.

(20) A method of manufacturing a liquid crystal display device comprising the steps of producing a chemisorption solution by dissolving a chemical adsorbent comprising a functional group represented by the above-mentioned Chemical Formula 4-1 and a group of —SiX (X is a halogen) in a molecular structure in a nonaqueous solvent; forming a monomolecular thin film by contacting the above-mentioned chemisorption solution on a first substrate with at least a group of electrodes in a matrix, and chemisorbing the chemical adsorbent on the above-mentioned substrate plane at the group of —SiX; aligning adsorbent molecules provisionally by drain-drying the nonaqueous solvent for washing while setting up the above-mentioned substrate in a certain direction after washing the above-mentioned thin film with a nonaqueous solvent; providing an alignment characteristic by means of producing the first substrate with a liquid crystal alignment layer having a particular alignment characteristic by irradiating an ultraviolet ray or a far-ultraviolet ray on the provisionally aligned thin film, and crosslinking the adsorbent molecules to each other in a particular direction through a photopolymerization; producing an empty cell by sticking and fixing a periphery of the substrates after joining through the electrodes plane with a predetermined gap the above-mentioned first substrate with a liquid crystal alignment layer as well as an opposite substrate or a second substrate with a liquid crystal alignment layer having an opposite electrode, which is produced like the above-mentioned first substrate with a liquid crystal alignment layer; and injecting a liquid crystal into the above-mentioned empty cell.

(21) In the above-mentioned (20), it is possible to execute an irradiation of the ultraviolet ray or the far-ultraviolet ray in the above-mentioned step of providing an alignment characteristic through a patterned mask which is put on a polarizer, and thereby control a direction of a chemical bond between adsorbent molecules and produce the first substrate with a liquid crystal alignment layer in a multidomain alignment having a different alignment direction of adsorbent molecules in each patterned small section.

BRIEF DESCRIPTION OF THE DRAWINGS OF THE FOURTH INVENTION GROUP

FIG. 4-1 is a conceptional view of a cross section for describing the step of chemisorbing which is used for manufacturing a liquid crystal alignment layer in Embodiment 4-1 of the fourth invention group.

FIG. 4-2 is a conceptional view of a cross section for describing the step of washing in manufacturing a liquid crystal alignment layer in Embodiment 4-1 of the fourth invention group.

FIG. 4-3 is a view describing a light exposure treatment of a liquid crystal alignment layer in Embodiment 4-1 of the fourth invention group.

FIG. 4-4 is a conceptional view of the step of exposing which is used for realigning adsorbent molecules by light exposure in Embodiment 4-1 of the fourth invention group.

FIG. 4-5 is a conceptional view for describing an alignment state of molecules in a liquid crystal alignment layer after light exposure in Embodiment 4-1 of the fourth invention group.

FIG. 4-6 is a view showing a polymerization reaction in Embodiment 4-1 of the fourth invention group.

FIG. 4-7 is a conceptional view of a cross section for describing the manufacture of a liquid crystal display device in Embodiment 4-3 of the fourth invention group.

DETAILED DESCRIPTION OF THE PREFERRED EMBODIMENTS OF THE FOURTH INVENTION GROUP

The fourth invention group is detailed using embodiments below.

(Embodiment 4-1)

A glass substrate 1 (including a multitude of hydroxyl groups on its surface) with a transparent electrode on its surface was prepared, and washed and degreased sufficiently beforehand. Next, a chemisorption solution was produced by dissolving a chlorosilane-based chemical adsorbent (chemisorbed compound or surface active agent) comprising a carbon chain as well as a group represented by the above-mentioned Chemical Formula 4-1 and Si at an end of or inside the above-mentioned carbon chain, such as the following general Chemical Formula 4-6, in a nonaqueous solvent at a concentration of approximately 1 wt. %.

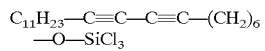
[Chemical Formula 4-6]

Well-dehydrated hexadecane was used as the nonaqueous solvent. A solution thus produced was made an adsorption solution 2, and the above-mentioned substrate 1 was immersed (or may be applied) in the adsorption solution 2 in a dry atmosphere (a relative humidity of 30% or less) for approximately an hour (FIG. 4-1).

Later, after pulling up the substrate 1 out of the adsorption solution 2 and washing the substrate 1 with well-dehydrated n-hexane 3 as a well-dehydrated nonaqueous solvent, the substrate 1 was pulled up out of a washing solution while setting up the substrate 1 in a desired direction and the washing solution was drained and the substrate 1 was exposed to an atmosphere including humidity (FIG. 4-2). Through a series of the above-mentioned steps, a reaction of eliminating HCl was caused between a group of SiCl in the above-mentioned chlorosilane-based chemical adsorbent and a hydroxyl group on the above-mentioned substrate surface, and additionally, a bond of the following general Chemical Formula 4-7 was produced by reacting with humidity in an atmosphere and a monomolecular thin film (hereinafter referred to as 'chemical adsorbent monomolecular film') was formed. This substance had a photosensitive peak in a range from 240 to 290 nm.

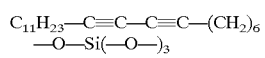
[Chemical Formula 4-7]

Then, such an effect that the above-mentioned fixed molecules are aligned provisionally in a drain direction is produced by washing the substrate 1 with an organic solvent and furthermore draining while setting up the substrate 1 in a desired direction. By means of the above treatment, a chemisorbed monomolecular film 4 which is formed by a reaction of the above-mentioned chlorosilane-based chemical adsorbent was fixed to an area including a hydroxyl group on the substrate surface through a siloxane bond, and the bonded molecules were formed with a coating thickness of approximately 2 nm in an alignment state along the drain direction.

Later, furthermore, a polarizer (HNP'B) 7(made by POLAROID Corp.) was put on two kinds of substrates in this state so that a polarized direction 6 was in approximately parallel with the drain direction 5, and an ultraviolet ray 8 of 100 mJ with a wavelength of 254 nm was irradiated (2.1 mW/cm², after transmitting a polarized film) by using an extra-high-pressure mercury-vapor lamp of 500W (FIG. 4-3).

Later, when an anisotropy of adsorbent molecules was examined with FT-IR, the above-mentioned photosensitive group was photopolymerized and thereby the absorption peak of a diacetylene group did not appear. Although a direction of a bond was not clear, the polarized direction differed from a vertical direction to the polarized direction in an absorption of a vinyl group. That is, this indicates that a substance composing the above-mentioned monomolecular film is photopolymerized at the above-mentioned photosensitive group along a predetermined direction. This indicates that a realignment is caused as shown in FIG. 4-4.

Moreover, two substrates in this state were combined through a chemisorbed film so that polarized directions were parallel and drain directions were opposite, namely, antiparallel, and a liquid crystal cell with a gap of 20 μm was constructed, and a nematic liquid crystal (ZLI4792; made by Merck & Co., Inc.) was injected, and an alignment state was examined. The injected liquid crystal molecule was aligned at an pretilt angle of approximately 50 with the substrate along a direction at an angle of 90° with the polarized direction (FIG. 4-5). In FIG. 4-5, 1 indicates a transparent electrode and 5 indicates a direction of pulling up in FIG. 4-2.

It was found through the above that although the molecules composing a film had a structure as shown in FIG. 4-5 at first, the molecules experienced a polymerization reaction shown in FIG. 4-6.

Then, it is necessary that the drain direction crosses the polarized direction 6 at an angle of not completely 90° but with a little shift from 90°, preferably more than some degrees in order to make an alignment direction of adsorbent molecules in an irradiated area the same direction. In this case, the polarized direction 16 may be in parallel with the direction 5 of draining and pulling up at the maximum. If the direction 5 of draining and pulling up crosses the polarized direction 6 at an angle of completely 90°, each molecule is occasionally aligned in two directions.

When an ultraviolet ray of 100 to 200 mJ with a wavelength of 365 nm was irradiated through a patterned mask on a polarizer in order to change an alignment direction selectively, an alignment direction changed only in an irradiated area and it was possible to provide a plurality of parts in which an alignment direction differs in a pattern on the same alignment layer, namely, a liquid crystal is aligned along each of the draining direction 5 and the polarized direction 16. Moreover, it was possible to manufacture extremely easily a monomolecular liquid crystal alignment layer having a plurality of alignment directions which differ in a pattern by executing the step of exposing through a desired mask on a polarizer on the same condition a plurality of times. That is, it was possible to provide a liquid crystal display device wherein a pixel is in a multidomain alignment.

In Embodiment 4-1, hydrocarbon-based n-hexane comprising an alkyl group was used as a nonaqueous solvent for washing, and any nonaqueous solvent that dissolves a chemical adsorbent can be used besides this solvent. For instance, it was possible to use a solvent comprising the groups of fluorocarbon, carbon chloride or siloxane such as Freon 113, chloroform and hexamethyldisiloxane.

An effect of aligning a twisted nematic liquid crystal was particularly great in a liquid crystal alignment layer comprising a chemical bond unit represented by the above-mentioned Chemical Formula 4-2 to 4-5 in Embodiment 1.

Then, a solvent comprising the groups of alkyl, fluorocarbon, carbon chloride or siloxane was applicable to a nonaqueous organic solvent for producing a chemisorption solution.

(Embodiment 4-2)

In Embodiment 1, a substance represented by the following general Chemical Formula 4-8 was used as a chlorosilane-based chemical adsorbent comprising a photosensitive functional group represented by the above-mentioned Chemical Formula 4-1 and Si. Later, an acrylic plate through rubbing with an abrasive of 0.3 μm was put on a substrate, and a far-ultraviolet ray of 80 mJ with a wavelength of 254 nm was irradiated (2.1 mW/cm², after transmitting a acrylic plate) by using an extra-high-pressure mercury-vapor lamp of 500W. The same experiment except the above was executed. This substance had a photosensitive peak in a range from 240 to 280 nm.

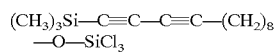
[Chemical Formula 4-8]

Moreover, two substrates in this state were combined through a chemisorbed film so that rubbing directions were parallel and drain directions were opposite, namely, antiparallel, and a liquid crystal cell with a gap of 20 μm was constructed, and a nematic liquid crystal (ZLI4792; made by Merck & Co., Inc.) was injected, and an alignment state was examined. The injected liquid crystal molecules were aligned at an pretilt angle of approximately 3° C. with the substrate along a direction at an angle of 90° with the rubbing direction.

Like the above-mentioned substance, a substance which can be used as a substance for forming a film is represented by the following Chemical Formula 4-9 and 4-10 (n is an integer of 1 to 25 inclusive, R is an alkyl group having 1 to 3 C or a phenyl group, Ar is a functional group comprising a heterocycle and X is a halogen).

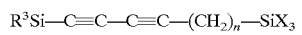 [Chemical Formula 4-9]

 [Chemical Formula 4-10]

More specifically, a substance which can be used is represented by the following Chemical Formula 4-11 (This substance has a photosensitive peak in a range from 250 to 300 nm.), Chemical Formula 4-12 (This substance has a photosensitive peak in a range from 240 to 290 nm.), Chemical Formula 4-13 (This substance has a photosensitive peak in a range from 240 to 280 nm.) or Chemical Formula 4-14 (This substance has a photosensitive peak in a range from 240 to 310 nm.).

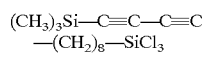
[Chemical Formula 4-11]

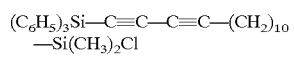
[Chemical Formula 4-12]

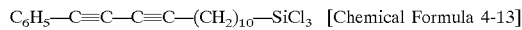 [Chemical Formula 4-13]

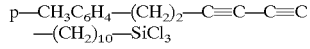
[Chemical Formula 4-14]

These compounds were similarly applicable although they had a different amount of exposure.

(Embodiment 4-3)

An actual process of manufacturing a liquid crystal display device by sing the above-mentioned liquid crystal alignment layer is described below referring to FIG. 4-7.

First, as shown in FIG. 4-7, a similar chemisorbed monomolecular film was manufactured by applying a chemisorption solution, which was produced under the same procedure as Embodiment 4-1, on a first substrate 23 having a first group of electrodes 21 in a matrix and a group of transistors 22 for driving the electrodes as well as a second substrate 26 having a group of color filters 24 opposite to the first group of electrodes and a second electrode 25.

As a result, a liquid crystal alignment layer 27, which was realigned along an electrode pattern, was manufactured like Embodiment 4-1. Next, the above-mentioned first and second substrates 23, 26 were joined so that their electrodes were opposite, and a cell with a gap of approximately 5 μm in which an alignment direction is twisted by 90° was constructed with a spacer 28 and an adhesive 29. Later, after injecting the above-mentioned nematic liquid crystal 30 (ZLI4792; made by Merck & Co., Inc.) between the above-mentioned first and second substrates, a display device was completed by combining polarizers 31, 32. Then, a pretilt angle of the injected liquid crystal was 5°.

Such a device could display a picture in a direction of an arrow A by driving each transistor with a video signal while irradiating a backlight 33 on the whole surface.
(Embodiment 4-4)

After forming a monomolecular film in Embodiment 4-3, it was possible to provide four parts in which an alignment direction differs in a pattern in the same pixel by executing the step of exposing through a patterned mask dividing each pixel into four sections in a check on the above-mentioned polarizer once on the same condition as Embodiment 4-1. Moreover, it was possible to improve a viewing angle of a liquid crystal display device greatly by using the substrate with this alignment layer.

A liquid crystal display device with a superior stability of alignment was obtained by forming the above-mentioned film on each surface of a pair of substrates with an electrode as an alignment layer.

The alignment layer was extremely effective in a liquid crystal display device wherein opposite electrodes are formed on a substrate surface, namely, in-plane switching (IPS) type because of no rubbing.

A light with a wavelength of 254 nm from an extra-high-pressure mercury-vapor lamp were used as a light for exposing in the above-mentioned Embodiment 4-1, and it is possible to use a light with a wavelength of 436 nm and 405 nm and 365 nm as well as a light with a wavelength of 248 nm by KrF excimer laser depending on an absorption of light into a film substance. In particular, the light with a wavelength of 248 nm and 254 nm has a high efficiency in energy alignment since the light is easily absorbed into most substances.

In addition, a substance comprising an alkoxysilane group and an isocyanatosilane group could be used as a chemical adsorbent instead of a substance comprising a group of chlorosilane. In this case, a film with a high alignment was obtained.

As described above, the fourth invention group can provide without rubbing an alignment layer with a high thermal stability, which is remarkably uniform and thin as compared with a conventional layer, on which a liquid crystal alignment direction is injected is controlled by irradiating for photopolymerization with the use of an ultraviolet ray and a far-ultraviolet ray, and a pretilt angle is controlled by a composition of a photopolymerized monomolecular film.

Moreover, a plurality of parts in which only an alignment direction differs in a pattern on the same alignment layer can be provided by executing the step of exposing through a patterned mask on a polarizer a plurality of times after the step of forming a monomolecular film, and although it was difficult to manufacture a liquid crystal display device in a multidomain alignment, wherein an alignment of each pixel is divided into a plurality of kinds, by a conventional rubbing, the liquid crystal display device in a multidomain alignment can be manufactured rationally with a high efficiency.

In addition, a liquid crystal display device with an extremely high reliability can be provided since such an alignment layer is bonded firmly on a substrate surface through a covalent bond.

DISCLOSURE OF THE FIFTH INVENTION GROUP

The fifth invention group is completed by noticing that a chalcone skeleton has a high photoreactivity, and the constitution of the invention in the fifth invention group is characterized by a chemical adsorbent consisting of a chalcone derivative wherein a functional group is bonded to a benzene ring composing a chalcone skeleton and a characteristic group comprising a group of —SiX (X is a halogen, an alkoxyl group or an isocyanato group) is bonded to the other benzene ring.

The chalcone skeleton in the above-mentioned composition indicates a compound represented by the following Chemical Formula 5-4, and a chalcone derivative wherein a particular substituent is bonded to two benzene rings has a particularly high reactivity. In a chemical adsorbent having the above-mentioned composition, the group of —SiX functions as a chemisorbed group. Therefore, the compound can be chemically bonded (chemisorbed) through the group of —SiX on a substrate plane having such hydrophilic groups as OH group, COOH group, $NH_2$ group, NH group and SH group. Moreover, a vinyl group functions as a photoreactive group. Therefore, the molecules can be crosslinked to each other through the vinyl group by irradiating.

[Chemical Formula 5-4]

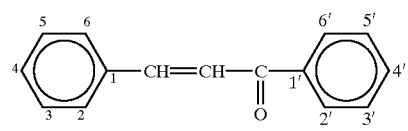

A significance of using a chemical adsorbent having the above-mentioned composition as a material for a liquid crystal alignment layer is as follows. A thin film, which is formed by contacting the above-mentioned chemical adsorbent on a substrate and chemisorbing it, has a monolayer-like structure wherein molecules, in which an end (Si) in a direction of its major axis is bonded on the substrate plane and the other end is aligned in a direction opposite to the substrate, is arrayed in a lateral direction. The film is an extremely thin film in nanometer order, and transparent in a range of visible ray and chemically stable. Meanwhile, the film has a characteristic in which a photoreaction is caused in a vinyl group in a chalcone skeleton by irradiating a light in a range of ultraviolet rays. Therefore, after chemisorbing the above-mentioned chemical adsorbent on a substrate, it is possible to crosslink and connect component molecules to each other by irradiating ultraviolet ray, and thereby stabilize an alignment of the component molecules in a steric structure. In addition, if a polarized light is used in irradiating ultraviolet ray, it is possible to cause a crosslinking along a certain direction and thereby control an alignment direction of the component molecules by determining a polarized direction.

In the above-mentioned thin film wherein molecules are arrayed in parallel with a substrate plane, a liquid crystal molecule can enter each gap (valley) between component molecules. Therefore, a thin film wherein the component molecules are aligned in a certain direction has a particular alignment of a liquid crystal. Moreover, since each of the component molecules is involved in an alignment of a liquid crystal, the above-mentioned thin film indicates a strong alignment control force despite an extremely thin film. Furthermore, since the component molecules are connected to each other by crosslinking, an alignment is not deteriorated by an external stimulus such as heat and rubbing. In addition, since the film is extremely thin and transparent, and not an organic polymer film, it scarcely functions as an electrical resistance film. Therefore, the film has an extremely appropriate characteristic for a liquid crystal alignment layer, in which a light transmission and an electric field for driving a liquid crystal are not hindered.

Meanwhile, a conventional liquid crystal alignment layer (such as a polymer film made of the above-mentioned polyimide), which is composed closely in a state wherein a long main chain is tangled up, has difficulty in obtaining a sufficient alignment control force since only a surface of the film can contribute to an alignment of a liquid crystal. Moreover, in a conventional alignment layer for which an alignment is provided by rubbing, the alignment is changed or deteriorated by an external stimulus such as heat and rubbing. Furthermore, since such a polymer film as polyimide has a thick coating and a high electrical resistance, it is a hindrance factor to a light transmission and a liquid crystal driving.

A chemical adsorbent having the above-mentioned composition is extremely useful as a material for a liquid crystal alignment layer, and a use for the adsorbent is not limited to this.

In the above-mentioned composition, it is preferable to add the components described below in (1) to (4). According to a composition to which the following components are added, an effect of the above-mentioned function can be actualized even more certainly.

(1) The above-mentioned chalcone derivative is a compound represented by the following Chemical Formula 5-1.

[Chemical Formula 5-1]

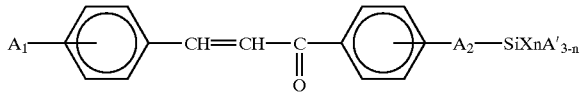

($A_1$ is a functional group bonded to a benzene ring in a chalcone skeleton, $A_2$ is a bifunctional group bonded to the other benzene ring, X is a halogen, an alkoxyl group or an isocyanato group, A' is an alkyl group or an alkoxyl group, and n is an integer of 0 to 3 inclusive.)

(2) $A_1$ in the above-mentioned Chemical Formula 5-1 is bonded to 4-position of a benzene ring in a chalcone skeleton.

(3) $A_1$ in the above-mentioned Chemical Formula 5-1 is a characteristic group represented by the following Chemical Formula 5-2 or Chemical Formula 5-3.

[Chemical Formula 5-2]

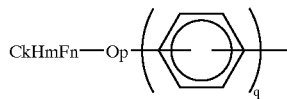

(k is an integer of 1 to 18 inclusive, m and n are an integer of 0 to 37 inclusive, m+n=2k+1, p is an integer of 0 or 1, and q is an integer of 0 or 1.)

[Chemical Formula 5-3]

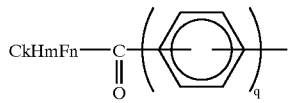

(k is an integer of 1 to 18 inclusive, m and n are an integer of 0 to 37 inclusive, m+n=2k+1, and q is an integer of 0 or 1.)

(3-1) $A_2$ in the above-mentioned Chemical Formula 5-1 is bonded to 4'-position of a benzene ring in a chalcone skeleton.

(4) $A_2$ in the above-mentioned Chemical Formula 5-1 is represented by a group of —$(CH_2)_n$—O—, —O—$(CH_2)_n$—O—, or —CO—$(CH_2)_n$—O— (n is an integer of 2 to 14 inclusive.).

(5) $A_1$ in the above-mentioned Chemical Formula 5-1 is a characteristic group represented by the following Chemical Formula 5-2 or Chemical Formula 5-3 which is bonded to 4-position of a benzene ring in a chalcone skeleton, and $A_2$ is represented by a group of —$(CH_2)_n$—O—, —O—$(CH_2)_n$—O—, or —CO—$(CH_2)_n$—O— (n is an integer of 2 to 14 inclusive.) which is bonded to 4'-position of a benzene ring.

A method of manufacturing the above-mentioned chemical adsorbent is as follows.

(6) A method of manufacturing a chemical adsorbent comprising the step of bonding a halogen or an alkoxy group to Si in a molecule having a group of a chalcone skeleton with a functional group at least at 4-position as well as Si in an atmosphere of inert gas.

(7) A method of manufacturing a chemical adsorbent comprising at least the step of synthesizing a chalcone derivative having a bond of —O—$SX_3$ by causing a condensation reaction between an alcohol comprising a group of a chalcone skeleton with a functional group at least at 4-position of a benzene ring composing a chalcone skeleton and $SiX_4$ (X is a halogen) in an atmosphere of inert gas.

(8) A method of manufacturing a chemical adsorbent comprising at least the step of causing an aldol condensation reaction between a benzaldehyde with a functional group at least at 4-position and a compound having a benzoyl group.

The invention in the fifth invention group is described in detail. A chemical adsorbent is characterized by consisting of a chalcone derivative wherein a functional group is bonded to a benzene ring composing a chalcone skeleton and a characteristic group comprising a group of —SiX (X is a halogen, an alkoxyl group or an isocyanato group) is bonded to the other benzene ring, and moreover, a compound represented by the following Chemical Formula 5-1 can be exemplified as a preferable form of a chalcone derivative having this characteristic. In the Chemical Formula 5-1, a compound in which a functional group ($A_1$) is bonded to 4-position of a benzene ring in a chalcone skeleton is preferable because of little steric hindrance and high reactivity in photoreacting. However, a functional group ($A_1$) may be bonded to 2-position or 3- position of a benzene ring, and to 2-position and/or 3- position as well as 4-position.

[Chemical Formula 5-1]

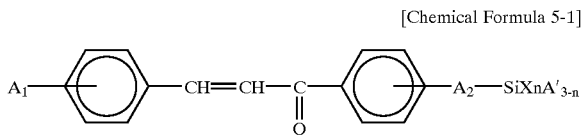

($A_1$ is a functional group bonded to a benzene ring in a chalcone skeleton, $A_2$ is a bifunctional group bonded to the other benzene ring, X is a halogen, an alkoxyl group or an isocyanato group, A' is an alkyl group or an alkoxyl group, and n is an integer of 0 to 3 inclusive.)

A substituent mentioned below is suitable for a functional group ($A_1$) bonded to a benzene ring. However, these are the examples and, needless to say, the functional group ($A_1$) is not limited to these examples.

(1) Hydrocarbon groups such as methyl, ethyl, n-propyl, n-butyl, n-pentyl, n-hexyl, n-heptyl, n-octyl, n-nonyl, n-decyl, n-undecyl, n-tridecyl, n-tetradecyl, n-pentadecyl, n-hexadecyl, n-heptadecyl, n-octadecyl, n-nonadecyl, n-eicosyl and phenyl (2) A hydrocarbon group comprising a double bond of C=C or a triple bond of C≡C in a part of the above-mentioned hydrocarbon group (1)

(3) A functional group in which another functional group (such as the groups of methyl, methyl halide, hydroxyl and cyano) and/or an atom (such as F, Cl, Br and I) is substituted for a hydrogen in the above-mentioned hydrocarbon group (1) and (2)

(4) A perfluoro type functional group of the above-mentioned hydrocarbon group (1) and (2)

(5) A functional group in which a fluorine is substituted for a hydrogen bonded to a carbon from an end to the eighth in the above-mentioned hydrocarbon group (1) and (2)

(6) A functional group in which a bond of C—O—C (ether) or a bond of C—CO—C (carbonyl) is substituted for a part of a bond of C—C in the above-mentioned hydrocarbon group (1) and (2)

(7) An alkoxyl group comprising the above-mentioned hydrocarbon group (1) and (2)

(8) A perfluoro type functional group in which a bond of C—O—C (ether) or a bond of C—CO—C (carbonyl) is substituted for a part of a bond of C—C in the above-mentioned hydrocarbon group (1) and (2)

(9) A functional group in which a bond of C—O—C (ether) or a bond of C—CO—C (carbonyl) is substituted for a part of a bond of C—C and a fluorine is substituted for a hydrogen bonded to a carbon from an end to the eighth in the above-mentioned hydrocarbon group (1) and (2)

(10) An alkoxyl group comprising a perfluoro substituent of the above-mentioned hydrocarbon group (1) and (2)

(11) An alkoxyl group comprising a functional group in which a fluorine is substituted for a hydrogen bonded to a carbon from an end to the eighth in the above-mentioned hydrocarbon group (1) and (2)

(12) A carbonyl group to which a perfluoro substituent of the above-mentioned hydrocarbon group (1) and (2) is bonded

(13) A carbonyl group to which a functional group in which a fluorine is substituted for a hydrogen bonded to a carbon from an end to the eighth in the above-mentioned hydrocarbon group (1) and (2) is bonded A substituent having a functional group with a wide conjugate structure in bonding to a chalcone skeleton and an electron donative functional group is particularly preferable in practice among the above-mentioned substituents. The reason is that a chalcone derivative to which such a functional group is bonded has a peak wavelength of light absorption in around 365 nm (i-line of an extra-high-pressure mercury-vapor lamp).

Meanwhile, a bifunctional group without an atom at an end in a substituent among the above-mentioned substituents proposed for $A_1$ is suitable for a bifunctional group ($A_2$) bonding a group of —SiX for chemisorbing (X is a halogen, an alkoxyl group or an isocyanato group) and a chalcone skeleton. However, the bifunctional group ($A_2$) is not limited to the bifunctional group.

Among a chemical adsorbent represented by the above-mentioned Chemical Formula 5-1, a compound, which has a range of a photosensitive wavelength in a range of an ultraviolet ray and a far-ultraviolet ray (a wavelength from 200 nm to 400 nm) and is transparent and colorless in a range of visible ray (a wavelength from 400 nm to 700 nm), is appropriate for a material for a liquid crystal alignment layer.

In a manufacturing method, a chemical adsorbent in the fifth invention group may be synthesized by using a chalcone derivative for a starting substance or manufactured by synthesizing a chalcone skeleton. In order to synthesize a chalcone skeleton, it is preferable to use an aldol condensation reaction (including the following dehydration) between a benzaldehyde having at 4-position a desirable functional group for bonding at 4-position of a chalcone skeleton and a substance having a benzoyl group.

In the case of using a chalcone derivative for a starting substance, it is preferable to use a chalcone derivative having at 4-position a desirable functional group for bonding at 4-position of a chalcone skeleton. The details of a manufacturing method are described in the following embodiments.

BRIEF DESCRIPTION OF THE DRAWINGS OF THE FIFTH INVENTION GROUP

FIG. 5-1 is showing the synthesis equations (a) to (c) in Embodiment 5-1 of the present invention.

FIG. 5-2 is a chart showing $^1$H-NMR spectrum of a compound which was synthesized in Embodiment 5-1 of the present invention.

FIG. 5-3 is a chart showing an ultraviolet and visible absorption spectrum of a compound which was synthesized in Embodiment 5-1 of the present invention.

FIG. 5-4 is a chart showing a gas chromatography of a compound which was synthesized in Embodiment 5-1 of the present invention.

FIG. 5-5 is a chart showing an ultraviolet and visible absorption spectrum of a thin film manufactured by using a compound which was synthesized in Embodiment 5-1 of the present invention.

DETAILED DESCRIPTION OF THE PREFERRED EMBODIMENTS OF THE FIFTH INVENTION GROUP

The fifth invention group is detailed using embodiments below. In embodiments below, R-1200 made by HITACHI Ltd. was used for an analysis of $^1$H-NMR spectrum, FTIR 4300 made by SHIMADZU Corp. was used for an analysis of IR spectrum, and UV-240 made by SHIMADZU Corp. was used for an analysis of UV/VIS spectrum.

(Embodiment 5-1)

Reaction Process 1

A refined product (4-Methoxy-4'-hydroxychalcone) of 207 g was obtained (a yield of 75%) by preparing 147 g of 4-Methoxybenzaldehyde (1.08 mol) and 147 g of 4-Hydroxyacetophenone (1.08 mol) and 1.3 L of ethanol in a reaction flask of 5L, and dropping 2.16 L of 10%-sodium hydroxide aqueous solution at a temperature of 5 or less for 3 hours; after dropping, stirring at a room temperature for 3 days; injecting the solution into 1.8 L of water with ice, and adding 2.5 L of 2N-hydrochloric acid, and gaining precipitated crystal through filtration; washing the gained coarse crystal with isopropyl alcohol and toluene, and drying. The equation is shown in (a) of FIG. 5-1.

Reaction Process 2

A refined product (4-Methoxy-4'-(6-hydroxyhexyloxy) chalcone) of 134.4 g was obtained (a yield of 53.5%) by preparing 180 g of 4-Methoxy-4'-hydroxychalcone (0.709 mol) and 1260 ml of dry DMF (N,N-dimethylformamide) in a reaction flask of 3 L in an air current of argon, and adding 28.4 g of 60%-sodium hydride (0.709 mol) in ice cooling for 40 minutes; later, heating to a room temperature and stirring for 20 hours; next, dropping 97 g of 6-chlorohexanol (0.709 mol) at the same temperature for 20 minutes; later, heating to 80, and reacting for 20 hours; after injecting the solution into water with ice and extracting the product with ethyl acetate and washing with water, adding magnesium sulfate to the ethyl acetate solution, and drying through dehydration; later, removing the ethyl acetate; refining (mobile phase, hexane:ethyl acetate=1:1) the gained coarse crystal with silica gel column; furthermore, recrystallizing with ethyl acetate. The equation is shown in (b) of FIG. 5-1.

Reaction Process 3

A refined product represented by the following Chemical Formula 5-5 of 70 g was obtained (a yield of 56.5%) by preparing 90 g of 4-Methoxy-4'-(6-hydroxyhexyloxy) chalcone (0.245 mol) and 360 g of silicon tetrachloride (2.12 mol) in a reaction flask of 1 L in an air current of argon, and stirring at a room temperature for 2 hours; after removing excessive silicon tetrachloride and adding dehydrated hexane to the residue and dispersing a crystal, gaining through filtration, and drying. The equation is shown in (c) of FIG. 5-1.

[Chemical Formula 5-5]

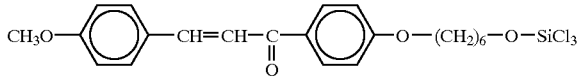

It was confirmed by $^1$H-NMR that an objective product was obtained as regards a product and an end product in each process. FIG. 5-2 shows $^1$H-NMR spectrum of an end product.

FIG. 5-3 shows a result of determining an ultraviolet and visible absorption spectrum after dissolving this substance in chloroform. As clearly shown in FIG. 5-3, there exists no absorption in a range of visible ray. Meanwhile, it is confirmed that an absorption in a range of an ultraviolet ray with a peak of 340 nm. This proves that this substance has a strong absorption in a range of an ultraviolet ray and a far-ultraviolet ray.

FIG. 5-4 shows a result of determining gas chromatography of this substance. The signal at a retention time of 15.257 min. in FIG. 5-4 indicates 4-Methoxy-4,-(6-trichlorosiloxyhexyloxy)-chalcone which was obtained in Embodiment 5-1. A purity of this compound is 99.4% or more, judging from an area ratio of the peak at a retention time of 15.257 min. to all peaks except a peak at a retention time of approximately 1 min. The signal at a retention time of approximately 1 min. indicates a solvent with a low boiling point of a carrier.

[The Formation and Analysis of a Thin Film]

A thin film was formed and its characteristic was analyzed as described below by using a substance represented by the above-mentioned Chemical Formula 5-5.

A monomolecular thin film was formed by washing the substrate surface with chloroform and removing a substance which is not yet adsorbed after immersing a quartz substrate (or a glass substrate) in a solution of a substance represented by the above-mentioned Chemical Formula 5-5 in a hydrocarbon-based or silicon-based solvent for 2 hours.

The analysis of an ultraviolet and visible absorption spectrum was executed as regards a thin film on the quartz substrate. FIG. 5-5 shows the result. An absorption peak of 325 nm resulting from a chalcone skeleton was confirmed by FIG. 5-5.

The result of determining a contact angle of a thin film on a glass substrate to water was 64°. Moreover, the result of determining its thickness by using an ellipsometer with a refractive index of 1.45 was approximately 2.6 nm.

It was confirmed through the above that a monomolecular thin film having a photoreactive group in a range of an ultraviolet ray can be formed by contacting a solution of a chemical adsorbent represented by the above-mentioned Chemical Formula 5-5 to a substrate.

Furthermore, after irradiating a polarized light (365 nm, a light strength of 2.1 mW/cm$^2$) of 480 mJ/cm$^2$ on a thin film of a substrate with a thin film manufactured in the above, the substrates were joined through the thin film with a gap of 20 μm, and a periphery of the substrates was sealed. Later, a nematic liquid crystal (ZLI4792; made by Merck & Co., Inc.) was injected into the gap between the substrates, and the existence of a liquid crystal molecule alignment was examined by using a polarizer and a transmitted light. As a result, it was confirmed that the liquid crystal molecules were aligned in a polarized direction.

(Embodiment 5-2)

4-Butylbenzaldehyde was substituted for 4-Methoxybenzaldehyde in Reaction Process 1 of Embodiment 5-1. The same reaction except the above was executed. As a result, a substance represented by the following Chemical Formula 5-6 was obtained with a final yield of 65.5%.

[Chemical Formula 5-6]

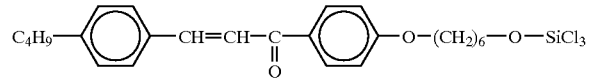

(Embodiment 5-3)

4-Fluorobenzaldehyde was substituted for 4-Methoxybenzaldehyde in Reaction Process 1 of Embodiment 5-1. The same reaction except the above was executed. As a result, a substance represented by the following Chemical Formula 5-7 was obtained with a final yield of 69.3%.

[Chemical Formula 5-7]

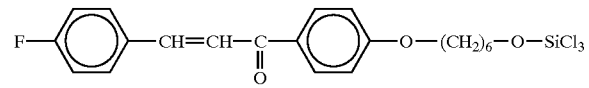

(Embodiment 5-4)

4-Perfluorobenzaldehyde was substituted for 4-Methoxybenzaldehyde in Reaction Process 1 of Embodiment 5-1. The same reaction except the above was executed. As a result, a substance represented by the following Chemical Formula 5-8 was obtained with a final yield of 54.2%.

[Chemical Formula 5-8]

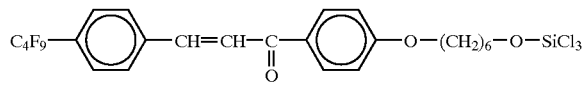

In the above embodiments, a group of —$SiCl_3$ was introduced as an area for adsorbing by using a silicon tetrachloride, and it is possible to synthesize a chemical adsorbent represented by the following Chemical Formula 5-1 by substituting a group of Cl—Si—$X_nA'_{3-n}$ (X is a halogen, an alkoxyl group or an isocyanato group, A' is an alkyl group or an alkoxyl group, and n is an integer of 0 to 3 inclusive.) for a silicon tetrachloride.

[Chemical Formula 5-1]

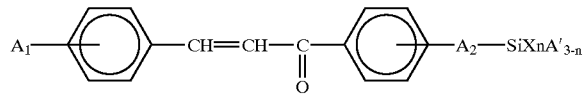

($A_1$ is a functional group bonded to a benzene ring in a chalcone skeleton, $A_2$ is a bifunctional group bonded to the other benzene ring, X is a halogen, an alkoxyl group or an isocyanato group, A' is an alkyl group or an alkoxyl group, and n is an integer of 0 to 3 inclusive.)

As described above, according to the fifth invention group, it is possible to provide a chemical adsorbent which is transparent and stable in a range of a visible ray, and has a photosensitive group to a light in a range of an ultraviolet ray, and further has a group of —SiX (X is a halogen, an alkoxyl group or an isocyanato group.) for functioning as an area for adsorbing in the case of using a chemisorbing method. Therefore, such a notable effect that an appropriate liquid crystal alignment layer with a superior alignment characteristic and no hindrance of light transmission and electric field can be provided with a high productivity is produced by using this chemical adsorbent.

DISCLOSURE OF THE SIXTH INVENTION GROUP

The invention in the sixth invention group is characterized by a liquid crystal alignment layer wherein a thin film comprising a chemical adsorbent having a characteristic group represented by the following Chemical Formula 6-1 in a molecular structure is bonded and fixed directly or with an interposition of a different substance layer on a substrate surface with an electrode by a bond of SiO.

[Chemical Formula 6-1]

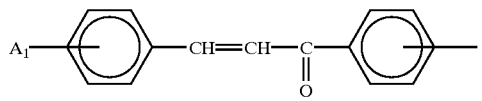

$A_1$ is a functional group bonded to a benzene ring.

It is preferable that a liquid crystal alignment layer having the above-mentioned composition is, further, a monomolecular thin film and has a liquid crystal alignment control force which can align liquid crystal molecules in a particular direction. Furthermore, it is preferable that its coating thickness is 0.5 nm or more and below 10 nm. Since a monomolecular thin film has no hindrance of light transmission and extremely little hindrance of electric field because of its extreme thinness, it is possible to actualize a liquid crystal display device with a superior luminance which can be driven by a low voltage.

Although an ideal monolayer monomolecular film indicates a layer in which each component molecule is arrayed along a substrate plane and thereby is not put on each other, it is realistically difficult to form a perfect monolayer. Even if a layer is not a perfect monolayer, the purpose in the sixth invention group can be attained sufficiently. Accordingly, it is preferred that 'a monomolecular thin film' in the sixth invention group is a thin film in which a monolayer is recognized approximately. For instance, a monomolecular thin film may include an area in a layer of a plurality of molecules wherein a molecule which is not yet adsorbed is on an adsorbent molecule on a substrate, or an area in a range of a plurality of molecules wherein a molecule which is not bonded and fixed directly on a substrate is bonded to a directly fixed molecule and additionally another molecule is bonded to the former molecule. Therefore, a monomolecular thin film in the sixth invention group indicates a layer with a thickness of approximately 5 nm or less.

It is preferable that $A_1$ of Chemical Formula 6-1 in the above-mentioned composition is bonded to 4-position of a benzene ring in a chalcone skeleton represented by the following Chemical Formula 6-2, and additionally that $A_1$ of Chemical Formula 6-1 is a characteristic group represented by the following Chemical Formula 6-3 or Chemical Formula 6-4.

[Chemical Formula 6-2]

[Chemical Formula 6-3]

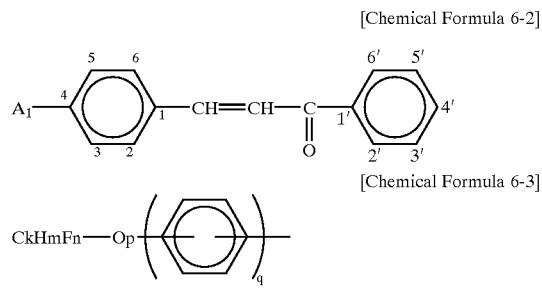

(k is an integer of 1 to 18 inclusive, m and n are an integer of 0 to 37 inclusive, m+n=2k+1, p is an integer of 0 or 1, and q is an integer of 0 or 1.)

[Chemical Formula 6-4]

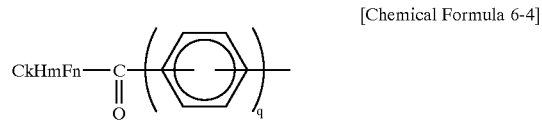

(k is an integer of 1 to 18 inclusive, m and n are an integer of 0 to 37 inclusive, m+n=2k+1, and q is an integer of 0 or 1.)

A liquid crystal alignment layer having the above-mentioned composition can be composed of only one kind of chemical adsorbent having a characteristic group represented by the above-mentioned Chemical Formula 6-1, or two kinds of chemical adsorbents having a characteristic group represented by the above-mentioned Chemical Formula 6-1, or furthermore, more than one kind of chemical adsorbent having a characteristic group represented by the above-mentioned Chemical Formula 6-1 and other chemical substances. In any of the above-mentioned conditions, it is preferable because of forming a uniform film that at least one of substances composing a liquid crystal alignment layer (thin film) has an alkyl skeleton in a normal chain, a siloxane skeleton in a normal chain or a fluoroalkyl skeleton in a normal chain. Consequently, a uniform film can actualize a high alignment.

Moreover, it is possible that a liquid crystal alignment layer having the above-mentioned composition has a liquid crystal alignment control force which can align liquid crystal molecules in a certain direction and has a liquid crystal alignment control force which can align in a plurality of different directions. In the case of aligning in a plurality of different directions, it is preferable that a small section into which a pixel unit is divided differs from each other in a liquid crystal alignment direction, and more preferably that the above-mentioned small section is formed in a pattern. Consequently, an alignment layer having such an alignment characteristic can actualize a liquid crystal display device with a wide viewing angle.

The above-mentioned liquid crystal alignment layer can be manufactured by a method of manufacturing a liquid crystal alignment layer comprising the steps of forming a monomolecular thin film on a substrate by contacting a material for a thin film comprising a chemical adsorbent represented by the following Chemical Formula 6-5 on the substrate surface with at least an electrode, and chemisorbing the above-mentioned material for a thin film on the above-mentioned substrate surface; and treating an alignment of the above-mentioned thin film.

[Chemical Formula 6-5]

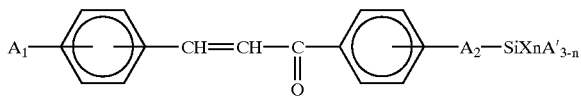

($A_1$ is a functional group bonded to a benzene ring in a chalcone skeleton, $A_2$ is a bifunctional group, X is a halogen or an alkoxyl group, A' is an alkyl group or an alkoxyl group, and n is an integer of 0 to 3 inclusive.)

It is preferable that the above-mentioned chemical adsorbent is a compound wherein $A_1$ is bonded to 4-position of a benzene ring and, additionally, is a characteristic group represented by the following Chemical Formula 6-3 or Chemical Formula 6-4.

[Chemical Formula 6-3]

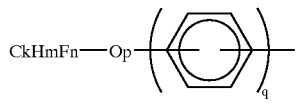

(k is an integer of 1 to 18 inclusive, m and n are an integer of 0 to 37 inclusive, m+n=2k+1, p is an integer of 0 or 1, and q is an integer of 0 or 1.)

[Chemical Formula 6-4]

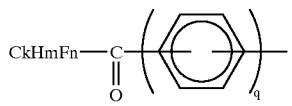

(k is an integer of 1 to 18 inclusive, m and n are an integer of 0 to 37 inclusive, m+n=2k+1, and q is an integer of 0 or 1.)

It is preferable that $A_2$ of the above-mentioned Chemical Formula 6-5 is a group of —$(CH_2)_n$—O—, —O—$(CH_2)_n$—O—, or —CO—$(CH_2)_n$—O— (n is an integer of 2 to 14 inclusive.)

In the above-mentioned manufacturing method, it is possible to use a material for a thin film composed of more than one kind of chemical adsorbent having the above-mentioned functional group, and a material for a thin film combining more than one kind of chemical adsorbent having the above-mentioned functional group and other compounds. The composition of a material for a thin film by a plurality of kinds of compounds with a different chemical and physical characteristic can change heat-resistance of a thin film, density of a thin film, alignment control force, solubility with a solvent, sensitivity to a polarized light and adsorption force on a substrate, and thereby an alignment layer with a desirable characteristic can be obtained.

Moreover, in the above-mentioned manufacturing method, it is preferable to add the step of washing a substrate surface with a thin film with an organic solvent to remove an excessive material for a thin film between the above-mentioned steps of forming a thin film and treating an alignment. A nonprotic solvent is preferable as an organic solvent for washing in terms of washability, and a mixed solution of a nonprotic solvent and a protic solvent can be used. Consequently, a mixed solvent can adjust a solubility with a material for a thin film suitably and control an evaporation rate of a solvent.

The following methods of drain-drying and polarizing irradiation can be exemplified as treating an alignment in the above-mentioned manufacturing method.

The above-mentioned method of drain-drying is a method of contacting an organic solvent on a substrate surface with a thin film, and later drain-drying the above-mentioned organic solvent in a certain direction. According to this method, molecules composing a thin film can be aligned provisionally. The above-mentioned organic solvent for washing can be used appropriately as a solvent for drain-drying. Therefore, washing of a substrate surface and provisional alignment of molecules composing a thin film can be executed by a series of operations of drain-drying an organic solvent remaining on the substrate plane while setting up the substrate through washing in a certain direction.

Although an alignment control force over liquid crystal molecules is given by provisional alignment to some extent, a stability with heat and other external stimuli is insufficient merely by provisional alignment.

Meanwhile, a method of polarizing irradiation is a method of irradiating a polarized light on a substrate plane with a thin film. According to this method, molecules composing a thin film can be chemically bonded (crosslinked) to each other in a particular direction by photo energy, and thereby an alignment control force which can align liquid crystal molecules can be given to a thin film. This alignment control force is superior in thermal stability and chemical stability since it is caused by linking of molecules through chemical bond.

It is preferable to execute a plurality of irradiations with a different light strength and/or wavelength in applying a method of polarizing irradiation. For instance, a plurality of irradiation is executed with a weak light strength, and thereby component molecules can be chemically bonded to each other without causing a rise of temperature on an irradiated surface. Moreover, a crosslinking reaction is caused to some extent by executing the first irradiation with a polarized light in a range of a short wavelength closer to an absorption peak, and next the second irradiation is executed with a polarized light of a longer wavelength than the first irradiation. Therefore, component molecules can be chemically reacted to each other at a photosensitive group more uniformly while restraining a damage of molecular structure resulting from light irradiation.

Furthermore, in a method of polarizing irradiation, it is possible to execute a plurality of irradiations with a different incident angle with a substrate. According to this method, a pretilt angle can be changed.

In addition, in a method of polarizing irradiation, it is possible to irradiate a polarized light with a different polarized direction at each irradiation and irradiate to a different irradiation section at each irradiation. When a polarized light is irradiated on a thin film, the polarized light operates chiefly on a bond between photosensitive atoms parallel with a polarized direction, and thereby causes a crosslinking at the above-mentioned bond. Consequently, when a polarized light with a different polarized direction is irradiated to a different irradiation section at each irradiation, it is possible to form a plurality of sections with a different bond direction between molecules. In this method, it is preferable to make the above-mentioned section smaller than a pixel unit. Consequently, a liquid crystal alignment layer in a multidomain alignment with a wide viewing angle can be manufactured.

In the above-mentioned method of polarizing irradiation, it is preferable to control each element of light strength, wavelength, the number of irradiation, incident angle with a substrate and irradiation pattern synthetically. An appropriate control over these elements can manufacture an alignment layer with a desirable alignment characteristic.

As treating an alignment in the above-mentioned manufacturing method, it is possible to adopt a method of realigning by irradiating a polarized light after aligning provisionally by a method of drain-drying. This method is particularly preferable in terms of giving a desirable alignment characteristic (such as alignment direction, alignment control force and pretilt angle) certainly and stably. The reason for obtaining an alignment layer with a strong alignment control force by irradiating a polarized light after aligning provisionally is not made clear. However, the fact is confirmed experimentally.

In the case of adopting the above-mentioned method of irradiating a polarized light after aligning provisionally, it is preferable that a polarized direction of a polarized light crosses a provisional alignment direction (drain-drying direction) at an angle of not completely 90° but with a little shift from 90°, preferably more than some degrees. If a polarized light is irradiated while crossing a polarized direction and a provisional alignment direction at right angles, each component molecule is in danger of being aligned at random in two directions.

The following constitution can be adopted as a method of manufacturing a liquid crystal alignment layer in the sixth invention group. That is, a method of manufacturing a liquid crystal alignment layer comprising the steps of forming a monomolecular thin film on a substrate by contacting a material for a thin film comprising a chemical adsorbent represented by the above-mentioned Chemical Formula 6-5 on the substrate surface with at least an electrode, and chemisorbing the above-mentioned material substance for a thin film on the above-mentioned substrate surface; aligning molecules composing the thin film provisionally by drain-drying an organic solvent in a certain direction after contacting the above-mentioned organic solvent on the substrate surface with a thin film; and realigning the molecules composing a thin film by irradiating a polarized light on the provisionally aligned substrate, and crosslinking the molecules composing a thin film to each other; wherein a liquid crystal alignment layer in a multidomain alignment having a different liquid crystal alignment control direction at each of a plurality of small patterned sections into which a pixel unit is divided is manufactured by repeating the above-mentioned steps of aligning provisionally and realigning more than twice.

The steps of aligning provisionally and realigning is repeated in this manufacturing method, and as described above, a method of irradiating a polarized light after aligning provisionally can realign efficiently by irradiating a polarized light. Since a realignment state by crosslinking is never damaged by drain-drying, a liquid crystal alignment layer in which a plurality of small sections with a different alignment direction is formed in a pixel certainly and efficiently can be manufactured by repeating drain-drying (provisional alignment) and irradiating a polarized light at a section unit into which a pixel is divided and drain-drying (provisional alignment) and irradiating a polarized light at a section unit into which a pixel is divided and so forth.

A liquid crystal display device in the sixth invention group which is formed by using the above-mentioned liquid crystal alignment layer can be composed as described below. that is, a liquid crystal display device with a structure in which two substrates with at least an electrode are opposed through the electrode side and a liquid crystal is sealed between two substrates, wherein a liquid crystal alignment layer comprising a chemical adsorbent having a characteristic group represented by the following Chemical Formula 6-1 in a molecular structure is bonded and fixed on a surface of at least one of the above-mentioned substrates by a bond of —Si—O—.

A liquid crystal display device of an in-plane switching type in which an electrode and an opposite electrode are formed on the same substrate, wherein a liquid crystal alignment layer comprising a chemical adsorbent having a characteristic group represented by the following Chemical Formula 6-1 in a molecular structure is bonded and fixed on a surface with the electrode and the opposite electrode of the above-mentioned substrate by a bond of —Si—O—.

[Chemical Formula 6-1]

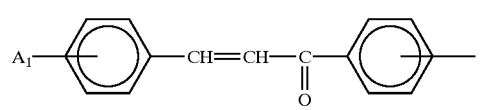

$A_1$ is a functional group bonded to a benzene ring.

The description as regards a liquid crystal alignment layer such as a preferable condition for a chemical structure of a chemical adsorbent represented by the above-mentioned Chemical Formula 6-1 and a preferable composition of a liquid crystal alignment layer is the same as the description as regards a liquid crystal alignment layer in the sixth invention group. Accordingly, a detailed description is omitted. Moreover, in a composition of the above-mentioned liquid crystal display device, it is preferable to use a monomolecular thin film because of no hindrance of light transmission and electric field and to use a liquid crystal alignment layer of a multidomain type having different liquid crystal alignment direction and tilt angle at each of small sections into which a pixel is divided because of obtaining a wide viewing angle.

In a liquid crystal alignment layer in the sixth invention group, a material for a thin film may be bonded and fixed directly on a substrate with an electrode through a bond of —Si—O—, or by forming a different substance layer on an electrode plane and bonding to the substance layer through a bond of —Si—O—. It is preferable that a different substance layer is a layer consisting of such substances having hydrophily as OH group, COOH group, $NH_2$ group, NH group and SH group. A layer of $SiO_2$, a layer of $TiO_2$ and the like can be exemplified as such a substance layer.

A liquid crystal alignment layer in the sixth invention group is described below in further detail. A liquid crystal alignment layer in the sixth invention group is a layer wherein a thin film comprising a chemical adsorbent having a characteristic group represented by the following Chemical Formula 6-1 is bonded and fixed directly or with an interposition of a different substance layer having a hydrophilic group on a substrate with an electrode by a bond of —Si—O—. This liquid crystal alignment layer can be manufactured by dissolving a material for a thin film comprising a chemical adsorbent having a characteristic group represented by the following Chemical Formula 6-5 in an organic solvent and contacting the solution on a substrate surface.

[Chemical Formula 6-1]

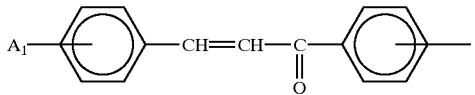

$A_1$ is a functional group bonded to a benzene ring.

[Chemical Formula 6-5]

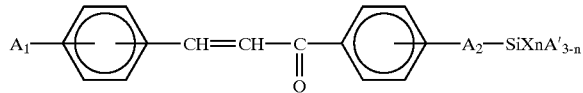

($A_1$ is a functional group bonded to a benzene ring in a chalcone skeleton, A2 is a bifunctional group, X is a halogen or an alkoxyl group, A' is an alkyl group or an alkoxyl group, and n is an integer of 0 to 3 inclusive.)

A chalcone skeleton (its basic skeleton is represented by the following Chemical Formula 6-6) has a generally high photoreactivity, and particularly, a chalcone derivative represented by the above-mentioned Chemical Formula 6-5 in which a particular substituent is bonded to two benzene rings has an extremely high photoreactivity and chemisorption. Therefore, according to the above-mentioned composition using a chemical adsorbent represented by the above-mentioned Chemical Formula 6-5, it is possible to easily form a monomolecular thin film which is chemisorbed on a substrate surface. Moreover, a crosslinking between molecules can be caused easily by irradiating the thin film. Accordingly, a thin film (alignment layer), which is formed by chemisorbing a chemical adsorbent represented by the above-mentioned Chemical Formula 6-5 on a substrate surface, is extremely thin and bonded and fixed firmly on a substrate. Since this thin film is not composed of a polymer, it neither hinders light transmission nor functions as an electrical resistance film in the case of using it as a liquid crystal alignment layer. Furthermore, the thin film can have a strong alignment control force over liquid crystal molecules and is superior in thermal stability. Accordingly, the intended purpose in the sixth invention group can be attained sufficiently.

It is preferable that a substituent ($A_1$) in the above-mentioned composition is bonded to 4-position of a benzene ring and also 2-position or 3-position. In addition, it is preferable that a functional group for chemisorbing on a substrate is bonded to either of 2'-position, 3'-position and 4'-position of the other benzene ring, and a characteristic group comprising a group of —SiX represented by the above-mentioned Chemical Formula 6-5 can be exemplified as such a functional group.

[Chemical Formula 6-6]

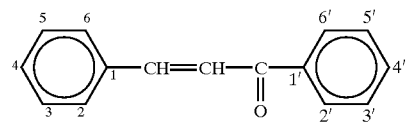

A substituent mentioned below is preferable as the above-mentioned substituent ($A_1$). However, the substituent ($A_1$) is not limited to these substituents.

(1) Hydrocarbon groups such as methyl, ethyl, n-propyl, n-butyl, n-pentyl, n-hexyl, n-heptyl, n-octyl, n-nonyl, n-decyl, n-undecyl, n-tridecyl, n-tetradecyl, n-pentadecyl, n-hexadecyl, n-heptadecyl, n-octadecyl, n-nonadecyl, n-eicosyl and phenyl (2) A hydrocarbon group comprising a double bond of C—C or a triple bond of C≡C in a part of the above-mentioned hydrocarbon group (1)

(3) A functional group in which another functional group (such as the groups of methyl, methyl halide, hydroxyl and cyano) and/or an atom (such as Cl, Br and I) is substituted for a hydrogen in the above-mentioned hydrocarbon group (1) and (2)

(4) A perfluoro type functional group of the above-mentioned hydrocarbon group (1) and (2)

(5) A functional group in which a fluorine is substituted for a hydrogen bonded to a carbon from an end to the eighth in the above-mentioned hydrocarbon group (1) and (2)

(6) A functional group in which a bond of C—O—C (ether) or a bond of C—CO—C (carbonyl) is substituted for a part of a bond of C—C in the above-mentioned hydrocarbon group (1) and (2)

(7) An alkoxyl group comprising the above-mentioned hydrocarbon group (1) and (2)

(8) A perfluoro type functional group in which a bond of C—O—C (ether) or a bond of C—CO—C (carbonyl) is substituted for a part of a bond of C—C in the above-mentioned hydrocarbon group (1) and (2)

(9) A functional group in which a bond of C—O—C (ether) or a bond of C—CO—C (carbonyl) is substituted for a part of a bond of C—C and a fluorine is substituted for a hydrogen bonded to a carbon from an end to the eighth in the above-mentioned hydrocarbon group (1) and (2)

(10) An alkoxyl group comprising a perfluoro substituent of the above-mentioned hydrocarbon group (1) and (2)

(11) An alkoxyl group comprising a functional group in which a fluorine is substituted for a hydrogen bonded to a carbon from an end to the eighth in the above-mentioned hydrocarbon group (1) and (2)

(12) A carbonyl group to which a perfluoro substituent of the above-mentioned hydrocarbon group (1) and (2) is bonded

(13) A carbonyl group to which a functional group in which a fluorine is substituted for a hydrogen bonded to a carbon from an end to the eighth in the above-mentioned hydrocarbon group (1) and (2) is bonded.

A substituent having a functional group with a wide conjugate structure in bonding to a chalcone skeleton and an electron donative functional group is particularly preferable in practice among the above-mentioned substituents. The reason is that a chalcone derivative to which such a functional group is bonded has a peak wavelength of light absorption in around 365 nm (i-line of an extra-high-pressure mercury-vapor lamp).

Meanwhile, a bifunctional group which is a substituent described in the above-mentioned (1) to (13) without an atom at an end is suitable for a bifunctional group ($A_2$) bonding a group of —SiX essential for chemisorbing the above-mentioned compound on a substrate (X is a halogen or an alkoxyl group) and a chalcone skeleton. However, the bifunctional group ($A_2$) is not limited to the bifunctional group.

The above-mentioned compound can be manufactured by synthesizing a chalcone basic skeleton represented by the above-mentioned Chemical Formula 6-6 or synthesized by using a chalcone derivative for a starting substance. In order to synthesize a chalcone basic skeleton, it is preferable to cause an aldol condensation reaction (including the following dehydration) between a benzaldehyde having at 4-position a desirable functional group for bonding at 4-position of a chalcone skeleton and a substance having a benzoyl group. Meanwhile, in order to obtain an objective compound by using a chalcone derivative, it is preferable to use a chalcone derivative having at 4-position a desirable functional group for bonding at 4-position of a chalcone skeleton. However, a method of manufacturing the above-mentioned compound is not limited to these methods of synthesizing.

A thin film (an alignment layer precursor) in the sixth invention group can be manufactured by contacting a solution of the above-mentioned chemical adsorbent in a nonaqueous solvent on a substrate with at least an electrode, and it is preferable to immerse a substrate with an electrode in the above-mentioned solution. A nonaqueous organic solvent comprising the groups of alkyl, fluorocarbon, carbon chloride or siloxane can be used as the above-mentioned nonaqueous solvent. Moreover, a thin film consisting of more than two kinds of composite components can be manufactured by using a solution comprising the above-mentioned chemical adsorbent as well as other compounds.

It is preferable to wash a thin film manufactured by using the above-mentioned chemical adsorbent to remove a compound which is not yet adsorbed. A nonprotic solvent is preferable as a solvent for washing, and a protic solvent and a mixed solvent of both solvents can be used. A method of mixing a nonprotic solvent and a protic solvent has an advantage in that a solubility with a compound can be adjusted suitably.

A chlorine-based solvent such as chloroform, an aromatic solvent such as benzene and toluene, a lactone-based solvent such as γ-butyrolactone, and an ester-based solvent such as ethyl acetate are suitable for a nonprotic solvent. An alcohol-based solvent such as methanol and ethanol are suitable for a protic solvent. However, needless to say, a solvent for washing is not limited to these solvents.

A method of drain-drying in a certain direction after attaching a solvent on a film plane is considered as a method of treating an alignment. More specifically, the methods of drain-drying are as follows: a method of immersing a coated substrate approximately vertically to a solvent plane in a vessel containing the above-mentioned solvent for a certain time, later pulling up the substrate out of the vessel approximately vertically, and drying in this state; and a method of flowing a solvent from above an approximately upright substrate, and later drying the solvent. According to these methods, a solvent goes down gradually from an upper edge of a wet plane, and drying progresses from upper to lower. Therefore, it is possible to align component molecules along a progressive direction of drying, and to wash down excessive component molecules that are not bonded on a substrate. An alignment by drain-drying is named a provisional alignment in the present specification. Since a provisional alignment does not result from a bond between molecules, it is weaker in an alignment force than the following method by irradiating a polarized light.

A method of irradiating a polarized light on a substrate surface with a thin film can be exemplified as the other method of treating an alignment. This method is a method of operating photo energy on a bond between photosensitive atoms in molecules composing a thin film parallel with a polarized direction by irradiating a polarized light, causing a chemical reaction at the above-mentioned bond, crosslinking the molecules composing a thin film to each other, and giving a liquid crystal alignment control force in a certain direction. This method can give an alignment characteristic of superior stability. This aligning method is named a realignment in the present specification. A linearly polarized light is preferable as a polarized light used in the above-mentioned realignment because of causing a bond between atoms in a certain direction. As a method of obtaining a linearly polarized light, it is possible to use a method by an absorption type ordinary polarizer and a method by a non-absorption type polarized separating element such as a polarized beam splitter. A wavelength at which a photoreaction is caused in a material substance for a film is preferable as a wavelength of a polarized light, and ordinarily a light in a range of an ultraviolet ray is used. Ordinarily, a temperature from approximately a room temperature to around 100° C. is used as a temperature in exposing, and a temperature except this range is usable. However, a method of treating an alignment which is applicable to the sixth invention group is not limited to the above-mentioned methods.

A characteristic of a liquid crystal alignment layer in the sixth invention group such as pretilt angle and alignment direction can be changed by changing the kind of a compound composing a thin film within a prescribed range in the sixth invention group, and additionally by changing the kind of a solvent and a condition for drying in the case of using a method of drain-drying, and furthermore by changing a condition for irradiating a polarized light in a method of polarizing irradiation. A change of a condition for irradiating a polarized light, such as the quantity of irradiation energy, irradiation angle and the number of irradiation, is particularly effective in changing a pretilt angle largely.

Nematic liquid crystal, smectic liquid crystal, discotic liquid crystal, ferroelectric liquid crystal and the like can be used in a liquid crystal display device in the sixth invention group, and particularly nematic liquid crystal is appropriately usable in terms of molecular form. A liquid crystal which is mentioned as nematic liquid crystal are as follows: biphenyl-based, terphenyl-based, azoxy-based, Schiff base-based, phenylcyclohexane-based, biphenylcyclohexane-based, ester-based, pyrimidine-based, dioxane -based, bicyclooctane-based, cubane-based and the like.

BRIEF DESCRIPTION OF THE DRAWINGS OF THE SIXTH INVENTION GROUP

FIG. 6-1 is a conceptional view for describing the step of chemisorbing for manufacturing a monomolecular thin film in the sixth invention group.

FIG. 6-2 is a conceptional view for describing the step of washing a monomolecular thin film in the sixth invention group.

FIG. 6-3 is a conceptional view of the step of treating an alignment by realigning molecules composing a thin film through light irradiation.

FIG. 6-4 is a conceptional view for describing an alignment state of molecules composing a thin film after light irradiation.

FIG. 6-5 is a cross sectional for describing a liquid crystal cell in Embodiment 6-1.

FIG. 6-6 is a cross sectional for describing a liquid crystal cell in Embodiment 6-5.

FIG. 6-7 is a model view showing a cross section of a liquid crystal display device in Embodiment 6-6.

DETAILED DESCRIPTION OF THE PREFERRED EMBODIMENTS OF THE SIXTH INVENTION GROUP

The sixth invention group is detailed using embodiments below.

(Embodiment 6-1)

First, a chlorosilane-based chemical adsorbent (or a chlorosilane-based surface active agent) represented by the following Chemical Formula 6-7 comprising a carbon chain as well as a chalcone skeleton and Si at an end of or inside the carbon chain was synthesized by the same method as Embodiment 5-1 in the fifth invention group.

[Chemical Formula 6-7]

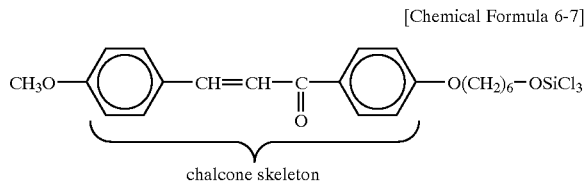

Next, a liquid crystal alignment layer was manufactured by using a chlorosilane-based chemical adsorbent which was synthesized in the above. A manufacturing method is described below in sequence.

A glass substrate with a transparent electrode consisting of indium stannic oxide on its surface and a layer of $SiO_2$ on the transparent electrode was washed and degreased sufficiently beforehand, and the glass substrate was made a substrate 1. Meanwhile, a chemisorption solution 2 of the above-mentioned chemical adsorbent at a concentration of approximately 1 wt. % was prepared by dissolving the chemical adsorbent in a mixed solvent of well-dehydrated siloxane-based solvent (KF96L; made by SHIN-ETU CHEMICAL) and chloroform. This mixed solvent was a nonprotic solvent.

Next, as shown in FIG. 6-1, the above-mentioned substrate 1 was immersed (or may be applied) in the above-mentioned chemisorption solution 2 in a dry atmosphere with a relative humidity of 30% or less for approximately an hour. Later, the above-mentioned chemisorption solution 2 was washed out by immersing in well-dehydrated chloroform 3, a nonprotic solvent, (a solution for washing), and later after pulling up the substrate 1 in a direction parallel with gravitation (upward) and draining (FIG. 6-2), the substrate 1 was exposed to an atmosphere including humidity while setting up it.

Consequently, a reaction of eliminating HCl was caused between a group of SiCl in the above-mentioned chemical adsorbent (chlorosilane-based surface active agent) and a hydroxyl group on the substrate surface, and additionally, a compound of the following Chemical Formula 6-8 was produced by reacting with humidity in an atmosphere.

[Chemical Formula 6-8]

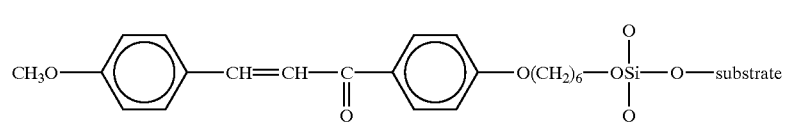

A monomolecular thin film which is made by fixing (chemisorbing) a molecule (hereinafter referred to as 'component molecule') of a chemical adsorbent (chlorosilane-based surface active agent) to a hydroxyl group on a substrate surface through a siloxane bond was formed by a series of the above treatments. The thickness of this thin film was approximately 25 nm in the case of using an ellipsometer with a refractive index of 1.45. Moreover, an opposite substrate with a thin film was prepared by executing the same operation at a substrate with an opposite electrode.

An end of a component molecule in a thin film manufactured in the above is chemisorbed on a substrate surface, and the other end is aligned along a drain direction to some extent. The reason why component molecules are aligned to some extent by the above-mentioned method is that drain-drying is executed while setting up a substrate in a certain direction. An alignment by this method is named a provisional alignment.

Next, a polarizer 7 (HNP'B; made by POLAROID Corp.) was put on a provisionally aligned thin film so that a polarized direction 6 was in approximately parallel with the drain direction 5, and an ultraviolet ray 8 of 480 mJ with a wavelength of 365 nm was irradiated (a photo strength of 2.1 mW/cm$^2$, after transmitting a polarized film) by using an extra-high-pressure mercury-vapor lamp of 500W (FIG. 6-3).

An anisotropy of component molecules in a thin film after irradiating an ultraviolet ray was examined with FT-IR (Fourier transform infrared spectroscopy). As a result, although a direction of a bond between molecules was not made clear, it was confirmed that the polarized direction differed from a vertical direction to the polarized direction in an IR absorption, an IR absorption in the polarized direction was remarkably lower than the vertical direction. This indicates that a photosensitive group in a chalcone skeleton was crosslinked by photo energy in the polarized direction. When component molecules are crosslinked to each other, an alignment with a higher stability than a provisional alignment is given because of fixing an alignment direction of component molecules stereostructurally. FIG. 6-4 shows conceptionally a state in which component molecules are crosslinked to each other. 34 in FIG. 6-4 indicates a crosslinked part.

Next, a liquid crystal cell was constituted by opposing the substrate 1 and the opposite substrate manufactured in the above through an alignment layer plane, joining them with a gap of 20 μm through a spacer, and injecting a nematic liquid crystal (ZLI4792; made by Merck & Co., Inc.) into the gap. Two substrates were disposed so that drain directions of each substrate were opposite (antiparallel).

When an alignment direction of liquid crystal molecules in this liquid crystal cell was examined by using two polarizers, it was confirmed that liquid crystal molecules were aligned along a drain direction. Moreover, when a pretilt angle was determined by using an optical crystal rotation method, it was confirmed that liquid crystal molecules were aligned at an pretilt angle of approximately 3° with the substrate plane along a polarized direction. FIG. 6-5 shows like a model an alignment state of liquid crystal molecules in this liquid crystal cell. 10 in FIG. 6-5 indicates a transparent electrode and 11 indicates a layer of a chemisorbed film.

(Embodiment 6-2)

In Embodiment 6-2, a liquid crystal alignment layer having a different alignment direction at each area was manufactured by irradiating an ultraviolet ray through a patterned mask. Embodiment 6-2 differs from the above-mentioned Embodiment 6-1 only in a condition for irradiating an ultraviolet ray, and thereby a condition for irradiating an ultraviolet ray is chiefly described.

First, like Embodiment 6-1, a thin film was formed on a substrate, and component molecules were aligned provisionally. Next, after preparing a patterned mask and putting it on a polarizer, an ultraviolet ray of 400 to 800 mJ with a wavelength of 365 nm was irradiated on the above-mentioned thin film, and a liquid crystal cell was produced like Embodiment 6-1.

An alignment characteristic of a liquid crystal in this liquid crystal cell was examined by using the same method as the above. As a result, it was confirmed that an alignment direction in an area without a mask was changed and an area having a different alignment direction was formed in a pattern. This indicates that an alignment area along a provisional alignment direction and an alignment area along a polarized direction were formed since an alignment direction in only an area on which a polarized light was irradiated was changed.

(Embodiment 6-3)

In Embodiment 6-3, an ultraviolet ray was irradiated four times through a mask produced so that a polarized light was irradiated on a plurality of small sections into which a pixel unit is divided while changing a position relation between a thin film plane and a polarized direction each time. A liquid crystal cell was produced like the above-mentioned Embodiment 6-1, 2 except the above.

When an alignment characteristic of a liquid crystal in this liquid crystal cell of Embodiment 6-3 was examined by using the same method as the above, it was confirmed that a liquid crystal cell in a multidomain alignment in a pixel was formed.

(Embodiment 6-4)

A compound represented by the following Chemical Formula 6-10 was used as a chemical adsorbent (chlorosilane-based surface active agent) having a chalcone skeleton and an Si group. A liquid crystal cell was produced like the above-mentioned Embodiment 6-1 except the above.

[Chemical Formula 6-10]

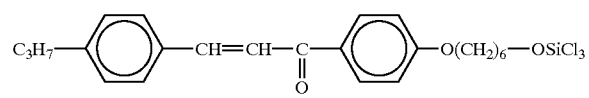

When an alignment state in this liquid crystal cell was examined by using the same method as the above-mentioned Embodiment 6-1, it was confirmed that liquid crystal molecules were aligned at an pretilt angle of approximately 3° with the substrate plane along a polarized direction.

(Embodiment 6-5)

In Embodiment 6-5, a thin film 14 was formed by producing a substrate 2 having a transparent electrode 12 consisting of indium stannic oxide on a glass plate (having a hydroxyl group on its surface) and additionally a layer 13 of $SiO_2$ with a thickness of 50 nm on the transparent electrode, and using a chemical adsorbent represented by the above-mentioned Chemical Formula 6-10 on a surface of the substrate 2. A liquid crystal cell of Embodiment 6-5 was produced like the above-mentioned Embodiment 6-4 except the above. FIG. 6-6 shows a conceptional view of this liquid crystal cell.

When an alignment state in the above-mentioned liquid crystal cell was examined by using the same method as the above-mentioned Embodiment 6-1, it was confirmed that liquid crystal molecules were aligned at an pretilt angle of approximately 40 with the substrate plane along a polarized direction.

(Embodiment 6-6)

In Embodiment 6-6, a liquid crystal display device was manufactured by using the above-mentioned liquid crystal alignment layer. A process of manufacturing this liquid crystal display device is described below using FIG. 6-7.

First, as shown in FIG. 6-7, a similar chemisorbed monomolecular film was manufactured by applying a chemisorption solution, which was produced under the same procedure as Embodiment 6-1, on a first substrate 20 having a first group of electrodes 21 in a matrix and a group of TFTs (Thin Film Transistor) 22 for driving the electrodes as well as a second substrate 24 having a group of color filters 25 opposite to the first group of electrodes and a second electrode 26 (opposite electrode). Consequently, liquid crystal alignment layers 23 and 27, which were realigned along an electrode pattern, were manufactured like Embodiment 6-1.

Next, the above-mentioned first and second substrates 20, 24 were joined so that their electrodes were opposite, and a cell with a gap of 4.5 μm in which an alignment direction is twisted by 90° was constructed with a spacer 29 and an adhesive 30. Later, a liquid crystal display device was made by injecting the above-mentioned nematic liquid crystal 28 (ZLI4792; made by Merck & Co., Inc.) between the above-mentioned first and second substrates, and additionally a liquid crystal display device was completed by disposing polarizers 31, 32 on both outsides of this device and a backlight 33 outside the polarizer 31.

When a tilt angle of liquid crystal molecules in the above-mentioned liquid crystal display device was determined by using the same method as the above-mentioned Embodiment 6-1, it was approximately 5°. When each transistor was driven with a video signal while irradiating a backlight 33 from the side of the first substrate 20 in this device, a clear picture with a superior luminance could be displayed in a direction of an arrow A.

(Embodiment 6-7)

After manufacturing the same thin film as Embodiment 6-5, the step of exposing through a mask in a check dividing each pixel into four sections on the above-mentioned polarizer was executed four times by the same method as Embodiment 6-3. A liquid crystal display device of Embodiment 6-7 was manufactured like the above-mentioned Embodiment 6-6 except the above.

When an alignment of liquid crystal molecules in a liquid crystal cell of the above-mentioned liquid crystal display device was examined by using the same method as the above, it was confirmed that four small sections with a different alignment direction in the same pixel were formed in a pattern. In addition, when a viewing angle was observed with the naked eye by using this device, a viewing angle was improved greatly as compared to a device with a certain alignment direction in Embodiment 6-6.

[Other Matters]

In the above-mentioned Embodiments, a chemisorbed monomolecular film having an alignment was formed on each of a pair of substrates with an electrode, and a chemisorbed monomolecular film having an alignment may be formed on only one of the substrates. However, it is preferable to form a chemisorbed monomolecular film having an alignment on both substrates in order to improve an alignment stability.

Moreover, in the above-mentioned Embodiments, a chemical adsorbent having a group of chlorosilane was used, and it is possible to use a chemical adsorbent introducing an alkoxysilane group and an isocyanatosilane group instead of a group of chlorosilane, and to obtain a liquid crystal alignment layer with superior alignment control force and adsorption force on a substrate in the case of using these adsorbents as well.

Furthermore, in the above-mentioned Embodiments, chloroform was used as a nonaqueous solvent for washing, and any nonaqueous solvent that can dissolve a chemical adsorbent (surface active agent) can be used besides this. The following solvents can be exemplified as such a solvent: for instance, a solvent comprising the groups of fluorocarbon, carbon chloride or siloxane, more specifically Freon 113, chloroform and hexamethyldisiloxane.

In addition, in the above-mentioned Embodiments, a light with a wavelength of 365 nm from an extra-high-pressure mercury-vapor lamp were used as a light for exposing, and besides this, it is possible to use a light with a wavelength of 436 nm and 405 nm and 254 nm as well as a light with a wavelength of 248 nm by KrF excimer laser depending on an absorption of light into a chemisorbed monomolecular film. Among lights with these wavelengths, the light with a wavelength of 248 nm and 254 nm is superior in terms of efficiency in energy alignment since the light is easily absorbed into a chemisorbed thin film in the sixth invention group.

A liquid crystal alignment layer in the sixth invention group comprises a chemical bond unit represented by the following Chemical Formula 6-9, and an alignment layer comprising a chemical bond unit represented by the following Chemical Formula 6-9 has a strong alignment control force over a twisted nematic (TN) liquid crystal. Accordingly, the sixth invention group is particularly appropriately applicable to a liquid crystal display device of this type. A chemical adsorbent comprising a chemical bond unit represented by the following Chemical Formula 6-9 is generally dissolved in a nonaqueous organic solvent comprising the groups of alkyl, fluorocarbon, carbon chloride or siloxane. Therefore, these organic solvents are appropriately usable in producing a chemisorption solution.

[Chemical Formula 6-9]

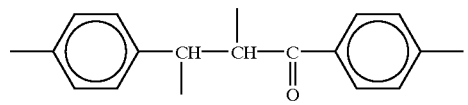

Moreover, in the above-mentioned Embodiments, a liquid crystal display device, which is made by joining a pair of substrates with an electrode, is described. According to the sixth invention group, since an alignment layer having diverse alignment characteristics can be manufactured without rubbing, the sixth invention group is appropriately applicable to an in-plane switching (IPS) type liquid crystal display device wherein an electrode is formed on a substrate on only either side.

Furthermore, it is possible to form a thin film by using a chemical adsorbent used in the above-mentioned Embodiments as well as a composite chemical adsorbent mixing another chemical adsorbent, such as octadecyltrichlorosilane. Therefore, it is possible to change a pretilt angle by mixing another chemical adsorbent.

INDUSTRIAL APPLICABILITY

As described above, according to the invention in the first to sixth invention group, it is possible to form a remarkably thin and uniform film as compared with a conventional organic polymer thin film. Moreover, component molecules in this thin film are bonded and fixed firmly on a substrate by adsorbing, and component molecules are crosslinked to each other. Therefore, this thin film indicates an alignment which is superior in thermal stability.

Furthermore, a liquid crystal alignment layer in the present invention having a desirable alignment characteristic of a liquid crystal and no hindrance of a transmission of visible ray and electric field for driving a liquid crystal can be obtained by applying an easy method of drain-drying and a method of polarizing irradiation with the use of an ultraviolet ray and a far-ultraviolet ray to the above-mentioned thin film. Moreover, a liquid crystal alignment layer having a different alignment direction at each small section which is divided in a pattern can be manufactured extremely efficiently by using a method of manufacturing a liquid crystal alignment layer in the present invention wherein an exposure is executed through a patterned mask on a polarizer a plurality of times after manufacturing a thin film.

In addition, a liquid crystal display device with a superior display performance can be provided by using such a liquid crystal alignment layer in the present invention. Moreover, a liquid crystal display device with a wide viewing angle can be actualized by using a liquid crystal alignment layer of a multidomain type having a different alignment direction at each small section which is divided in a pattern.

Therefore, a significance of the present invention is great in industry.

What is claimed is:

1. A chemical adsorbent consisting of a compound comprising:

a group of —CR$^1$=CR$^2$—CO—; and a functional group having a group of SiN=C=O in its chemical structure;

wherein:

each of R$^1$ and R$^2$ is a hydrogen, an alkyl group having 1 to 3 C or an alkoxy group having 1 to 3 C.

2. A chemical adsorbent comprising a chemical compound represented by the following Chemical Formula 1, wherein:

R is an alkyl group having 1 to 14 C or a phenyl group;

n is an integer of 1 to 14 inclusive;

X is a halogen or an isocyanato group;

A is a functional group; and m is an integer of 1 to 3 inclusive;

[Chemical Formula 1]

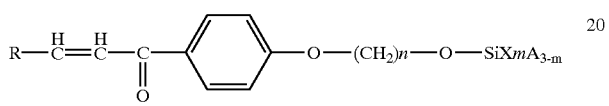

3. A chemical adsorbent according to claim 1, said chemical adsorbent being a compound represented by the following Chemical Formula 2, wherein:

R is an alkyl group having 1 to 14 C or a phenyl group;

n is an integer of 1 to 14 inclusive;

X is an isocyanato group;

A is a functional group; and m is an integer of 1 to 3 inclusive;

[Chemicla Formula 2]

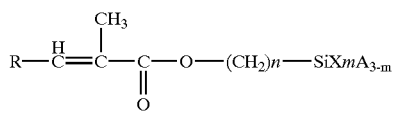

4. A chemical adsorbent according to claim 1, said chemical adsorbent being a compound represented by the following Chemical Formula 3, wherein:

n is an integer of 1 to 14 inclusive;

R is an alkyl group having 1 to 14 C or a phenyl group;

X is an isocyanato group;

A is a functional group bonded to Si; and m is an integer of 1 to 3 inclusive;

[Chemical Formula 3]

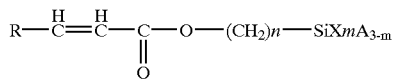

5. A chemical adsorbent according to claim 1, said chemical adsorbent being a compound represented by the following Chemical Formula 4, wherein:

R is an alkyl group having 1 to 14 C or a phenyl group;

n is an integer of 1 to 14 inclusive;

X is an isocyanato group;

A is a functional group; and m is an integer of 1 to 2;

[Chemical Formula 4]

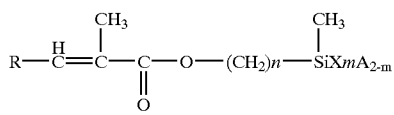

6. A liquid crystal alignment layer wherein:

said liquid crystal layer can align liquid crystal molecules in a particular direction;

a chemical adsorbent comprising a group of —CR$^1$=CR$^2$—CO— where R$^1$ and R$^2$ represent hydrogen, an alkyl group having a carbon number of 1 to 3, or an alkoxy group having a carbon number of 1 to 3 and a functional group having Si in its chemical structure is bonded and fixed directly or with an interposition of a different substance layer on a substrate surface through Si; and adjacent component molecules in the liquid crystal alignment layer are crosslinked to each other through at least one bond in the carbon-carbon double bond in the group of —CR$^1$=CR$^2$—CO—.

7. A liquid crystal alignment layer according to claim 6, said liquid crystal alignment layer being composed of a compound comprising a chemical bond unit represented by the following Chemical Formula 5, wherein:

n is an integer of 1 to 14 inclusive;

[Chemical Formula 5]

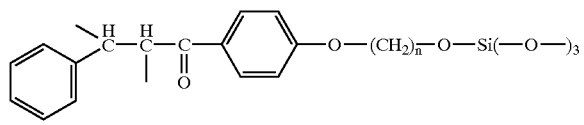

8. A liquid crystal alignment layer according to claim 6, said liquid crystal alignment layer being composed of a compound comprising a chemical bond unit represented by the following Chemical Formula 6, wherein:

n is an integer of 1 to 14 inclusive; and

R is an alkyl group having 1 to 14 C or a phenyl group;

[Chemical Formula 6]

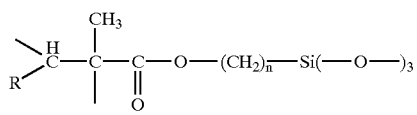

9. A liquid crystal alignment layer according to claim 6, said liquid crystal alignment layer being composed of a compound comprising a chemical bond unit represented by the following Chemical Formula 7, wherein n is an integer of 1 to 14 inclusive and R is an alkyl group having 1 to 14 C or a phenyl group;

[Chemical Formula 7]

$$\underset{R}{\overset{H}{>}}C-\underset{|}{\overset{H}{C}}-\underset{\overset{\|}{O}}{C}-O-(CH_2)n-Si(-O-)_3$$

10. A liquid crystal alignment layer according to claim 6, said liquid crystal alignment layer being composed of a compound comprising a chemical bond unit represented by the following Chemical Formula 8, wherein n is an integer of 1 to 14 inclusive and R is an alkyl group having 1 to 14C or a phenyl group;

[Chemical Formula 8]

$$\underset{R}{\overset{H}{>}}C-\underset{|}{\overset{CH_3}{\underset{|}{C}}}-\underset{\overset{\|}{O}}{C}-O-(CH_2)n-\underset{|}{\overset{CH_3}{Si}}(-O-)_2$$

11. A method of manufacturing a liquid crystal alignment layer comprising the steps of:
    producing a chemisorption solution by dissolving, in a nonaqueous solvent, a silane-based chemical adsorbent comprising a —$CR^1$=$CR^2$—CO— group where $R^1$ and $R^2$ represent hydrogen, an alkyl group having a carbon number of 1 to 3, or an alkoxy group having a carbon number of 1 to 3 and a functional group having Si;
    forming a monomolecular thin film which is made of said silane-based chemical adsorbent on a substrate plane by contacting said silane-based chemisorption solution with the substrate plane; and
    photopolymerizing adsorbent molecules to each other at the carbon-carbon double bond in the —$CR^1$=$CR^2$—CO— group by irradiating an ultraviolet ray or a far-ultraviolet ray on said thin film plane.

12. A method of manufacturing a liquid crystal alignment layer according to claim 11, comprising the step of:
    treating a provisional alignment of a molecule composing a thin film by drain-drying a nonaqueous solvent in a certain direction after contacting said nonaqueous solvent on the thin film plane, between said steps of forming a thin film and photopolymerizing.

13. A method of manufacturing a liquid crystal alignment layer according to claim 11, comprising the steps of:
    washing a thin film plane with a solvent to remove a chemical adsorbent which is not yet adsorbed; and
    aligning provisionally an alignment direction of a molecule of a silane-based chemical adsorbent which is chemisorbed on a substrate plane by drain-drying the solvent remaining on the substrate plane while setting up the substrate through washing in a certain direction, between said steps of forming a thin film and photopolymerizing.

14. A method of manufacturing a liquid crystal alignment layer according to claim 11, wherein:
    an irradiation of an ultraviolet ray or a far-ultraviolet ray in said step of photopolymerizing is executed through a polarizer, a transparent plate having a multitude of grooves of 0.1 to 0.3 μm in width on its surface or a transparent plate on which a rubbing is executed.

15. A method of manufacturing a liquid crystal alignment layer according to claim 11, wherein:
    an irradiation of an ultraviolet ray or a far-ultraviolet ray in said step of photopolymerizing is executed through a patterned mask which is put further on a polarizer, a transparent plate having a multitude of grooves of 0.1 to 0.3 μm in width on its surface or a transparent plate on which a rubbing is executed; and
    an alignment direction of an adsorbent molecule is changed in each patterned irradiation area by controlling a direction of a chemical bond between chemisorbed molecules.

16. A method of manufacturing a liquid crystal alignment layer according to claim 11, wherein:
    a multicomponent chemisorption solution, in which a first silane-based chemical adsorbent and a second silane-based chemical adsorbent having a different molecular length from said first silane-based chemical adsorbent are mixed at a predetermined ratio, is used in said step of producing a chemisorption solution.

17. A method of manufacturing a liquid crystal alignment layer according to claim 16, comprising the step of:
    treating a provisional alignment of a molecule composing a thin film by drain-drying an nonaqueous solvent in a certain direction after contacting said solvent on the thin film plane, between said steps of forming a thin film and photopolymerizing.

18. A method of manufacturing a liquid crystal alignment layer according to claim 16, comprising the steps of:
    washing a thin film plane with a solvent to remove a chemical adsorbent which is not yet adsorbed; and
    aligning provisionally an alignment direction of a molecule of a silane-based chemical adsorbent which is chemisorbed on a substrate plane by drain-drying the solvent remaining on the substrate plane while setting up the substrate through washing in a certain direction, between said steps of forming a thin film and photopolymerizing.

19. A method of manufacturing a liquid crystal alignment layer according to claim 16, wherein:
    an irradiation of an ultraviolet ray or a far-ultraviolet ray in said step of photopolymerizing is executed through a polarizer, a transparent plate having a multitude of grooves of 0.1 to 0.3 μm in width on its surface or a transparent plate on which a rubbing is executed.

20. A method of manufacturing a liquid crystal alignment layer according to claim 16, wherein:
    an irradiation of an ultraviolet ray or a far-ultraviolet ray in said step of photopolymerizing is executed through a patterned mask which is put further on a polarizer, a transparent plate having a multitude of grooves of 0.1 to 0.3 μm in width on its surface or a transparent plate on which a rubbing is executed; and
    an alignment direction of an adsorbent molecule is changed in each patterned small section by controlling a direction of a chemical bond between chemisorbed molecules.

21. A method of manufacturing a liquid crystal display device comprising the steps of:
    producing a chemisorption solution by dissolving a silane-based chemical adsorbent comprising a carbon chain as well as a group of —$CR^1$=$CR^2$—CO— where $R^1$ and $R^2$ represent hydrogen, an alkyl group having a carbon number of 1 to 3, or an alkoxy group with a carbon number of 1 to 3 and a functional group having Si at an end of or inside said carbon chain in a nonaqueous solvent;
    forming a monomolecular thin film by contacting said chemisorption solution with a first substrate having at least a group of electrodes in a matrix, and chemisorbing the chemical adsorbent on said substrate plane through Si;

provisionally aligning adsorbent molecules in a drain direction by drain-drying a nonaqueous solvent for washing while setting up said substrate in a certain direction after washing said thin film with the nonaqueous solvent;

providing an alignment characteristic by means of producing the first substrate with a liquid crystal alignment layer having a particular alignment characteristic by irradiating an ultraviolet ray or a far-ultraviolet ray on the provisionally aligned thin film, and crosslinking the adsorbent molecules to each other in a particular direction through a photopolymerization;

producing an empty cell by sticking and fixing a periphery of the substrates after joining through the electrode plane with a predetermined gap said first substrate with a liquid crystal alignment layer as well as an opposite substrate or a second substrate with a liquid crystal alignment layer having an opposite electrode, which is produced like said first substrate with a liquid crystal alignment layer; and injecting a liquid crystal into said empty cell.

22. A method of manufacturing a liquid crystal display device according to claim 21, wherein:

a crosslinking direction of an adsorbent molecule is controlled by exposing through a patterned mask which is put on a polarizer in irradiating an ultraviolet ray or a far-ultraviolet ray in said step of providing an alignment characteristic; and a controlled direction of a liquid crystal alignment is changed at each of a plurality of small patterned sections into which a pixel unit is divided.

23. A chemical adsorbent consisting of as 4'-substitution chalcone derivative represented by the following Chemical Formula 2-1;

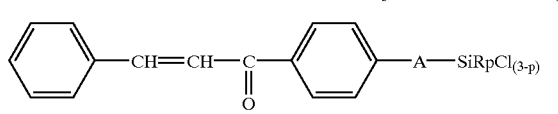

[Chemical Formula 2-1]

R is an alkyl group having 1 to 3 C or an alkoxy group having 1 to 3 C, p is an integer of 0 to 2 inclusive and A is a bifunctional group.

24. A chemical adsorbent according to claim 23, wherein:

A in said Chemical Formula 2-1 is a group of $-(CH_2)_n-$ (n is an integer of 3 to 14 inclusive).

25. A method of manufacturing a chemical adsorbent comprising:

a first step of synthesizing a substance represented by the following Chemical Formula 2-4 by coupling a 4'-hydroxychalcone represented by the following Chemical Formula 2-2 and a compound represented by the following Chemical Formula 2-3; and a second step of synthesizing a 4'-substitution chalcone derivative represented by the following Chemical Formula 2-5 by causing a reaction of eliminating a hydrochloric acid with a substance represented by said Chemical Formula 2-4 and a silicon tetrachloride in an atmosphere of an inert gas;

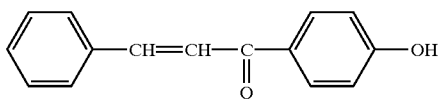

[Chemical Formula 2-2]

Hal—(CH$_2$)$_n$—OH    [Chemical Formula 2-3]

(Hal is I, Br or Cl and n is an integer of 3 to 14 inclusive);

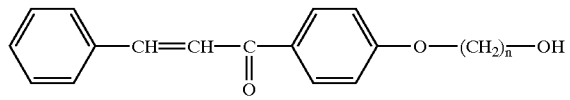

[Chemical Formula 2-4]

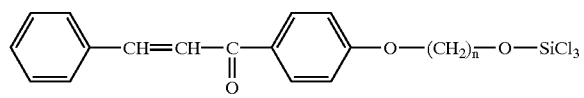

[Chemical Formula 2-5]

26. A chemical adsorbent consisting of a chalcone derivative wherein:

an SiX group where X is a halogen or an isocyanato group is indirectly bonded to one of the benzene rings in a chalcone skeleton represented by the formula:

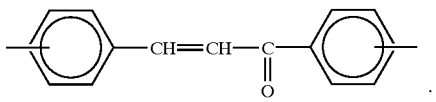

27. A chemical adsorbent comprising a chalcone derivative represented by the following Chemical Formula 5-1:

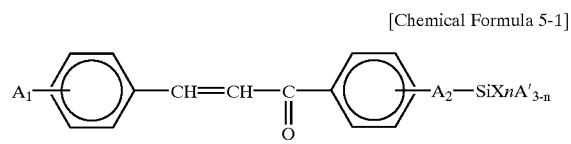

[Chemical Formula 5-1]

where $A_1$ is a functional group bonded to a benzene ring in a chalcone skeleton, $A_2$ is a bifunctional group bonded to the other benzene ring, X is a halogen, an alkoxyl group or an isocyanato group, A' is an alkyl group or an alkoxyl group, and n is an integer of 0 to 3 inclusive.

28. A chemical adsorbent according to claim 27, wherein:

$A^1$ in said Chemical Formula 5-1 is a characteristic group represented by the following Chemical Formula 5-2 or Chemical Formula 5-3:

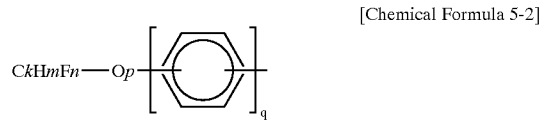

[Chemical Formula 5-2]

where k is an integer of 1 to 18 inclusive, m and n are an integer of 0 to 37 inclusive, m+n=2k+1, p is an integer of 0 or 1, and q is an integer of 0 or 1;

[Chemical Formula 5-3]

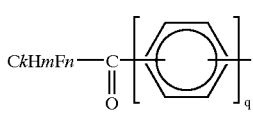

where k is an integer of 1 to 18 inclusive, m and n are an integer of 0 to 37 inclusive, m+n=2k+1, and q is an integer of 0 or 1.

29. A chemical adsorbent according to claim 28, wherein:
   $A_1$ in said Chemical Formula 5-1 is bonded to 4-position of a benzene ring in a chalcone skeleton.

30. A chemical adsorbent according to claim 27, wherein:
   $A_2$ in said Chemical Formula 5-1 is represented by a group of —$(CH_2)_n$—O—, —O—$(CH_2)_n$—O—, or —CO—$(CH_2)_n$—O— (n is an integer of 2 to 14 inclusive).

31. A chemical adsorbent according to claim 30, wherein:
   $A_2$ in said Chemical Formula 5-1 is bonded to 4'-position of a benzene ring in a chalcone skeleton.

32. A chemical adsorbent according to claim 27, wherein:
   $A_1$ in said Chemical Formula 5-1 is bonded to 4-position of a benzene ring in a chalcone skeleton represented by the following Chemical Formula 5-4; and
   $A_2$ is bonded to 4'-position.

[Chemical Formula 5-4]

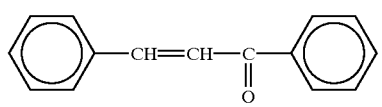

33. A chemical adsorbent according to claim 32, wherein:
   $A_1$ in said Chemical Formula 5-1 is a characteristic group represented by the following Chemical Formula 5-2 or Chemical Formula 5-3:

[Chemical Formula 5-2]

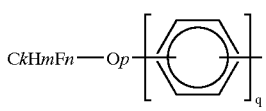

where k is an integer of 1 to 18 inclusive, m and n are an integer of 0 to 37 inclusive, m+n=2k+1, p is an integer of 0 or 1, and q is an integer of 0 or 1;

[Chemical Formula 5-3]

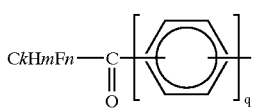

where k is an integer of 1 to 18 inclusive, m and n are an integer of 0 to 37 inclusive, m+n=2k+1, and q is an integer of 0 or 1; and
   $A_2$ in said Chemical Formula 5-1 is represented by a group of —$(CH_2)_n$—O—, —O—$(CH_2)_n$—O—, or —CO—$(CH_2)_n$—O— where n is an integer of 2 to 14 inclusive.

34. A method of manufacturing a chemical adsorbent represented by the following chemical formula:

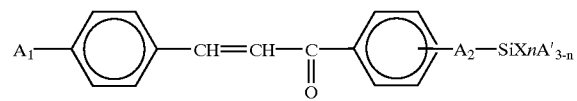

where $A_1$ is a functional group bonded to one of the benzene rings in the chalcone skeleton, $A_2$ is a bifunctional group bonded to the other one of the benzene rings, X is a halogen, A' is an alkyl group or an alkoxy group, and n is in the range of 0 to 3, said method comprising the step of:
   producing a chalcone derivative having a —$SiX_3$ group by bonding a halogen to Si in a molecule having Si and a group of a chalcone skeleton having a functional group at least at the 4-position of the chalcone skeleton in an atmosphere of an inert gas.

35. A method of manufacturing a chemical adsorbent comprising at least the step of:
   synthesizing a chalcone derivative having a bond of —O—$SiX_3$ by causing a condensation reaction between an alcohol comprising a group of a chalcone skeleton with a functional group at least at the 4-position of a benzene ring in the chalcone skeleton and $SiX_4$ where X is a halogen in an atmosphere of an inert gas.

36. A method of manufacturing a chemical adsorbent represented by the following Chemical Formula:

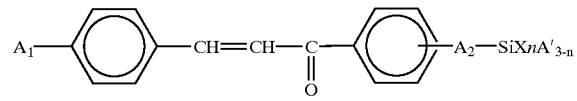

where $A_1$ is a functional group bonded to one of the benzene rings in the chalcone skeleton, $A_2$ is a bifunctional group bonded to the other benzene ring, X is a halogen, A' is an alkyl group or an alkoxy group, and n is an integer of 1 to 3 inclusive, said method comprising at least the step of:
   producing a chalcone derivative having a functional group at least at the 4-position of a benzene ring in the chalcone skeleton by causing an aldol condensation reaction between a benzaldehyde with a functional group at least at the 4-position and a compound having a benzoyl group and thereafter carrying out dehydration.

37. A liquid crystal alignment layer wherein:
   a thin film comprising a chemical adsorbent having a characteristic group represented by the following Chemical Formula 6-1 in a molecular structure is chemisorbed directly or with an interposition of a different substance layer on a substrate surface with an electrode by a bond of —Si—O—; and
   adsorbent molecules are crosslinked to each other through at least one bond of a vinyl group in a characteristic group represented by the following Chemical Formula 6-1:

[Chemical Formula 6-1]

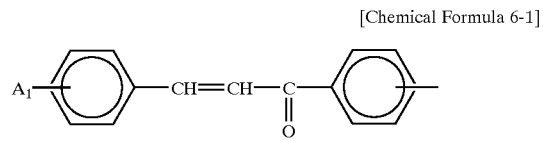

where $A_1$ is a functional group bonded to a benzene ring.

38. A liquid crystal alignment layer according to claim 37, said liquid crystal alignment layer:
   being a monomolecular thin film; and
   having a liquid crystal alignment control force which can align liquid crystal molecules in a particular direction.

39. A liquid crystal alignment layer according to claim 38, wherein:
   a coating thickness of said liquid crystal alignment layer is 0.5 nm or more and below 10 nm.

40. A liquid crystal alignment layer according to claim 38, wherein:
   $A_1$ in said Chemical Formula 6-1 is a characteristic group represented by the following Chemical Formula 6-3 or Chemical Formula 6-4:

[Chemical Formula 6-3]

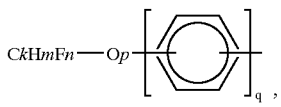

where k is an integer of 1 to 18 inclusive, m and n are an integer of 0 to 37 inclusive, m+n=2k+1, p is an integer of 0 or 1, and q is an integer of 0 or 1;

[Chemical Formula 6-4]

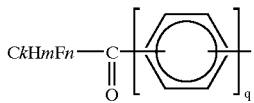

where k is an integer of 1 to 18 inclusive, m and n are an integer of 0 to 37 inclusive, m+n=2k+1, and q is an integer of 0 or 1.

41. A liquid crystal alignment layer according to claim 40, wherein:
   $A_1$ in said Chemical Formula 6-1 is bonded to 4-position of a benzene ring represented by the following Chemical Formula 6-2:

[Chemical Formula 6-2]

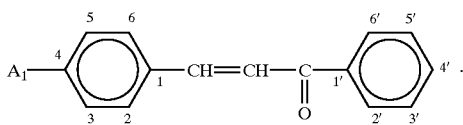

42. A liquid crystal alignment layer according to claim 38, said liquid crystal alignment layer being composed of more than two kinds of chemical adsorbents having a characteristic group represented by said Chemical Formula 6-1.

43. A liquid crystal alignment layer according to claim 38, said liquid crystal alignment layer being composed of a chemical adsorbent having a characteristic group represented by said Chemical Formula 6-1 and a chemical substance except said chemical adsorbent.

44. A liquid crystal alignment layer according to claim 38, said liquid crystal alignment layer being composed of a plurality of kinds of chemical substances, wherein:
   at least one kind of said chemical substance is a chemical adsorbent having a characteristic group represented by said Chemical Formula 6-1; and
   at least one of said plurality of kinds of chemical substances has an alkyl skeleton in a normal chain, a siloxane skeleton in a normal chain or a fluoroalkyl skeleton in a normal chain.

45. A liquid crystal alignment layer according to claim 40, said liquid crystal alignment layer being composed of a plurality of kinds of chemical substances, wherein:
   at least one kind of said chemical substance is a chemical adsorbent having a characteristic group represented by said Chemical Formula 6-1; and
   at least one of said plurality of kinds of chemical substances has an alkyl skeleton in a normal chain, a siloxane skeleton in a normal chain or a fluoroalkyl skeleton in a normal chain.

46. A liquid crystal alignment layer according to claim 40, said liquid crystal alignment layer having a different alignment control direction over a liquid crystal molecule at each of a plurality of small patterned sections into which a pixel unit in an alignment layer is divided.

47. A liquid crystal alignment layer according to claim 40, wherein:
   said different substance layer is an organic layer or an inorganic layer having a hydrophilic group.

48. A method of manufacturing a liquid crystal alignment layer comprising the steps of:
   forming a monomolecular thin film on a substrate by contacting a material for a thin film comprising a chemical adsorbent represented by the following Chemical Formula 6-5 with the substrate surface having at least an electrode, and chemisorbing said material for a thin film on said substrate surface; and
   treating said thin film by an alignment treatment;

[Chemical Formula 6-5]

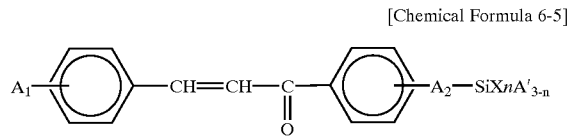

where $A_1$ is a functional group bonded to a benzene ring in a chalcone skeleton, $A_2$ is a bifunctional group, X is a halogen or an alkoxyl group, A' is an alkyl group or an alkoxyl group, and n is an integer of 0 to 3 inclusive.

49. A method of manufacturing a liquid crystal alignment layer according to claim 48, wherein:
   $A_1$ in said Chemical Formula 6-5 is represented by the following Chemical Formula 6-3 or Chemical Formula 6-4:

[Chemical Formula 6-3]

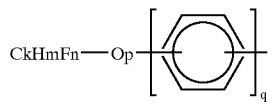

where k is an integer of 1 to 18 inclusive, m and n are an integer of 0 to 37 inclusive, m+n=2k+1, p is an integer of 0 or 1, and q is an integer of 0 or 1;

[Chemical Formula 6-4]

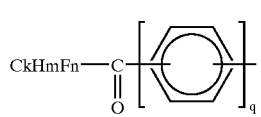

where k is an integer of 1 to 18 inclusive, m and n are an integer of 0 to 37 inclusive, m+n=2k+1, and q is an integer of 0 or 1.

50. A method of manufacturing a liquid crystal alignment layer according to claim 49, wherein:
   $A_1$ in said Chemical Formula 6-5 is bonded to 4-position of a benzene ring composing a chalcone basic skeleton represented by the following Chemical Formula 6-6:

[Chemical Formula 6-6]

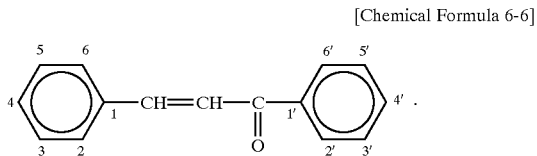

51. A method of manufacturing a liquid crystal alignment layer according to claim 50, wherein:
   $A_2$ in said Chemical Formula 6-5 is represented by a group of —$(CH_2)_n$—O—, —O—$(CH_2)_n$—O—, or —CO—$(CH_2)_n$—O— (n is an integer of 2 to 14 inclusive).

52. A method of manufacturing a liquid crystal alignment layer according to claim 48, wherein:
   the $A_1$ in the Chemical Formula 6-5 is bonded to the 4-position of a benzene ring, the $A_1$ being a functional group represented by the following Chemical Formula 6-3 or 6-4:

[Chemical Formula 6-3]

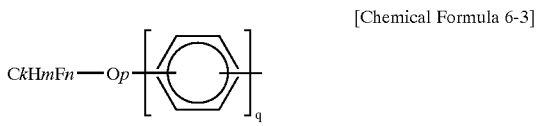

where k is an integer of 1 to 18 inclusive, m and n are an integer of 0 to 37 inclusive, m+n=2k+1, p is an integer of 0 or 1, and q is an integer of 0 or 1;

[Chemical Formula 6-4]

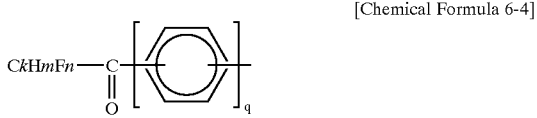

where k is an integer of 1 to 18 inclusive, m and n are an integer of 0 to 37 inclusive, m+n=2k+1, and q is an integer of 0 or 1; and
   the A2 in the Chemical Formula 6-5 is bonded to the 4'-position of a benzene ring, the A2 being one of —$(CH_2)_n$—O—, —O—$(CH_2)_n$—O—, and —CO—$(CH_2)_n$—O—, where n is an integer of 2 to 14.

53. A method of manufacturing a liquid crystal alignment layer according to claim 49, comprising the step of:
   washing a substrate surface with a thin film with a nonaqueous solvent to remove an excessive material for a thin film, between said steps of forming a thin film and treating an alignment.

54. A method of manufacturing a liquid crystal alignment layer according to claim 53, wherein:
   a nonaqueous solvent in said step of washing is a nonprotic organic solvent.

55. A method of manufacturing a liquid crystal alignment layer according to claim 53, wherein:
   a nonaqueous solvent in said step of washing is a mixed solvent of a nonprotic organic solvent and a protic organic solvent.

56. A method of manufacturing a liquid crystal alignment layer according to claim 49, wherein said step of treating said thin film is such that an alignment control force which can align liquid crystal molecules in a particular direction is provided by irradiating a polarized light on a substrate plane having said thin film, and crosslinking molecules in the thin film to each other.

57. A method of manufacturing a liquid crystal alignment layer according to claim 56, wherein:
   said irradiation of a polarized light is a plurality of irradiations with a different light strength and/or a different wavelength.

58. A method of manufacturing a liquid crystal alignment layer according to claim 56, wherein:
   said irradiation of a polarized light is a plurality of irradiations with a different incident angle with a substrate.

59. A method of manufacturing a liquid crystal alignment layer according to claim 56, wherein:
   said irradiation of a polarized light is an irradiation using a polarized light with a different polarized direction at each irradiation and to a different irradiation section at each irradiation.

60. A method of manufacturing a liquid crystal alignment layer according to claim 49, wherein:
   said step of treating an alignment is a step of aligning a molecule composing a thin film provisionally by drain-drying an organic solvent remaining on a substrate plane while setting up the substrate through washing in a certain direction.

61. A method of manufacturing a liquid crystal alignment layer according to claim 53, wherein said step of treating said thin film is such that an alignment control force for aligning liquid crystal molecules in a particular direction is provided by irradiating a polarized light on a substrate plane, and crosslinking molecules in a thin film to each other, after aligning the molecules in said thin film provisionally by drain-drying an organic solvent remaining on the substrate plane while setting up the washed substrate in a certain direction.

62. A method of manufacturing a liquid crystal alignment layer according to claim 61, wherein:
   said irradiation of a polarized light is a plurality of irradiations with a different light strength and/or a different wavelength.

63. A method of manufacturing a liquid crystal alignment layer according to claim 61, wherein:
   said irradiation of a polarized light is a plurality of irradiations with a different incident angle with a substrate.

64. A method of manufacturing a liquid crystal alignment layer according to claim 61, wherein:
   said irradiation of a polarized light is an irradiation using a polarized light with a different polarized direction at each irradiation and to a different irradiation section at each irradiation.

65. A method of manufacturing a liquid crystal alignment layer comprising the steps of:
   forming a monomolecular thin film on a substrate by contacting a material for a thin film comprising a chemical adsorbent represented by the following Chemical Formula 6-5 with the substrate surface having at least an electrode, and chemisorbing molecules in said material for a thin film on said substrate surface;
   provisionally aligning the molecules in the thin film by drain-drying an nonaqueous solvent in a certain direction after contacting said nonaqueous solvent with the substrate surface having a thin film; and realigning the molecules in the thin film by irradiating a polarized light on the provisionally aligned substrate, and crosslinking the molecules in the thin film to each other;

wherein:

a liquid crystal alignment layer in a multidomain alignment having a different liquid crystal alignment control direction at each of a plurality of small patterned sections into which a pixel unit is divided is manufactured by repeating said steps of aligning provisionally and realigning more than twice;

[Chemical Formula 6-5]

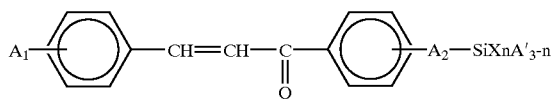

where $A_1$ is a functional group bonded to a benzene ring in a chalcone skeleton, $A_2$ is a bifunctional group, X is a halogen, A' is an alkyl group or an alkoxyl group, and n is an integer of 1 or 2.

66. A liquid crystal display device with a structure in which two substrates each having at least an electrode are opposed to each other so that the electrodes are on the inside thereof and a liquid crystal is sealed between the two substrates, wherein:

a liquid crystal alignment layer comprising a chemical adsorbent having a characteristic group represented by the following Chemical Formula 6-1 in a molecular structure is chemisorbed on a surface of at least one of said substrates by a bond of —Si—O—; and adsorbent molecules are crosslinked to each other through at least one bond of a vinyl group in a characteristic group represented by the following Chemical Formula 6-1:

[Chemical Formula 6-1]

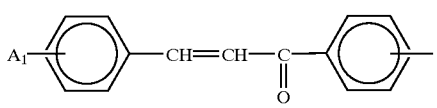

where $A^1$ is a functional group bonded to a benzene ring.

67. A liquid crystal display device according to claim 66, wherein:

$A_1$ in said Chemical Formula 6-1 is a characteristic group represented by the following Chemical Formula 6-3 or Chemical Formula 6-4:

[Chemical Formula 6-3]

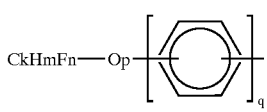

where k is an integer of 1 to 18 inclusive, m and n are an integer of 0 to 37 inclusive, m+n=2k+1, p is an integer of 0 or 1, and q is an integer of 0 or 1;

[Chemical Formula 6-4]

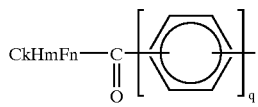

where k is an integer of 1 to 18 inclusive, m and n are an integer of 0 to 37 inclusive, m+n=2k+1, and q is an integer of 0 or 1.

68. A liquid crystal display device according to claim 67, wherein:

$A_1$ in said Chemical Formula 6-1 is bonded to 4-position of a benzene ring represented by the following Chemical Formula 6-2:

[Chemical Formula 6-2]

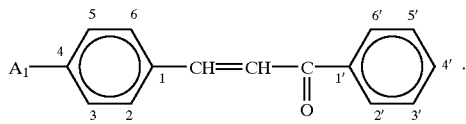

69. A liquid crystal display device according to claim 68, wherein:

said liquid crystal alignment layer is composed of a plurality of kinds of chemical substances;

at least one kind of said chemical substance is a chemical adsorbent having a characteristic group represented by said Chemical Formula 6-1; and at least one of said plurality of kinds of chemical substances has an alkyl skeleton in a normal chain, a siloxane skeleton in a normal chain or a fluoroalkyl skeleton in a normal chain.

70. A liquid crystal display device according to claim 69, wherein said liquid crystal alignment layer is a monomolecular thin film and has a liquid crystal alignment control force which can align liquid crystal molecules in a particular direction.

71. A liquid crystal display device according to claim 70, wherein:

a coating thickness of said thin film is 0.5 nm or more and below 10 nm.

72. A liquid crystal display device according to claim 70, wherein:

said liquid crystal alignment layer has a different liquid crystal alignment direction at each of a plurality of small sections into which a pixel unit is divided.

73. A liquid crystal display device according to claim 72, wherein:

said small section is arrayed in a pattern in a pixel area on a substrate.

74. A liquid crystal display device according to claim 73, wherein:

an organic layer or an inorganic layer having a hydrophilic group is formed on an electrode of a substrate with said alignment layer.

75. A liquid crystal display device according to claim 68, wherein:

said liquid crystal alignment layer has a different liquid crystal alignment direction at each of a plurality of small sections into which a pixel unit is divided.

76. A liquid crystal display device according to claim 75, wherein:

said small section is arrayed in a pattern in a pixel area on a substrate.

77. A liquid crystal display device according to claim 76, wherein:

an organic layer or an inorganic layer having a hydrophilic group is formed on an electrode of a substrate with said alignment layer.

78. A liquid crystal display device of an in-plane switching type in which an electrode and an opposite electrode are formed on the same substrate, wherein:

a liquid crystal alignment layer comprising a chemical adsorbent having a characteristic group represented by the following Chemical Formula 6-1 in a molecular structure is chemisorbed by a bond of —Si—O— on a surface of said substrate on which the electrode and the opposite electrode are formed; and adsorbent molecules are crosslinked to each other through at least one bond of a vinyl group in a characteristic group represented by the following Chemical Formula 6-1:

[Chemical Formula 6-1]

$$A_1-\bigcirc-CH=CH-\underset{\underset{O}{\|}}{C}-\bigcirc-$$

where $A_1$ is a functional group bonded to a benzene ring.

79. A liquid crystal display device according to claim 78, wherein:

$A_1$ in said Chemical Formula 6-1 is a characteristic group represented by the following Chemical Formula 6-3 or Chemical Formula 6-4:

[Chemical Formula 6-3]

$$CkHmFn-Op-\left[\bigcirc\right]_q$$

where k is an integer of 1 to 18 inclusive, m and n are an integer of 0 to 37 inclusive, m+n=2k+1, p is an integer of 0 or 1, and q is an integer of 0 or 1;

[Chemical Formula 6-4]

$$CkHmFn-\underset{\underset{O}{\|}}{C}-\left[\bigcirc\right]_q$$

where k is an integer of 1 to 18 inclusive, m and n are an integer of 0 to 37 inclusive, m+n=2k+1, and q is an integer of 0 or 1.

80. A liquid crystal display device according to claim 79, wherein:

$A_1$ in said Chemical Formula 6-1 is bonded to 4-position of a benzene ring represented by the following Chemical Formula 6-2:

[Chemical Formula 6-2]

$$A_1-\overset{5\ 6}{\underset{3\ 2}{\bigcirc}}{}^{4}_{1}-CH=CH-\underset{\underset{O}{\|}}{C}-\overset{6'\ 5'}{\underset{2'\ 3'}{\bigcirc}}{}^{4'}_{1'}.$$

81. A liquid crystal display device according to claim 80, wherein said liquid crystal alignment layer is a monomolecular thin film and has a liquid crystal alignment control force which can align liquid crystal molecules in a particular direction.

82. A liquid crystal display device according to claim 81, wherein:

a coating thickness of said thin film is 0.5 nm or more and below 10 nm.

83. A liquid crystal display device according to claim 81, wherein:

said liquid crystal alignment layer is composed of a plurality of kinds of chemical substances;

at least one kind of said chemical substance is a chemical adsorbent having a characteristic group represented by said Chemical Formula 6-1; and at least one of said plurality of kinds of chemical substances has an alkyl skeleton in a normal chain, a siloxane skeleton in a normal chain or a fluoroalkyl skeleton in a normal chain.

84. A liquid crystal display device according to claim 83, wherein:

an organic layer or an inorganic layer having a hydrophilic group is formed on an electrode of a substrate with said alignment layer.

85. A chemical adsorbent comprising a chemical compound represented by the following Chemical Formula 4:

[Chemical Formula 4]

$$R-\underset{}{\overset{H}{C}}=\underset{}{C}-\underset{\underset{O}{\|}}{\overset{CH_3}{\underset{|}{C}}}-O-(CH_2)n-\overset{CH_3}{\underset{|}{Si}}XmA_{2-m}$$

where R is an alkyl group having a carbon number of 1 to 14, n is an integer of 1 to 14, X is a halogen, A is a functional group, and m is 1.

86. A method of manufacturing a liquid crystal alignment layer comprising the steps of:

forming a monomolecular thin film on a substrate by contacting a thin film material comprising a chemical adsorbent represented by the following Chemical Formula 6-5 with the substrate surface having at least an electrode, and chemisorbing molecules in said thin film material on the substrate surface;

provisionally aligning the molecules in the thin film by drain-drying an nonaqueous solvent in a certain direction after contacting said nonaqueous solvent with the substrate surface having a thin film; and realigning the molecules in the thin film by irradiating a polarized light on the provisionally aligned substrate and crosslinking the molecules in the thin film to each other;

wherein:

a liquid crystal alignment layer in a multidomain alignment having a different liquid crystal alignment control direction at each of a plurality of small patterned sections into which a pixel unit is divided is manufactured by repeating said steps of provisionally aligning and realigning more than twice;

[Chemical Formula 6-5]

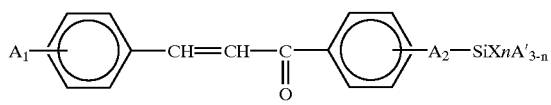

wherein $A_1$ is a functional group bonded to one of the benzene rings of the chalcone skeleton, $A_2$ is a bifunctional group, X is an alkoxy group, A' is an alkyl group, and n is an integer of 1 or 2.

87. A method of manufacturing a liquid crystal alignment layer comprising the steps of:

forming a monomolecular thin film on a substrate by contacting a thin film material comprising a chemical adsorbent represented by the following Chemical Formula with the substrate surface having at least an electrode, and chemisorbing molecules in said thin film material on the substrate surface;

provisionally aligning the molecules in the thin film by drain-drying an nonaqueous solvent in a certain direction after contacting said nonaqueous solvent with the substrate surface having a thin film; and realigning the molecules in the thin film by irradiating a polarized light on the provisionally aligned substrate and crosslinking the molecules in the thin film to each other;

wherein:
a liquid crystal alignment layer in a multidomain alignment having a different liquid crystal alignment control direction at each of a plurality of small patterned sections into which a pixel unit is divided is manufactured by repeating said steps of provisionally aligning and realigning more than twice;

[Chemical Formula]

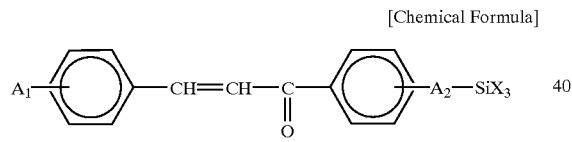

wherein $A_1$ is a functional group bonded to one of the benzene rings of the chalcone skeleton, $A_2$ is a bifunctional group, and X is a halogen or an alkoxyl group.

88. A method of manufacturing a liquid crystal alignment layer comprising the steps of:

forming a monomolecular thin film on a substrate by contacting a thin film material comprising a chemical adsorbent represented by the following Chemical Formula with the substrate surface having at least an electrode, and chemisorbing molecules in said thin film material on the substrate surface;

provisionally aligning the molecules in the thin film by drain-drying an nonaqueous solvent in a certain direction after contacting said nonaqueous solvent with the substrate surface having a thin film; and realigning the molecules in the thin film by irradiating a polarized light on the provisionally aligned substrate and crosslinking the molecules in the thin film to each other;

wherein:
a liquid crystal alignment layer in a multidomain alignment having a different liquid crystal alignment control direction at each of a plurality of small patterned sections into which a pixel unit is divided is manufactured by repeating said steps of provisionally aligning and realigning more than twice;

[Chemical Formula]

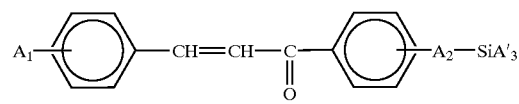

where $A_1$ is a functional group bonded to one of the benzene rings of the chalcone skeleton, $A_2$ is a bifunctional group, and A' is an alkyl group or an alkoxy group.

\* \* \* \* \*

UNITED STATES PATENT AND TRADEMARK OFFICE
CERTIFICATE OF CORRECTION

PATENT NO.    : 6,495,221 B1                                        Page 1 of 1
DATED         : December 17, 2002
INVENTOR(S)   : Kazurumi Ogawa et al.

It is certified that error appears in the above-identified patent and that said Letters Patent is hereby corrected as shown below:

<u>Column 59,</u>
Line 37, change "Chemicla" to -- Chemical --.

<u>Column 63,</u>
Line 37, change "as" to -- a --.

Signed and Sealed this

Ninth Day of December, 2003

JAMES E. ROGAN
*Director of the United States Patent and Trademark Office*